US012623781B1

(12) United States Patent
Dunnigan, Sr. et al.

(10) Patent No.: US 12,623,781 B1
(45) Date of Patent: May 12, 2026

(54) PAYLOAD CONTAINER FOR UNMANNED AIRCRAFT AND ASSOCIATED SYSTEMS AND METHODS

(71) Applicant: CaptureTec, LLC, Lanett, AL (US)

(72) Inventors: Timothy P. Dunnigan, Sr., Lanett, AL (US); Timothy P. Dunnigan, Jr., Auburn, AL (US); William D. Randall, Jr., Auburn, AL (US); Andrew Terry, Melbourne, FL (US)

(73) Assignee: CaptureTec LLC, Lanett, AL (US)

( * ) Notice: Subject to any disclaimer, the term of this patent is extended or adjusted under 35 U.S.C. 154(b) by 109 days.

(21) Appl. No.: 18/538,943

(22) Filed: Dec. 13, 2023

Related U.S. Application Data

(60) Provisional application No. 63/432,781, filed on Dec. 15, 2022.

(51) Int. Cl.
B64D 1/04 (2006.01)
F42B 10/14 (2006.01)
F42B 12/56 (2006.01)
F42B 25/00 (2006.01)

(52) U.S. Cl.
CPC .............. B64D 1/04 (2013.01); F42B 10/143 (2013.01); F42B 12/56 (2013.01); F42B 25/00 (2013.01)

(58) Field of Classification Search
CPC ........ F42B 10/14; F42B 10/143; F42B 12/56; F42B 12/58; F42B 12/60; F42B 12/62; F42B 12/64; F42B 12/66; F42B 25/00; B64D 1/04
USPC ........................................ 102/382, 385, 389
See application file for complete search history.

(56) References Cited

U.S. PATENT DOCUMENTS

| | | | |
|---|---|---|---|
| 1,357,862 A | 11/1920 | Grunow | |
| 3,185,091 A | 5/1965 | Hamilton | |
| 4,015,526 A | 4/1977 | Bond | |
| 4,172,421 A | 10/1979 | Regalbuto | |
| 7,726,244 B1 * | 6/2010 | Lloyd | F41H 11/12 89/1.13 |
| 7,800,032 B1 * | 9/2010 | Facciano | F42B 10/64 244/3.25 |
| 7,829,829 B2 * | 11/2010 | King | F42B 10/143 244/3.25 |
| 8,089,033 B2 | 1/2012 | Zank | |
| 8,205,536 B2 | 6/2012 | Fisher | |

(Continued)

OTHER PUBLICATIONS

"MMS Multi-Drop Payload System", YouTube-Draganfly Inc. Published Jan. 30, 2024; Available at: https://youtube.com/watch?v=E_RGD1sFpD8.

(Continued)

*Primary Examiner* — James S Bergin
(74) *Attorney, Agent, or Firm* — Philip H. Burrus, IV

(57) ABSTRACT

A payload container includes a nose cone electronics hub assembly, a collar assembly, a canister assembly, and a grid fin system. The nose cone electronics hub assembly has a nose cone housing electronic components in support of flight and detonator systems. The collar assembly includes a collar coupling the nose cone electronics hub and canister together. A canister of the canister assembly houses separate parts when in a shipping configuration that can be attached to an exterior of the payload container in a deployment configuration. A fin assembly facilitates vertical descent of the payload container when dropped from an unmanned aircraft.

18 Claims, 34 Drawing Sheets

(56)       References Cited

U.S. PATENT DOCUMENTS

| | | | | |
|---|---|---|---|---|
| D692,085 | S | 10/2013 | Pierce et al. | |
| 8,746,355 | B2 * | 6/2014 | Demmitt ................. | F42B 12/50 |
| | | | | 239/69 |
| 9,194,661 | B1 | 11/2015 | Perciballi | |
| 9,808,660 | B2 | 11/2017 | Kilburn | |
| 10,466,023 | B2 * | 11/2019 | Garst ...................... | F42B 7/046 |
| 11,067,374 | B2 * | 7/2021 | Hill ........................... | F42C 1/00 |
| 11,255,643 | B2 * | 2/2022 | Ang .................... | F41H 13/0006 |
| 11,390,382 | B1 | 7/2022 | Anderson et al. | |
| 12,247,813 | B2 * | 3/2025 | Thornhill ................ | F42B 10/04 |
| 12,449,241 | B1 * | 10/2025 | Opperman .............. | B64D 1/04 |
| 2007/0007021 | A1 | 1/2007 | Regan | |
| 2007/0018033 | A1 * | 1/2007 | Fanucci .................. | F42B 15/22 |
| | | | | 244/49 |
| 2012/0138319 | A1 | 6/2012 | Demmitt | |
| 2019/0107374 | A1 | 4/2019 | Hill | |
| 2021/0116221 | A1 | 4/2021 | Benson | |
| 2022/0212791 | A1 | 7/2022 | Hohenarbeit | |
| 2022/0320669 | A1 | 10/2022 | Gil | |
| 2023/0060644 | A1 | 3/2023 | Bell | |

OTHER PUBLICATIONS

"Tactical Multi-Drop Payload System", Dragan Fly Online Article; Published Jan. 30, 2024; Available at: https://draganfly.com/press-release/draganfly-selected-to-develop-tactical-multi-drop-payload-system-by-mms-products/.

"Photograph of Shippable Drone Deployable Container", Provided by Inventor; Identified as "Shippable Drone Deployable Container"; Unknown exact public availability date but prior to filing of present application.

* cited by examiner

910

908

909

3500

910

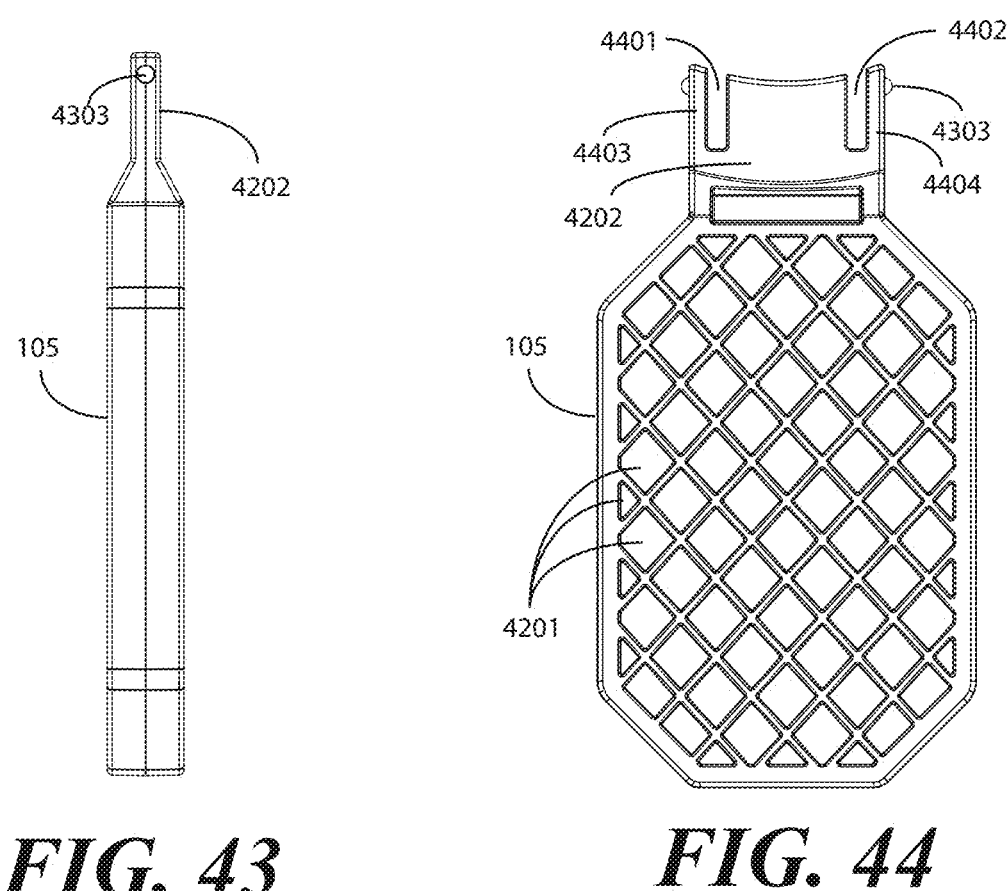
*FIG. 43*
*FIG. 44*
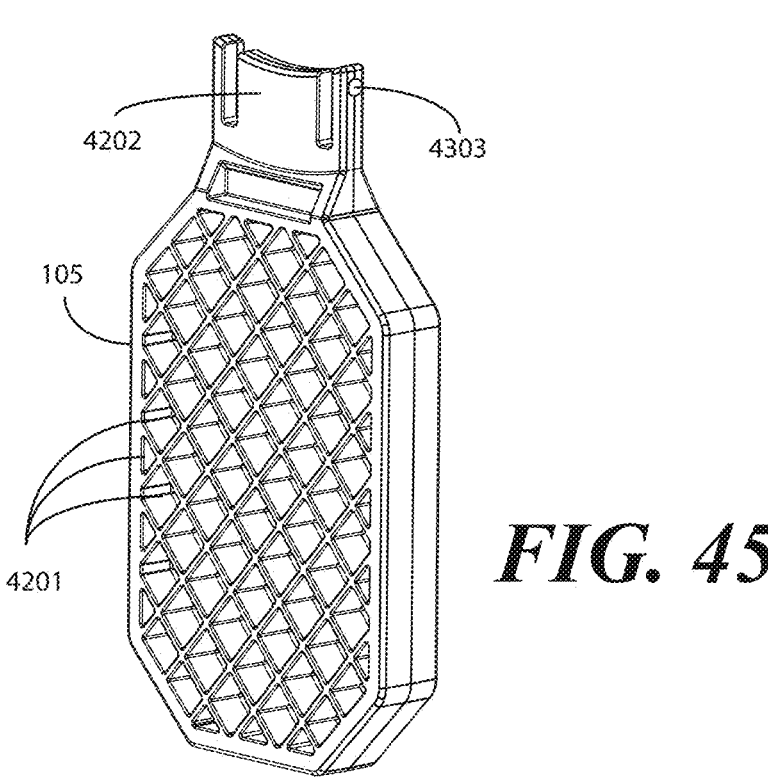
*FIG. 45*

1004

1004

PAYLOAD CONTAINER FOR UNMANNED AIRCRAFT AND ASSOCIATED SYSTEMS AND METHODS

CROSS REFERENCE TO PRIOR APPLICATIONS

This application claims priority and benefit under 35 U.S.C. § 119(e) from U.S. Provisional Application No. 63/432,781, filed Dec. 15, 2022, which is incorporated herein by reference for all purposes.

BACKGROUND

Technical Field

This disclosure relates generally to payload delivery containers, and more particularly to an airborne payload delivery container that can be released by an unmanned aircraft.

Background Art

Use of unmanned aircraft or "drones" is rapidly emerging as the predominant method of transporting and delivering various payloads. These drones are frequently used to carry objects efficiently from one location to another. In addition to being used by parcel delivery and retail service providers for delivering packages to consumers, unmanned aircraft are also used for more sophisticated practices such as dropping charges to fight wildfires, dropping technology used to locate missing persons, and even delivering crop enhancement and monitoring payloads in farming applications. Generally equipped with image capture devices and other sophisticated electronics, drones can provide the remote pilot with real-time images that can be used for investigative, surveilling, and reconnaissance purposes. Militaries use drones to deliver energized payloads in combat applications as well.

While much attention is paid to the sophistication of the drone carrying a particular payload, little attention is paid to the payload itself. Accordingly, it would be advantageous to have an improved payload container and accompanying systems and methods that provide improved payload delivery operations; particularly in the areas of defense and demining.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

3

Figure 26:
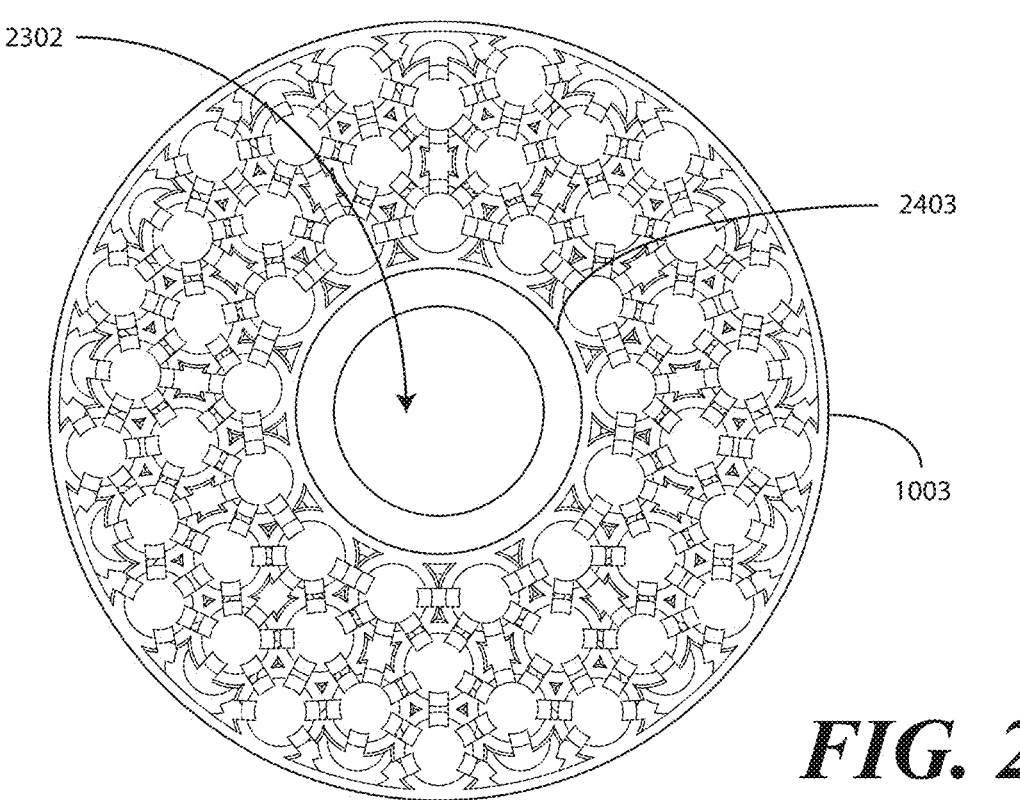

FIG. 26 illustrates a top plan view of one explanatory collar fragmentation insert suitable for use in a payload container in accordance with one or more embodiments of the disclosure.

Figures 27, 28:
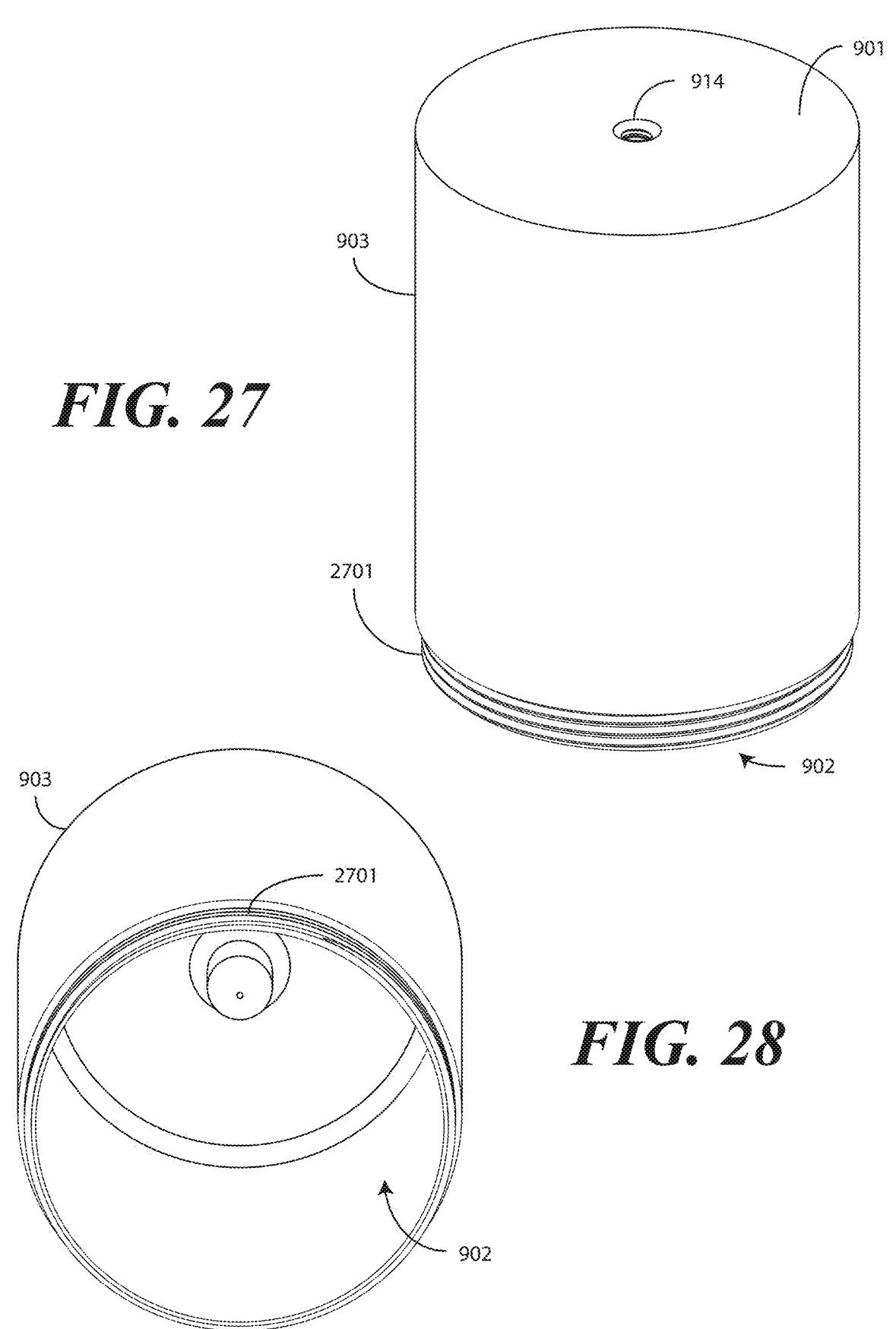

FIG. 27 illustrates a perspective view of one explanatory canister suitable for use in a payload container in accordance with one or more embodiments of the disclosure.

FIG. 28 illustrates a second perspective view of one explanatory canister suitable for use in a payload container in accordance with one or more embodiments of the disclosure.

Figures 29, 30:
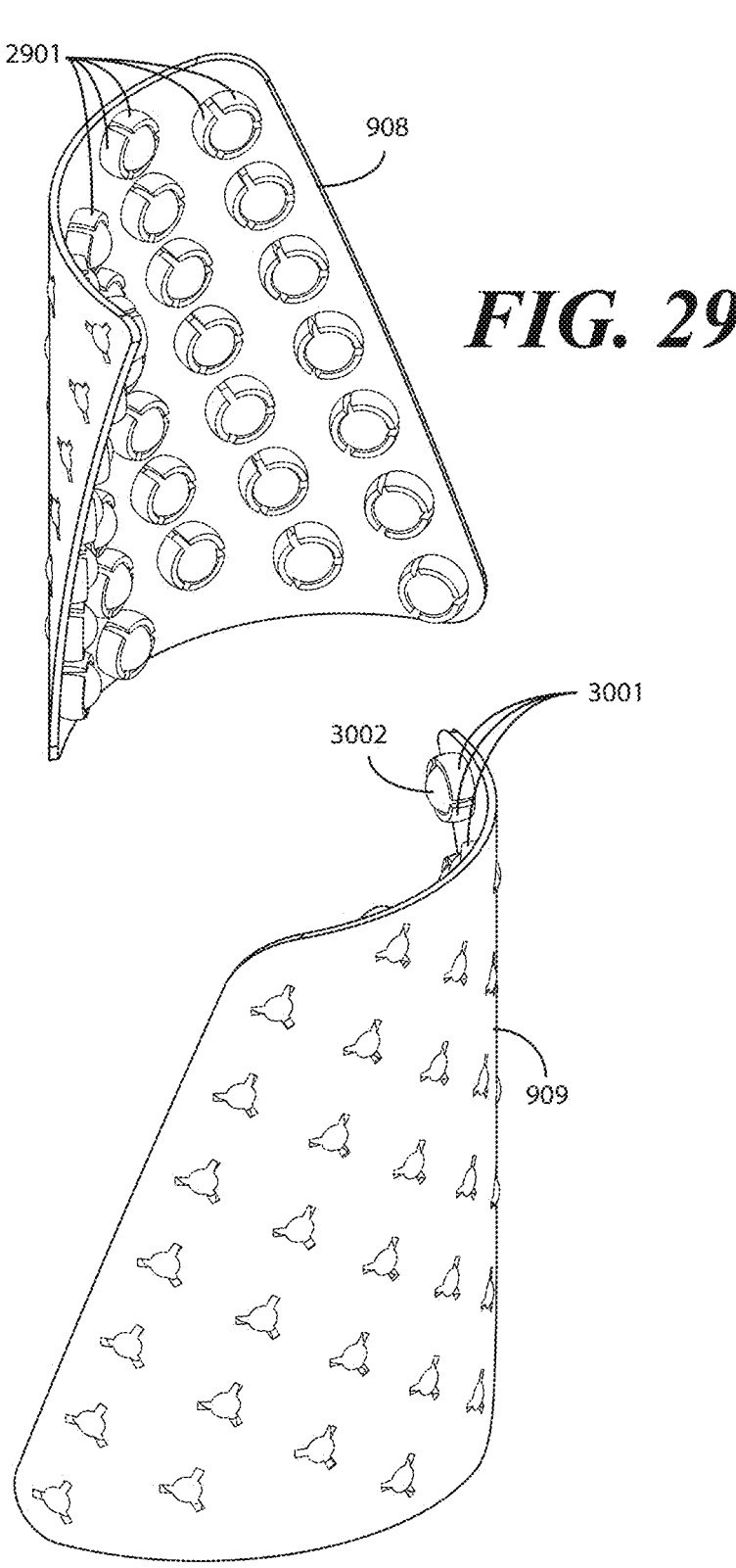

FIG. 29 illustrates a first perspective view of one explanatory canister fragmentation insert suitable for use in a payload container in accordance with one or more embodiments of the disclosure.

FIG. 30 illustrates a second perspective view of one explanatory canister fragmentation insert suitable for use in a payload container in accordance with one or more embodiments of the disclosure.

Figure 31:
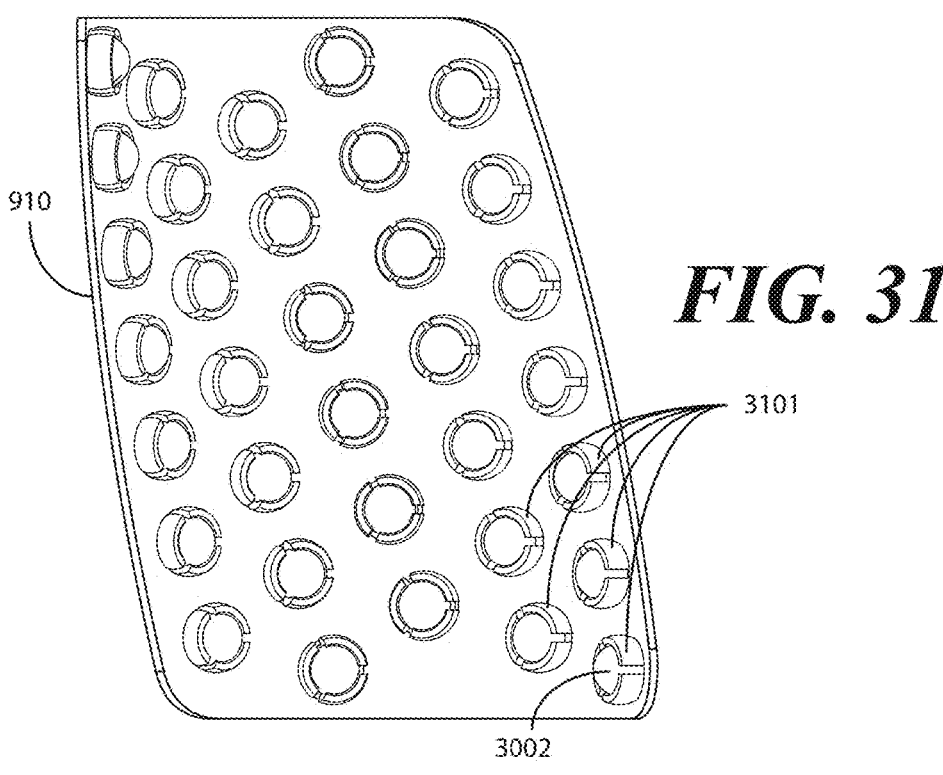

FIG. 31 illustrates a first elevation view of one explanatory canister fragmentation insert suitable for use in a payload container in accordance with one or more embodiments of the disclosure.

Figure 32:
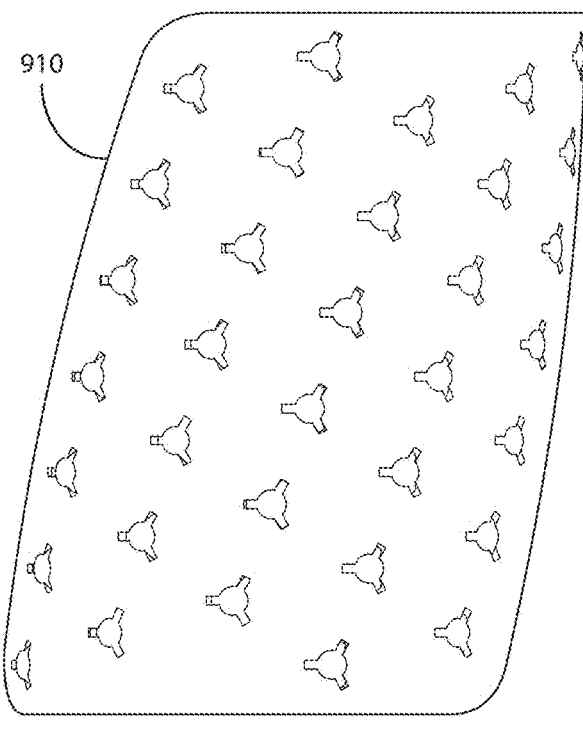

FIG. 32 illustrates a second elevation view of one explanatory canister fragmentation insert suitable for use in a payload container in accordance with one or more embodiments of the disclosure.

Figure 33:
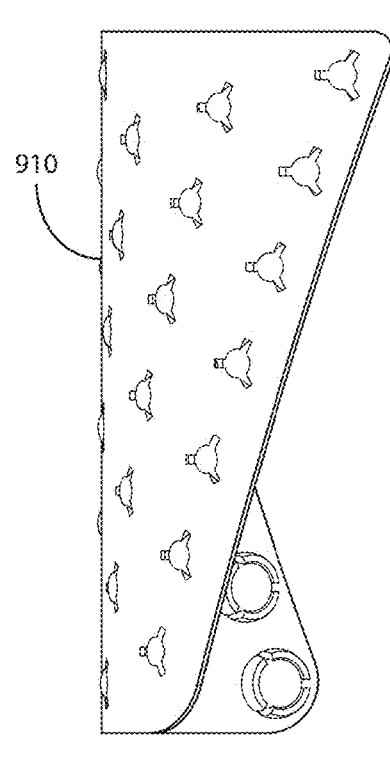

FIG. 33 illustrates a third elevation view of one explanatory canister fragmentation insert suitable for use in a payload container in accordance with one or more embodiments of the disclosure.

Figure 34:
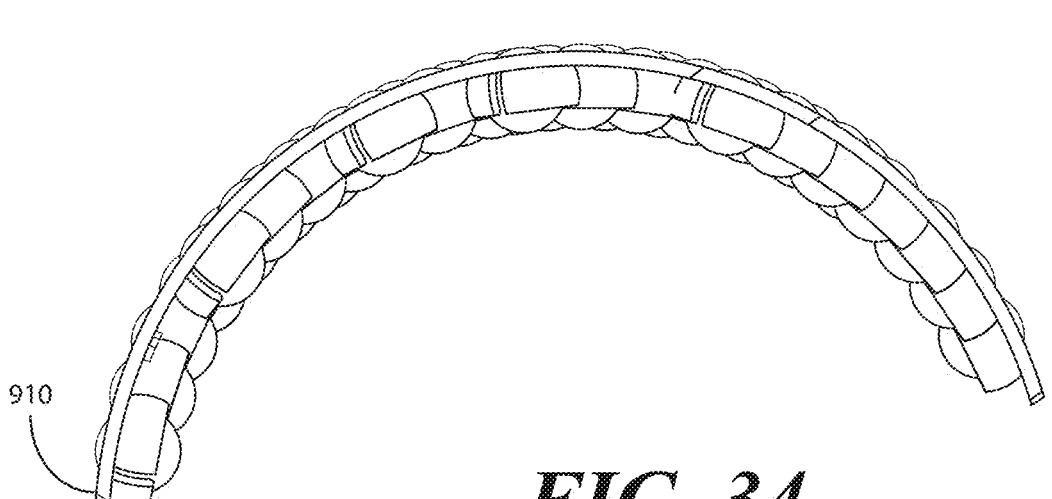

FIG. 34 illustrates a top plan view of one explanatory canister fragmentation insert suitable for use in a payload container in accordance with one or more embodiments of the disclosure.

Figure 35:
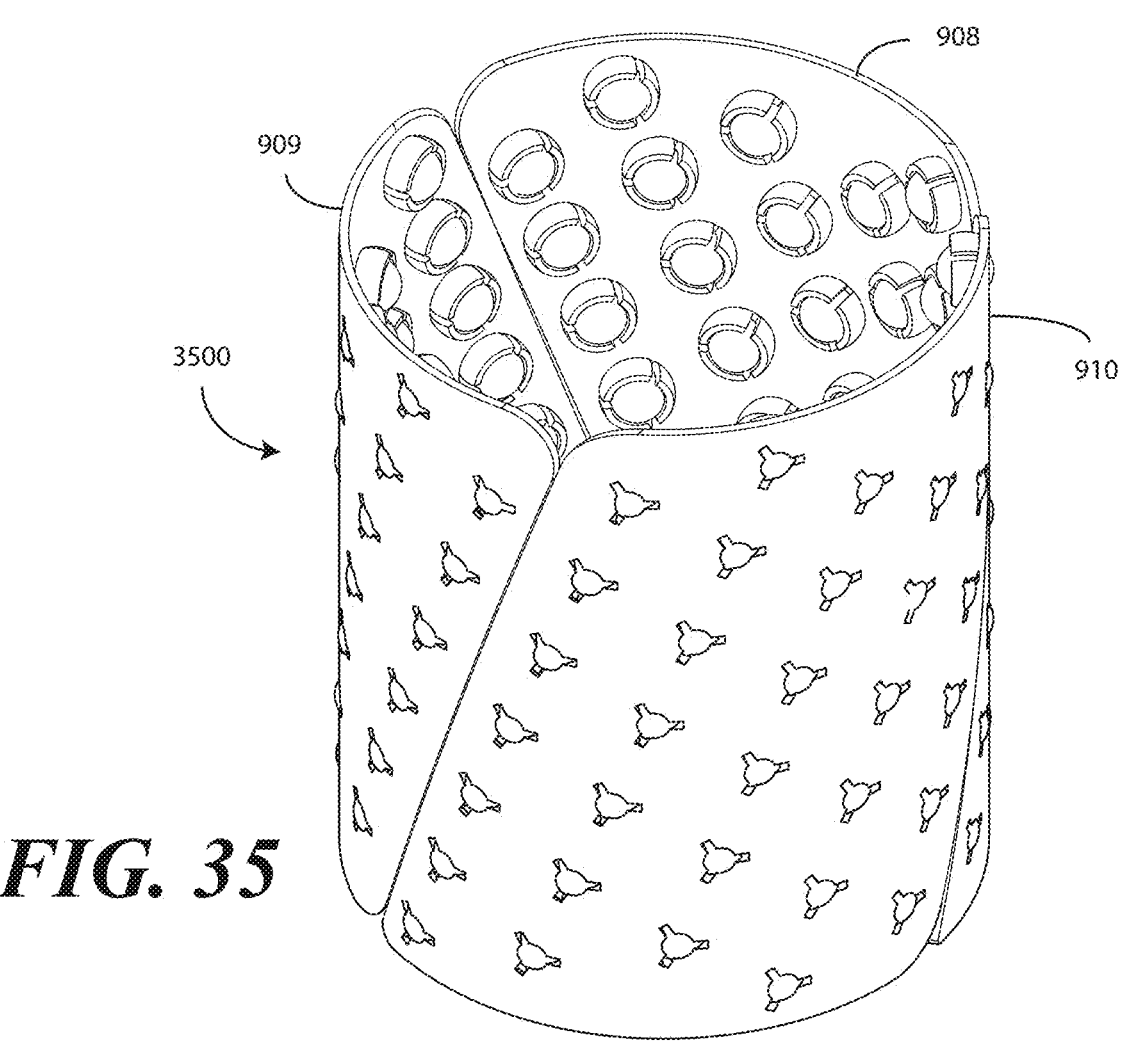

FIG. 35 illustrates view of one explanatory canister fragmentation insert assembly suitable for use in a payload container in accordance with one or more embodiments of the disclosure.

Figure 36:
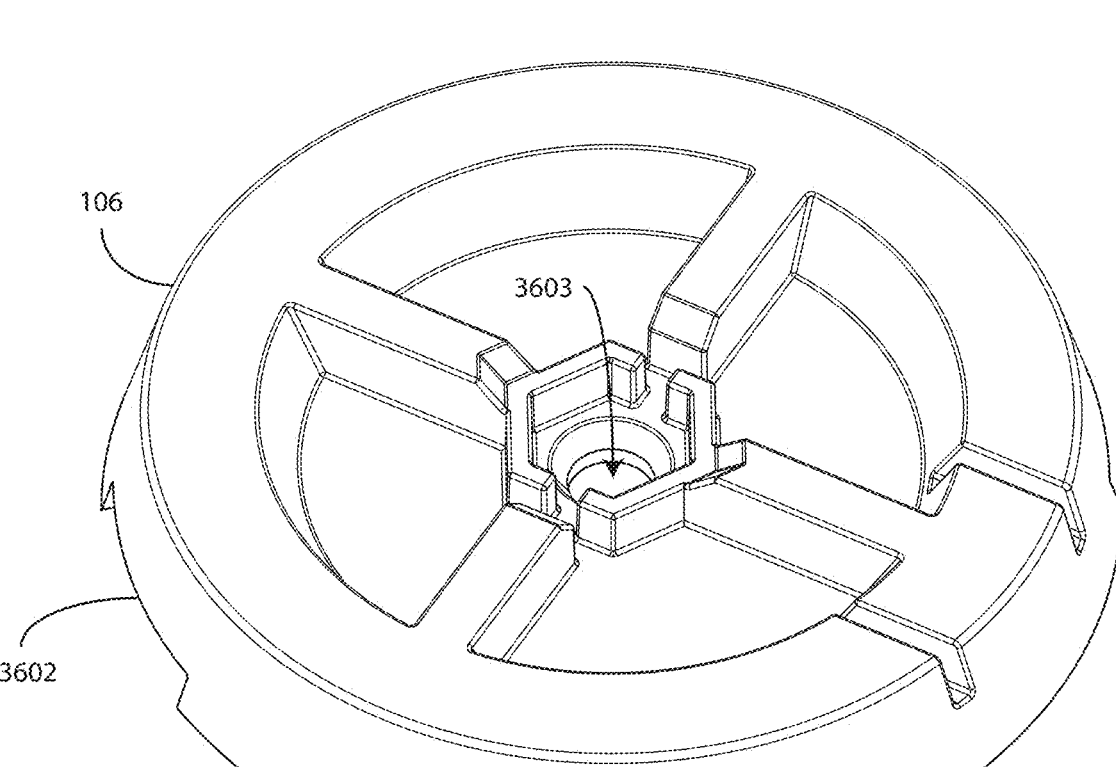

FIG. 36 illustrates a first perspective view of one explanatory fin cap suitable for use in a payload container in accordance with one or more embodiments of the disclosure.

Figure 37:
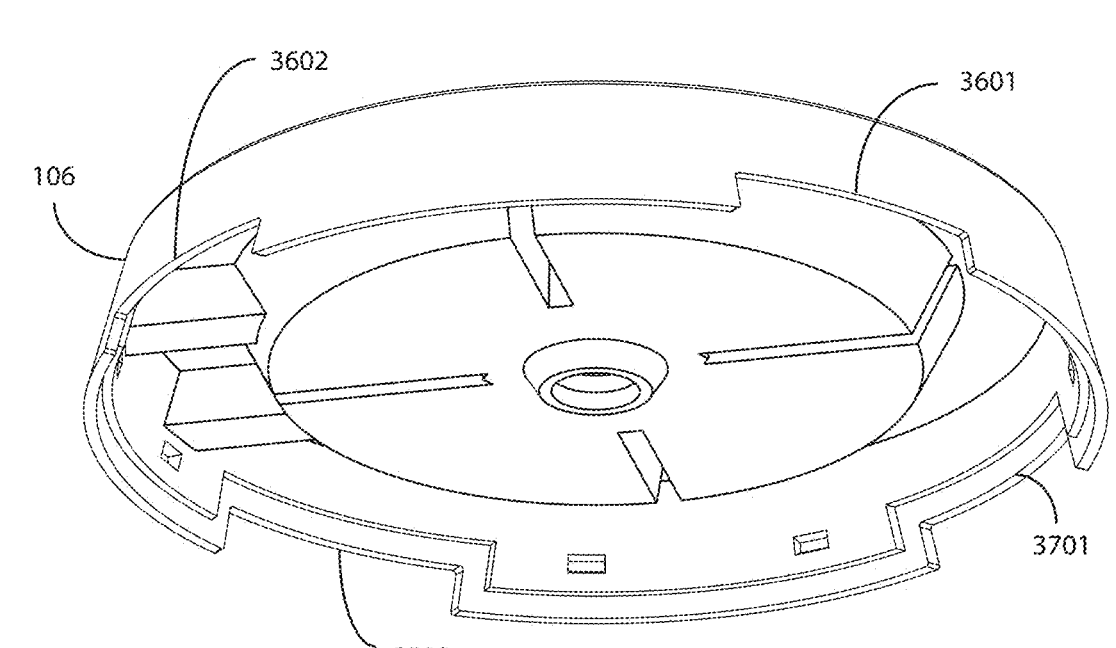

FIG. 37 illustrates a second perspective view of one explanatory fin cap suitable for use in a payload container in accordance with one or more embodiments of the disclosure.

Figures 38, 39, 40:
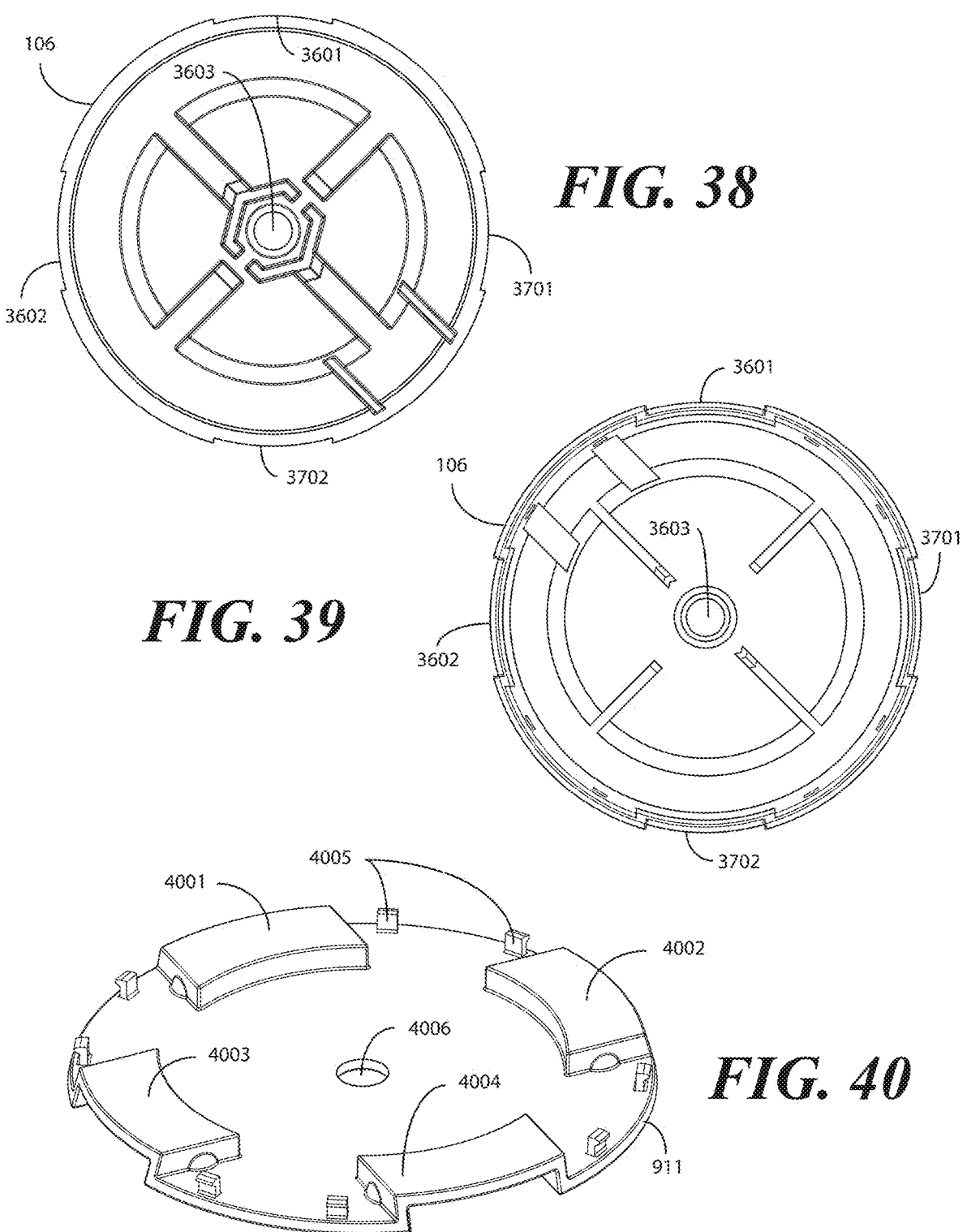

FIG. 38 illustrates a top plan view of one explanatory fin cap suitable for use in a payload container in accordance with one or more embodiments of the disclosure.

FIG. 39 illustrates a bottom plan view of one explanatory fin cap suitable for use in a payload container in accordance with one or more embodiments of the disclosure.

FIG. 40 illustrates a perspective view of one explanatory fin retaining plate in accordance with one or more embodiments of the disclosure.

Figure 41:
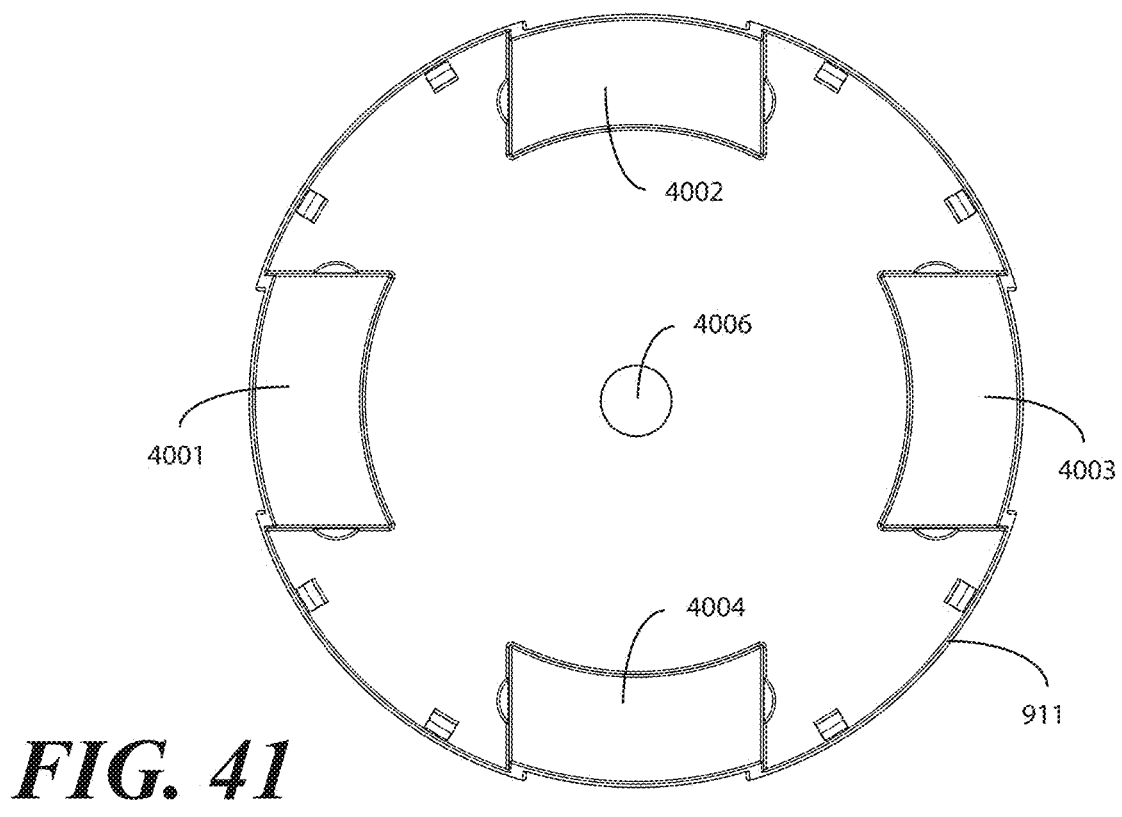

FIG. 41 illustrates a top plan view of one explanatory fin retaining plate in accordance with one or more embodiments of the disclosure.

Figure 42:
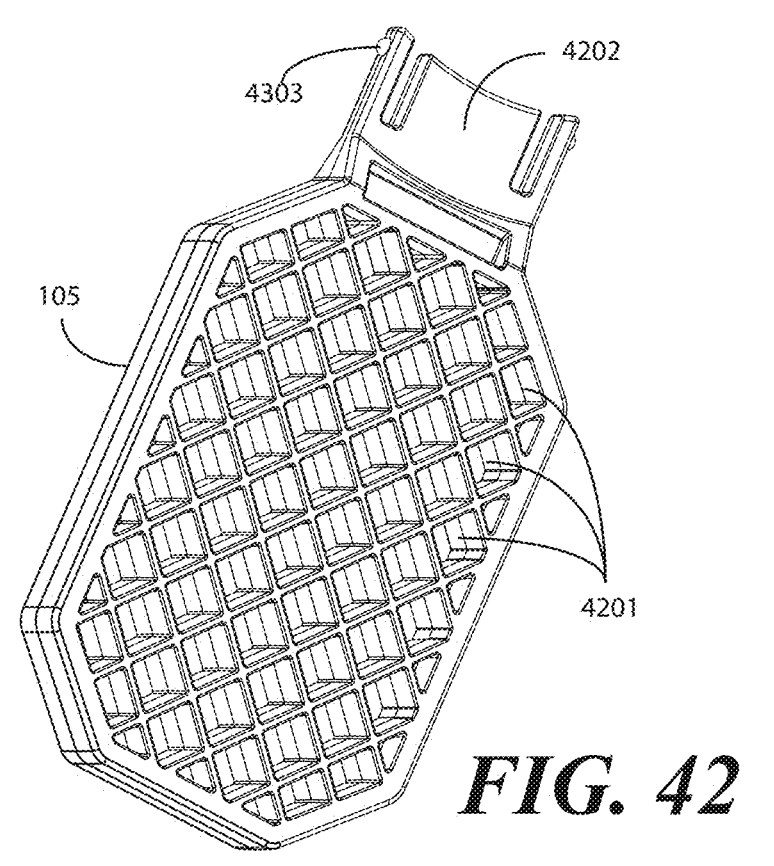

FIG. 42 illustrates a first perspective view of one explanatory grid fin in accordance with one or more embodiments of the disclosure.

FIG. 43 illustrates a side elevation view of one explanatory grid fin in accordance with one or more embodiments of the disclosure.

FIG. 44 illustrates a front elevation view of one explanatory grid fin in accordance with one or more embodiments of the disclosure.

FIG. 45 illustrates a second perspective view of one explanatory grid fin in accordance with one or more embodiments of the disclosure.

Figure 46:
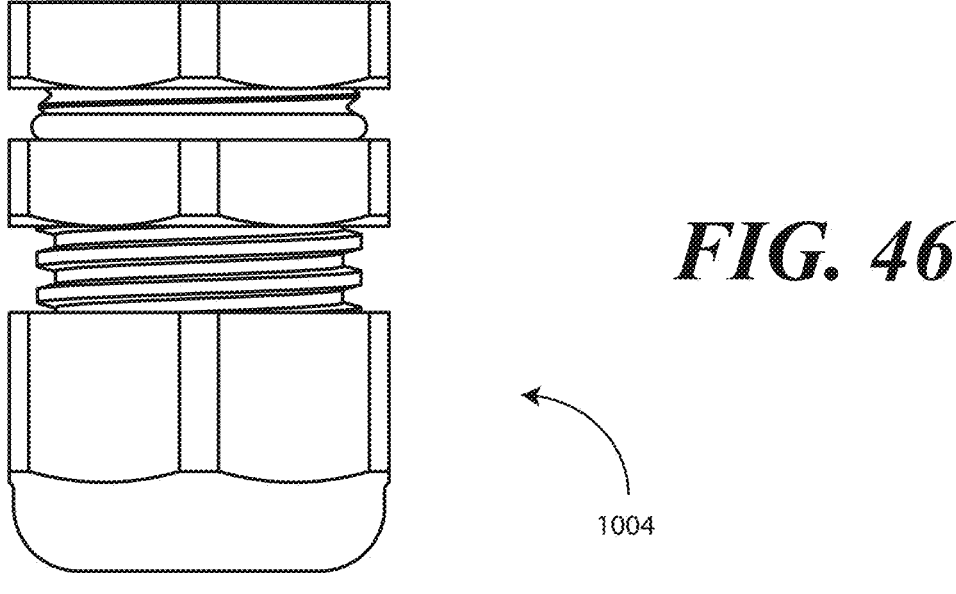

FIG. 46 illustrates a side elevation view of one explanatory cable gland assembly suitable for use in a payload container in accordance with one or more embodiments of the disclosure.

Figure 47:
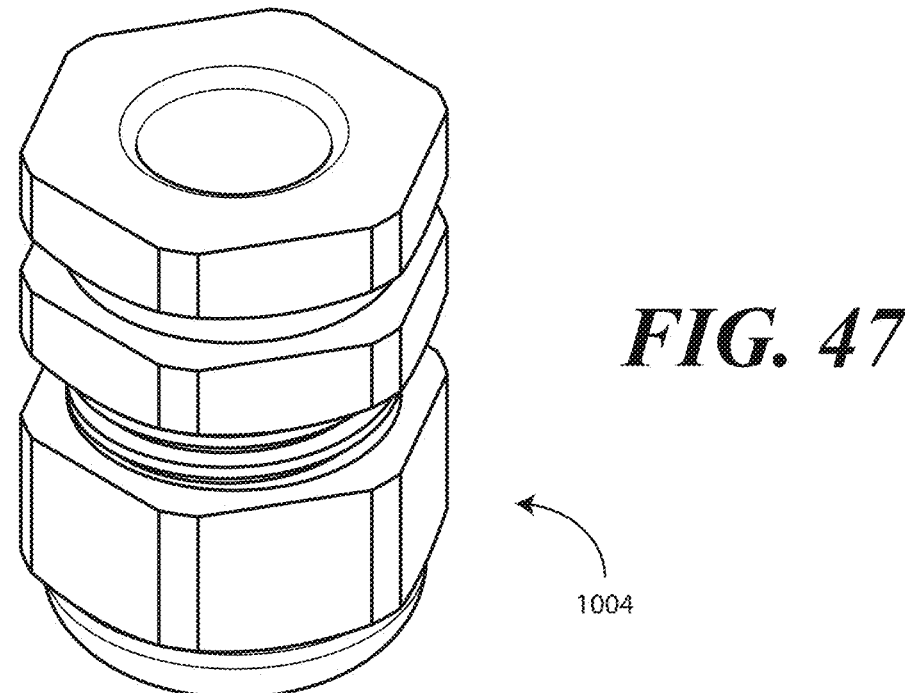

FIG. 47 illustrates a perspective view of one explanatory cable gland assembly suitable for use in a payload container in accordance with one or more embodiments of the disclosure.

Figure 48:

FIG. 48 illustrates a perspective view of one explanatory payload container in a shipping configuration in accordance with one or more embodiments of the disclosure.

Figures 49, 50:
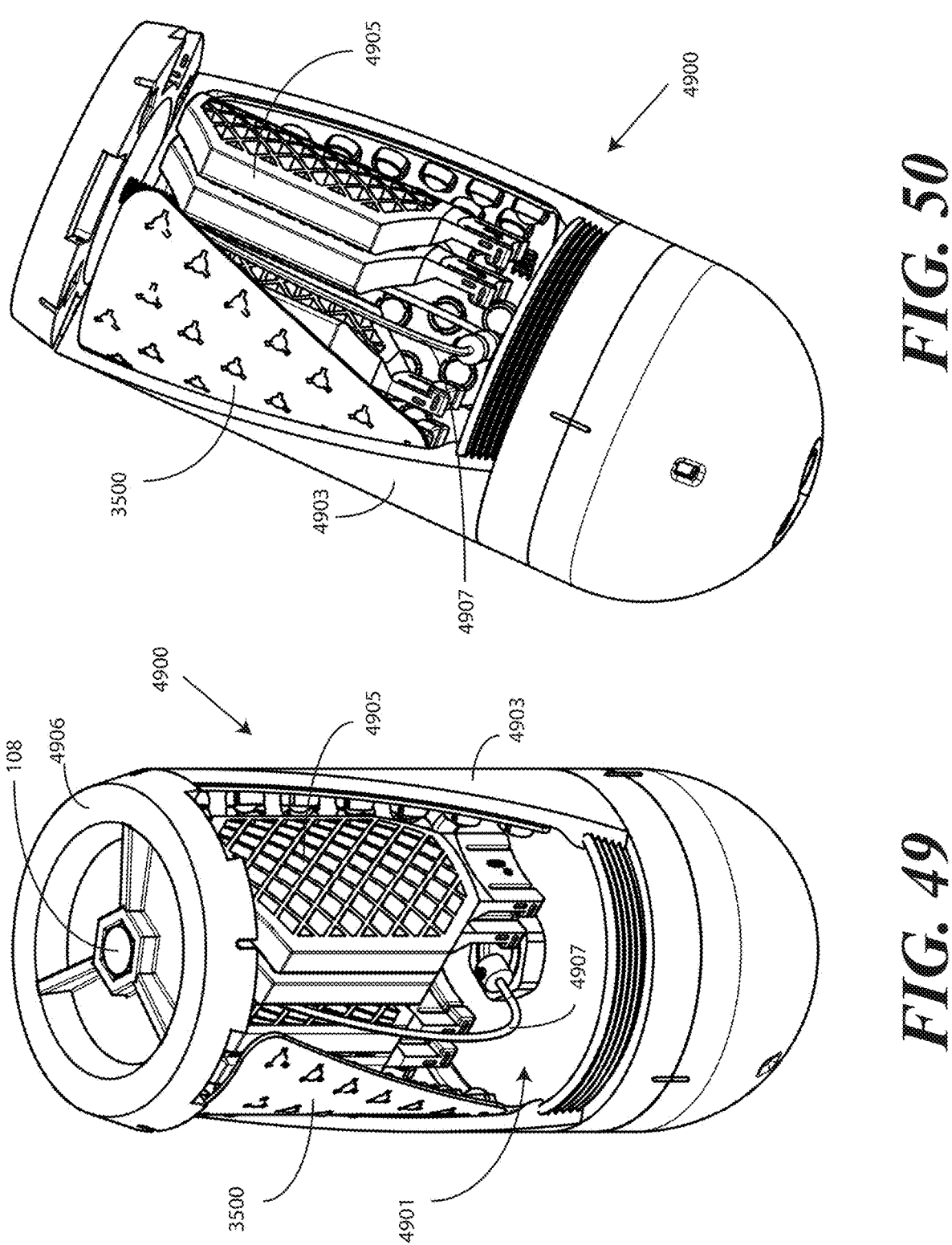

FIG. 49 illustrates a first cutaway view of the payload container in its shipping configuration, with all components necessary for assembly, including fins and aircraft cable(s) nested together inside the cavity of canister for transport compactness, added protection, and improved portability.

FIG. 50 illustrates a second cutaway view of the payload container in its shipping configuration, with all components necessary for assembly, including fins and aircraft cable(s) nested together inside the cavity of canister for transport compactness, added protection, and improved portability.

Figure 51:
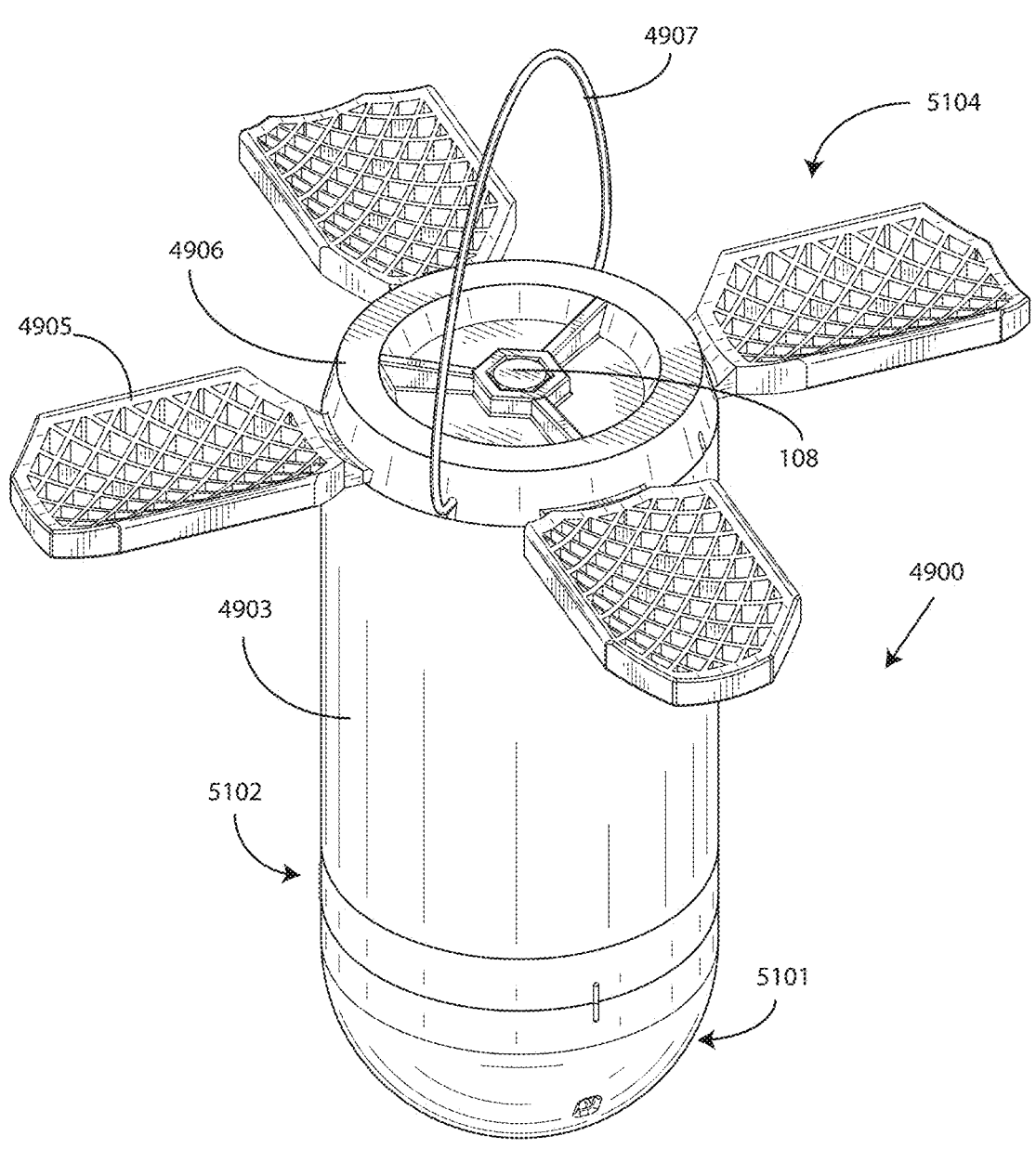

FIG. 51 illustrates a top perspective view of another explanatory payload container in accordance with one or more embodiments of the disclosure.

Figure 52:
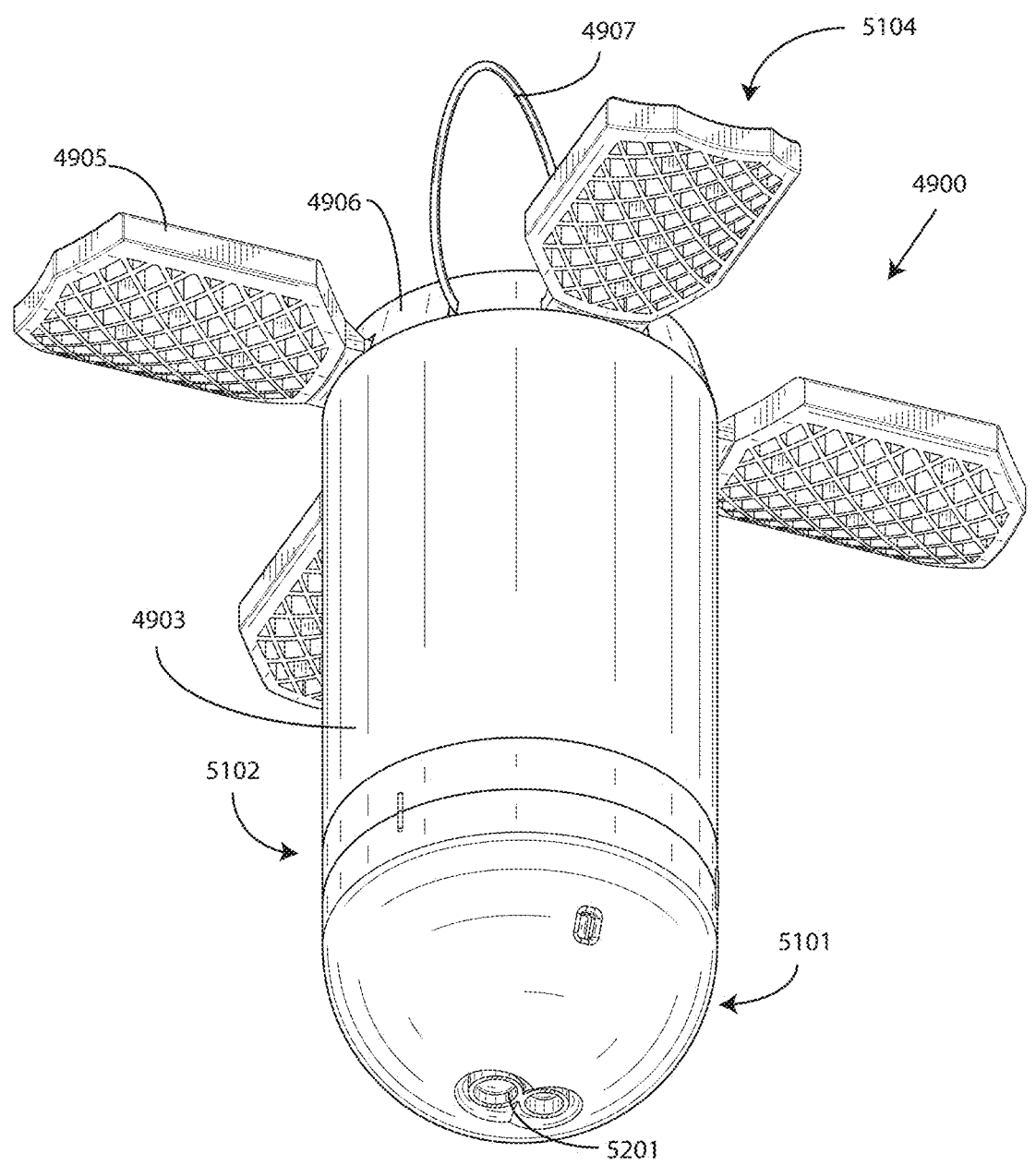

FIG. 52 illustrates a bottom perspective view of another explanatory payload container in accordance with one or more embodiments of the disclosure.

Figure 53:
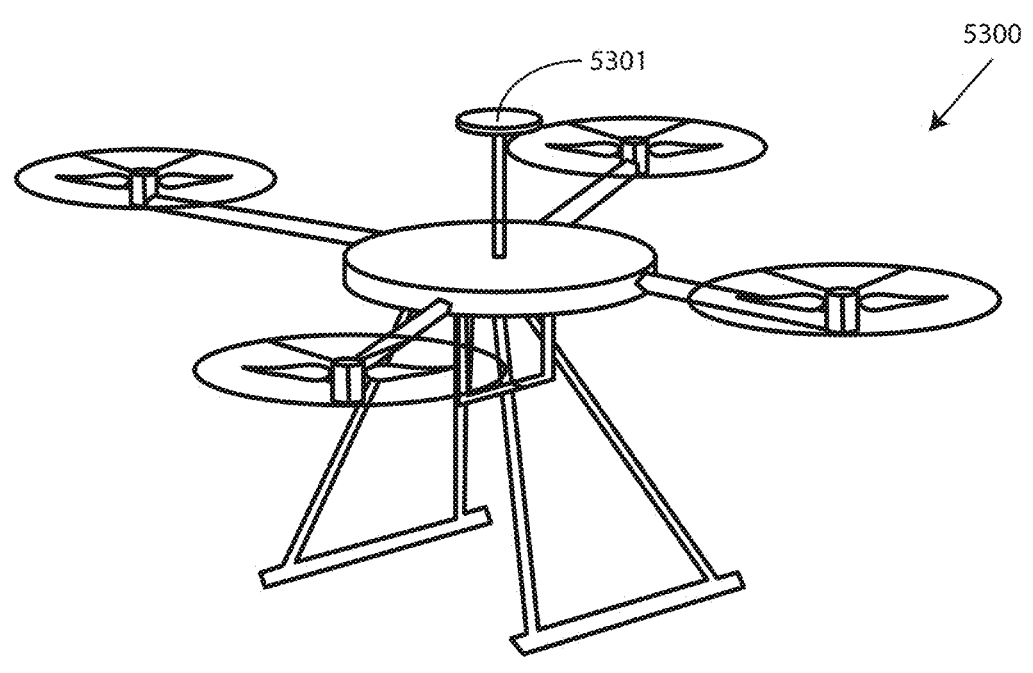

FIG. 53 illustrates one explanatory unmanned aircraft in accordance with one or more embodiments of the disclosure.

Figure 54:
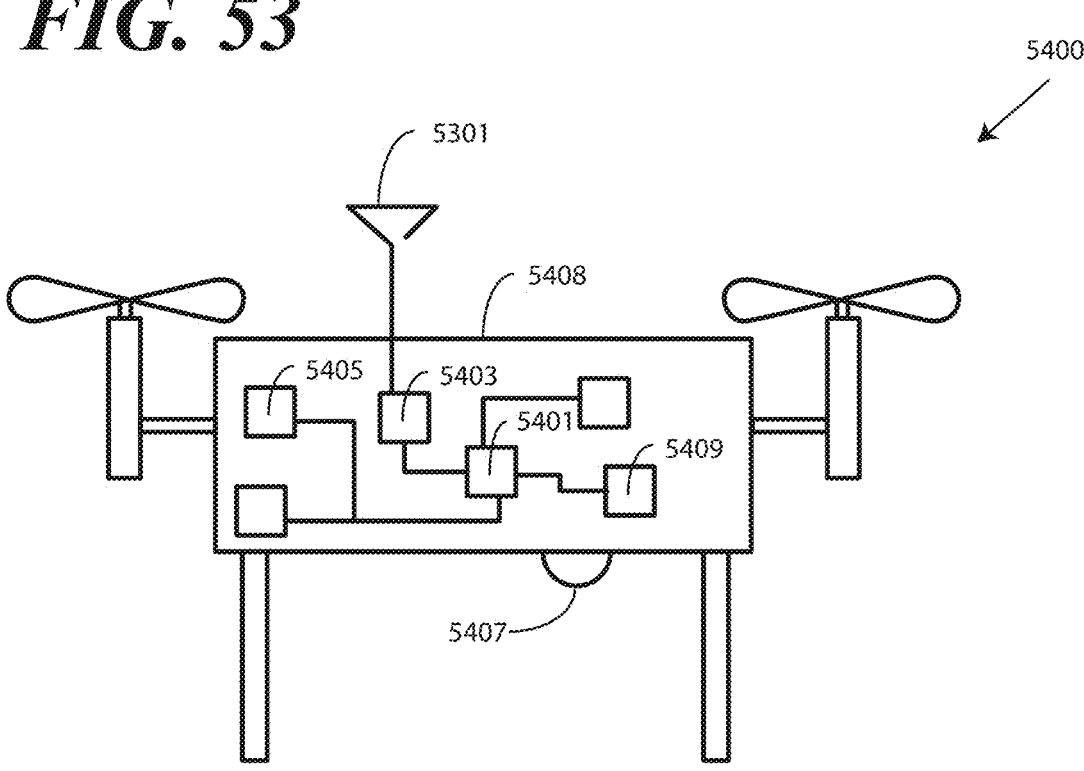

FIG. 54 illustrates a schematic block diagram of one explanatory unmanned aircraft in accordance with one or more embodiments of the disclosure.

Figure 55:
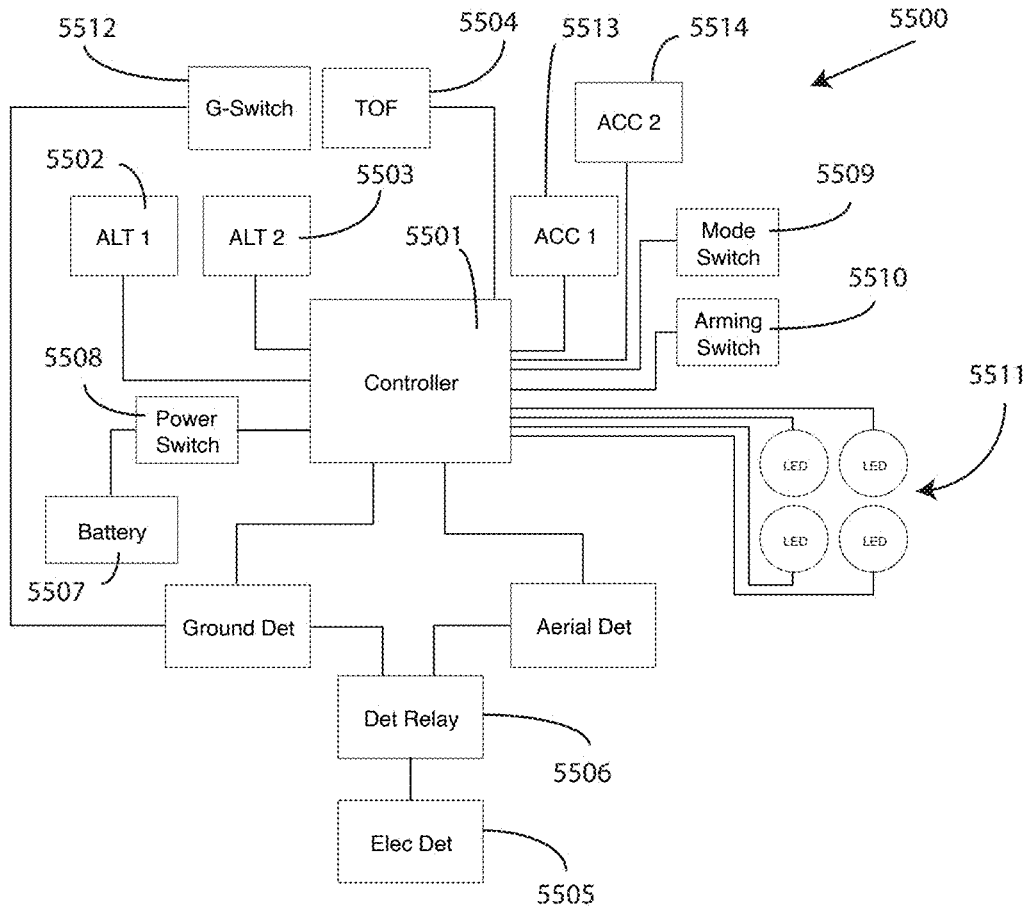

FIG. 55 illustrates explanatory circuit components for an explanatory schematic block diagram for electronic circuitry suitable for use in a payload container in accordance with one or more embodiments of the disclosure.

Figure 56:
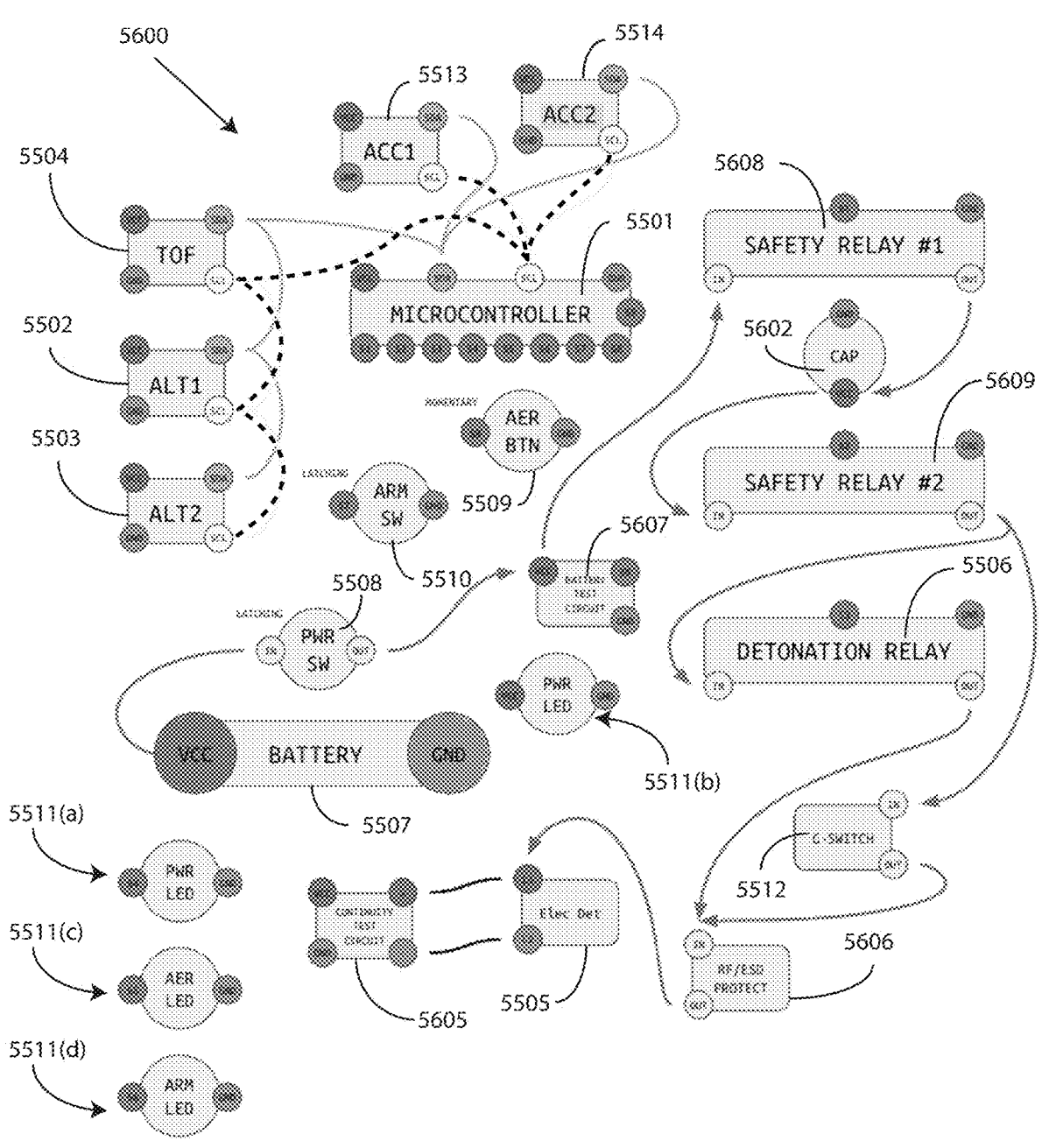

FIG. 56 illustrates explanatory circuit components and signal flows for an explanatory schematic block diagram for electronic circuitry suitable for use in a payload container in accordance with one or more embodiments of the disclosure.

Figure 57:
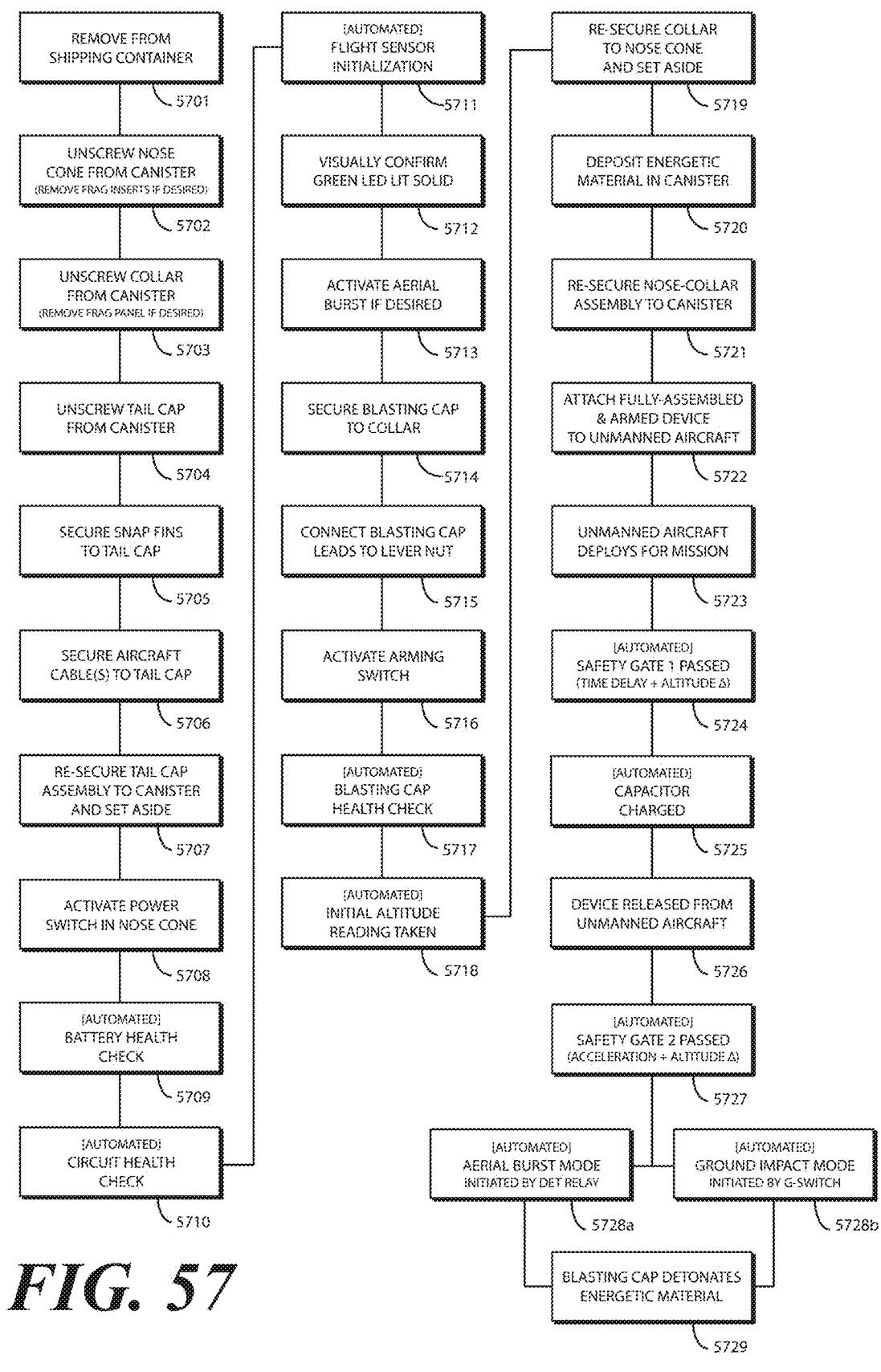

FIG. 57 illustrates one explanatory method in accordance with one or more embodiments of the disclosure.

Figure 58:
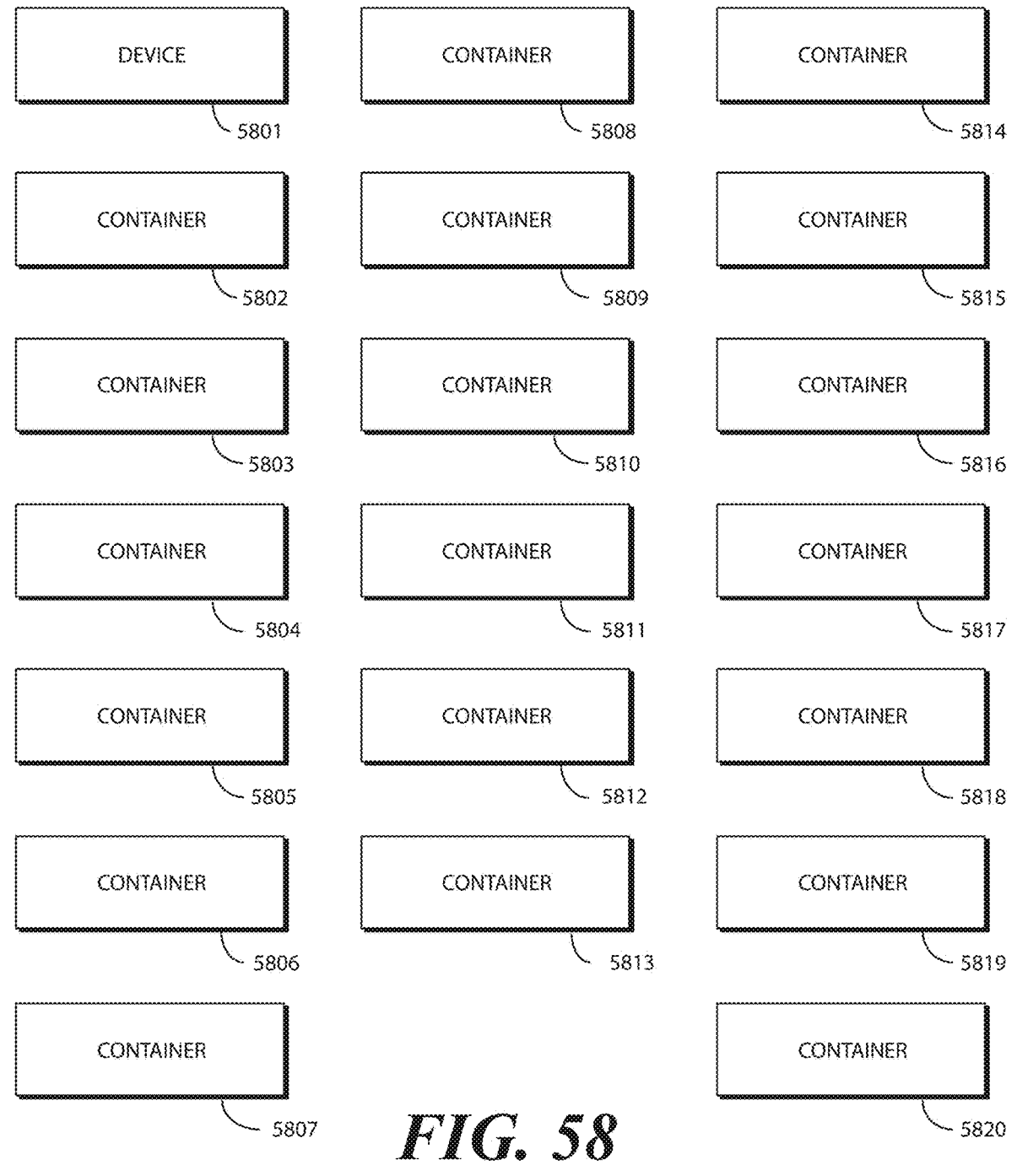

FIG. 58 illustrates various embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to controlling operations of a payload container, when in a deployment mode and not a shipping mode, in accordance with one or more embodiments of the disclosure. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of interacting with payload container contents when in a deployment mode of operation as described herein. The non-processor circuits may include, but are not limited to, accelerometers, altimeters, relays, light emitting devices, switches, signal drivers, clock circuits, power source circuits, and user input devices. As such, these functions may be interpreted as steps of a method to perform control circuit components situated within a payload container when operating in a deployment mode of operation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein when in an electrical context is defined as connected, although not necessarily directly. Also, reference designators shown herein in parenthesis indicate components shown in a figure other than the one in discussion. For example, talking about a device (10) while discussing figure A would refer to an element, 10, shown in figure other than figure A.

As noted above, the use of unmanned vehicles, also known as "drones," is becoming increasingly commonplace. These vehicles can be used in a variety of applications, including aerial, terrestrial, underwater, and surface water operations. When using an unmanned vehicle, a remote user can receive real-time images and other data that allow for reconnaissance, surveillance, and other information gathering capabilities.

With particular focus on aerial applications, the use of small, unmanned aircraft systems (SUAS), including those with vertical take-off and landing (VTOL) configurations, are rapidly emerging as a significant and impactful tool for military operations. These aerial drones provide a military controller with information and "over the horizon" deployment capabilities that allow the military controller to remain far from the battle while still engaging hostile combatants. Indeed, these airborne drones provide the ability to carry out offensive strikes against enemy combatants without putting the military controller in harm's way.

Embodiments of the disclosure advantageously assist in this effort by providing a payload container that can be used in both military and peacetime applications, as well as in de-mining operations during both military and peacetime environments. In one or more embodiments, the payload container can be used as a modular munitions system. However, those of ordinary skill in the art having the benefit of this disclosure will readily recognize that payload containers configured in accordance with embodiments of the disclosure can be used in other applications as well. Illustrating by example, the payload canister can be loaded with flame retardants and used in firefighting applications.

In one or more embodiments, the payload container, sometimes referred to as "Mjolnir," which is the name of the hammer of the thunder god in Norse mythology, is configured as a modular munitions system designed and purpose built for use with SUAS having VTOL capabilities. In one or more embodiments, the payload container is platform agnostic, which means it can be used with a multitude of drones without reconfiguration. The payload container is intuitive in use, easy to deploy, supports multiple energetic materials, e.g., explosives, and is configured logistically to ship worldwide without limitations. The canister fragmentation inserts included in the payload container offer flexibility in that they can be completely removed, used individually, or used in concert as a trio as mission sets dictate. The electronics and communication configurations of payload containers configured in accordance with embodiments of the disclosure allow for selection of aerial burst or impact detonation, thereby providing for flexibility in military threat or mine reduction management.

With reference to military applications, embodiments of the disclosure can be used in a wide variety of operational situations. Illustrating by example, the payload container is suitable for use in military operations such as strategic and opportunistic targeting using a variety of VTOL drone platforms equipped with an actuator, which is a drop mechanism via which the payload container can be dropped from a sUAS.

As drones are generally satellite and locationally guided via global positioning systems (GPS), payload containers configured in accordance with embodiments of the disclosure can be delivered with exceptional precision. When combined with the visual acuity drone sensors provide, embodiments of the disclosure offer engagement opportunities that are safer, more expeditious, more precise, and more destructive that prior art munitions from any time in military conflict history.

Using embodiments of the disclosure, strategic targets or opportunity targets can be prosecuted using aerial burst or impact detonation. The modularity afforded by embodiments of the disclosure provides the following three different configurations to disrupt, displace, or destroy enemy threats:

(1) Non-Fragmentation: In one or more embodiments, the payload container provides no fragmentation beyond the engineering polymer housing and is best used for impact detonation or aerial burst where minimal collateral damage is a priority, such as in disrupting, displacing, or destroying enemy forces in civilian occupied or heavily populated areas;

(2) Directional Fragmentation: In other embodiments, the payload container can provide directed fragmentation in a downward area used with an aerial burst. Use cases are personnel threat prosecution, such as enemy troops in the open in and around vehicles and equipment and destroying suspected minefields on avenues of approach (AoA); and (3) Full Fragmentation: In still other embodiments, the payload container can provide a traditional munition effect used in impact or aerial detonations. Use cases are threat prosecution and destroying enemy personnel and equipment, such as non-armored vehicles and enemy troops in the open.

Payload containers configured in accordance with embodiments of the disclosure can be used in other applications as well, such as demining and unexploded ordinance (UXO) operations. These operations require exhaustive levels of risk mitigation even where technology is used. More directly, the risk of life or limb of the technicians that perform such work, and the potential damage and inoperable rendering of the equipment designed to perform such functions. The aerial burst mode offered by payload containers configured in accordance with embodiments of the disclosure, combined with the directional collar fragmentation insert of the Mjolnir munition system provides varying (material selection dependent) energetic blast waves that produce overpressure with shock front velocity and projectiles to assist in safely detonating mines without human exposure.

Other uses, advantages, and benefits offered by payload containers configured in accordance with embodiments of the disclosure will be described below. Still others will be obvious to those of ordinary skill in the art having the benefit of this disclosure.

In one or more embodiments, a payload container comprises a nose cone electronics hub assembly, a canister assembly, one or more fragmentation inserts, and a collar assembly coupling the nose cone electronics hub assembly to the canister assembly. In one or more embodiments, the canister assembly and the collar assembly house the one or more fragmentation inserts.

A payload container comprises a canister and a deployment D-ring pivotally coupled to the payload container. In one or more embodiments, the deployment D-ring, when pivoted to a position where the deployment D-ring extends distally from an end of the payload container, allows the payload container to be dropped from an unmanned aircraft.

Figure 1:
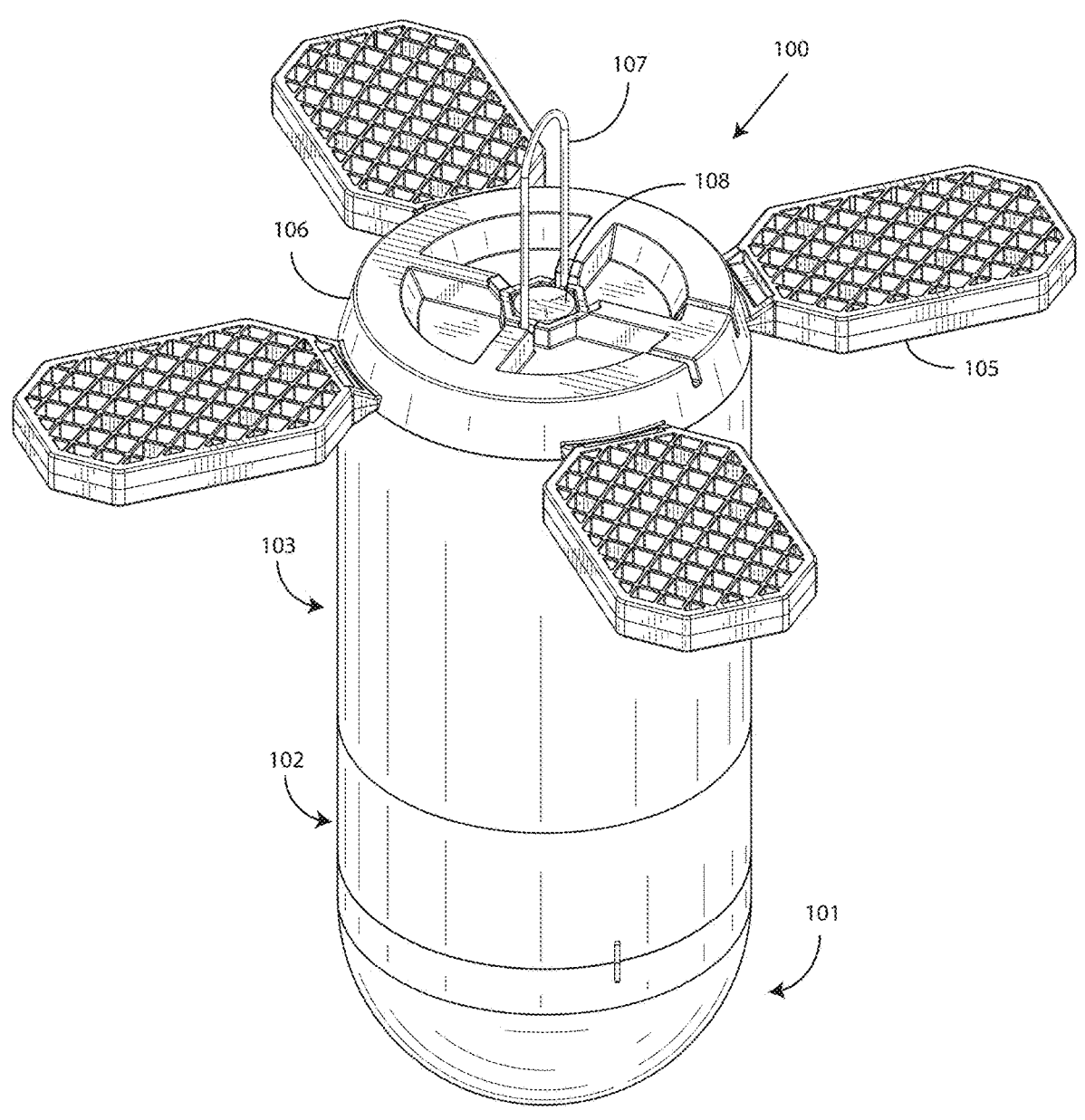
FIG. 1 illustrates a top perspective view of one explanatory payload container in accordance with one or more embodiments of the disclosure.
Figure 2:
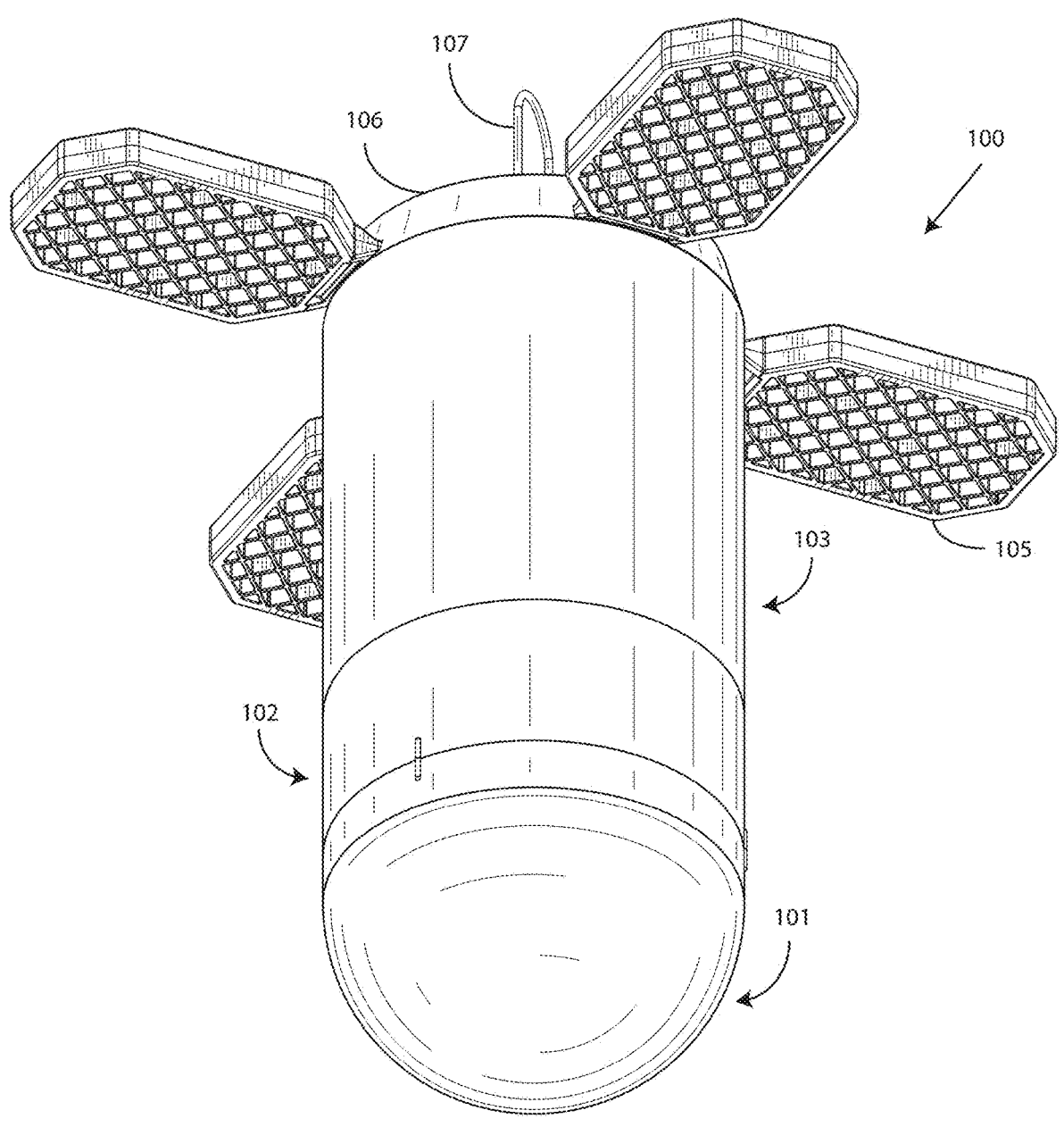
FIG. 2 illustrates a bottom perspective view of one explanatory payload container in accordance with one or more embodiments of the disclosure.
Figure 3:
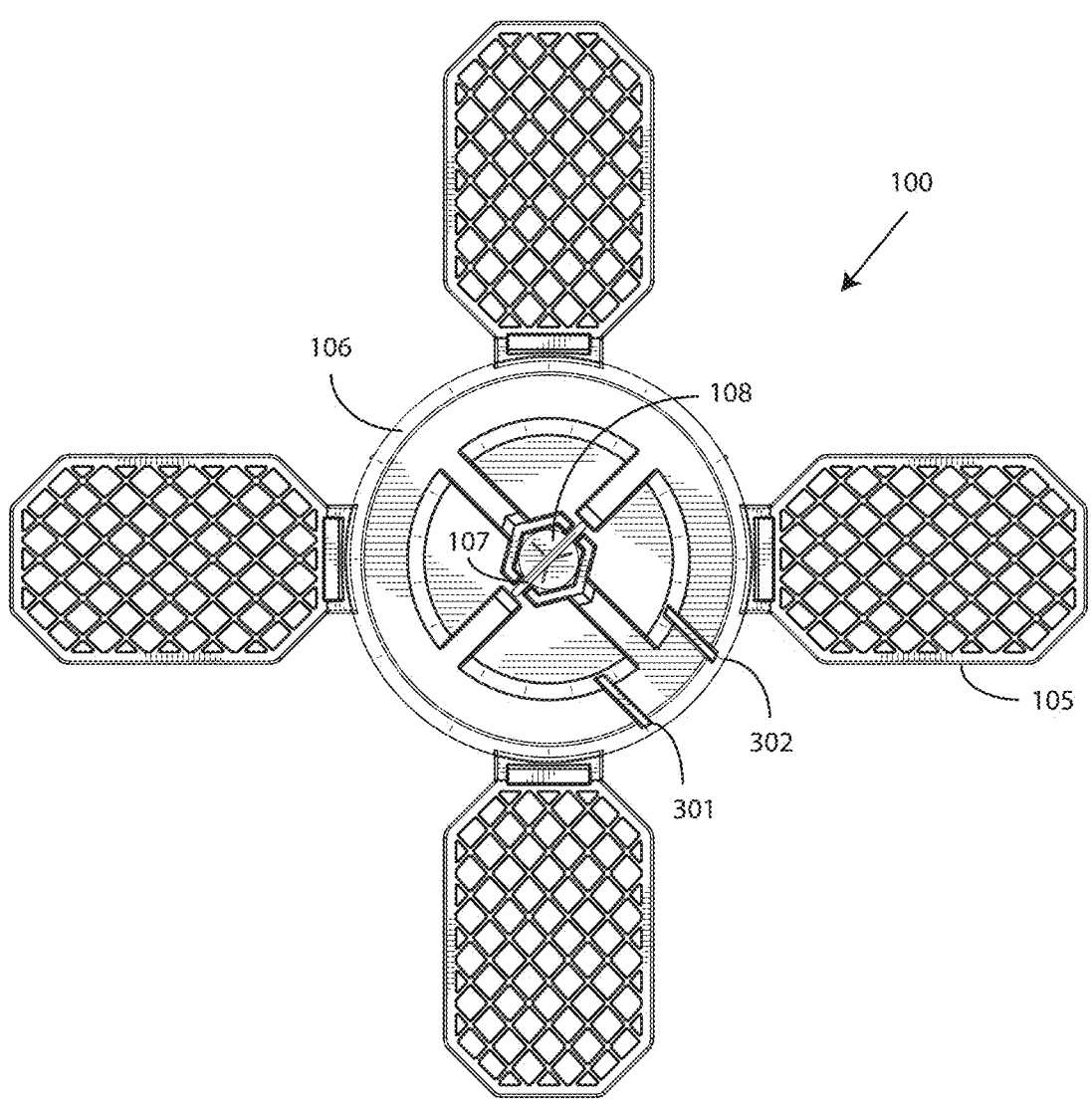
FIG. 3 illustrates a top plan view of one explanatory payload container in accordance with one or more embodiments of the disclosure.
Figure 4:
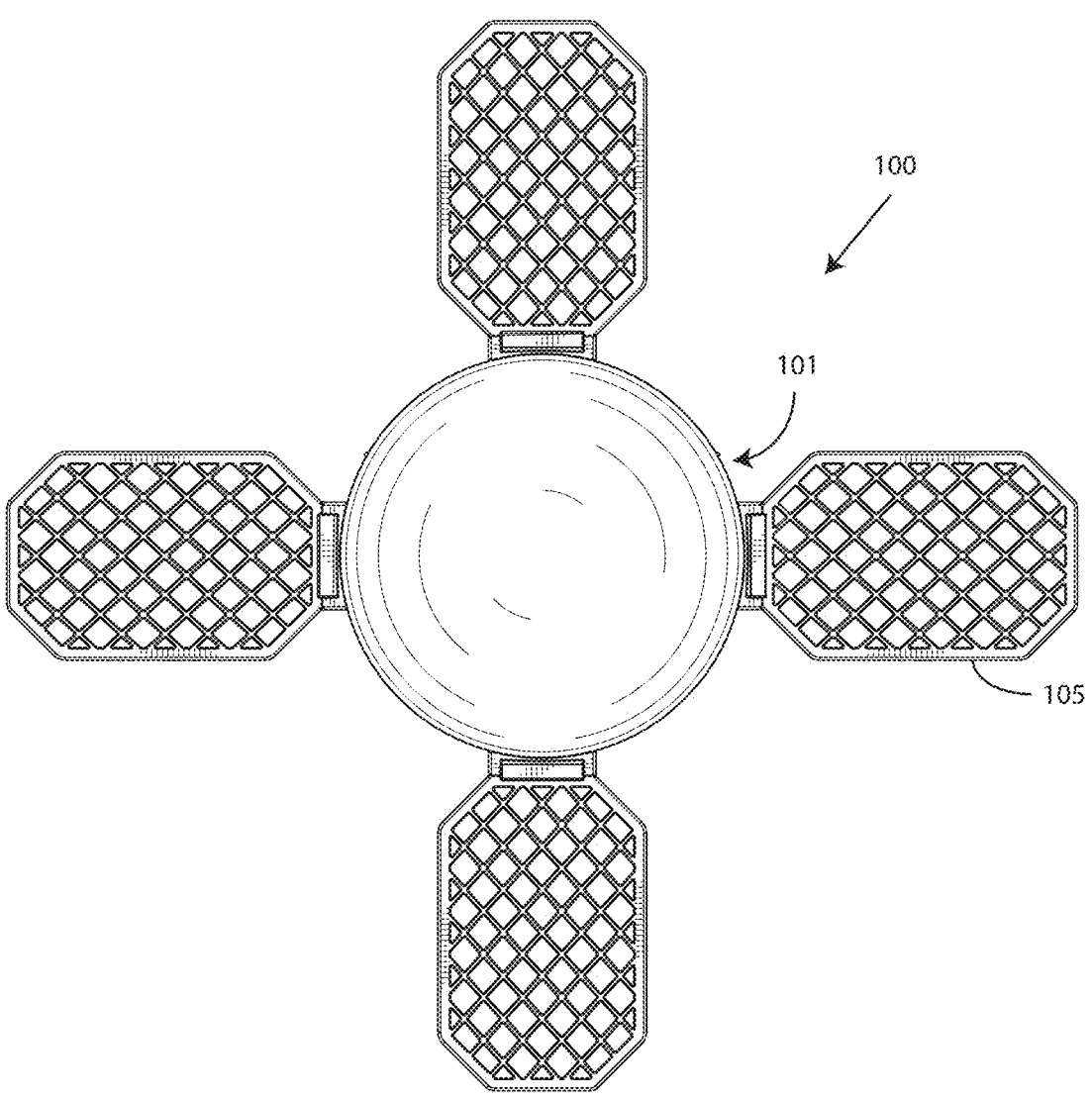
FIG. 4 illustrates a bottom plan view of one explanatory payload container in accordance with one or more embodiments of the disclosure.
Figure 5:
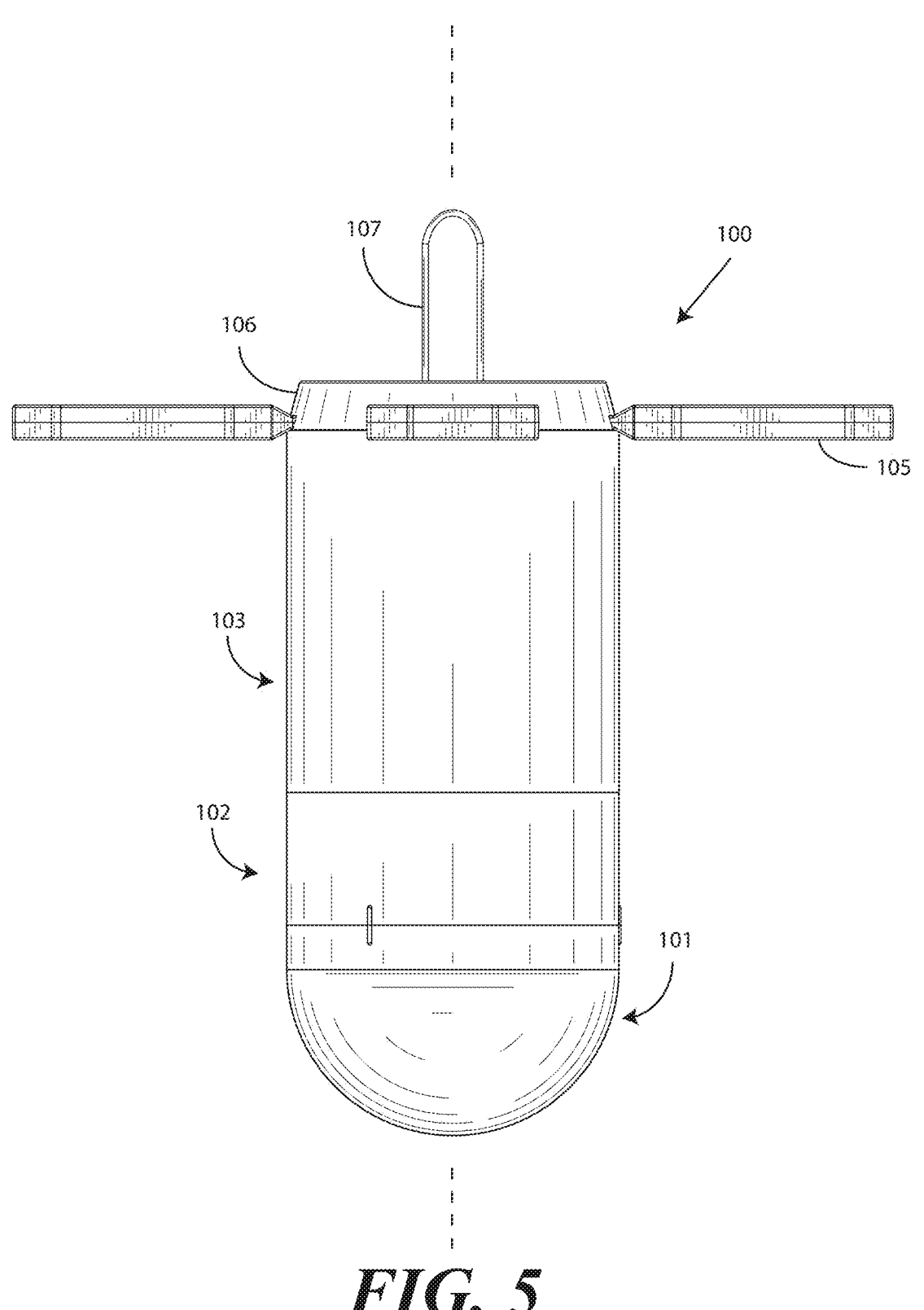
FIG. 5 is a left side elevation view of one explanatory payload container in accordance with one or more embodiments of the disclosure.
Figure 6:
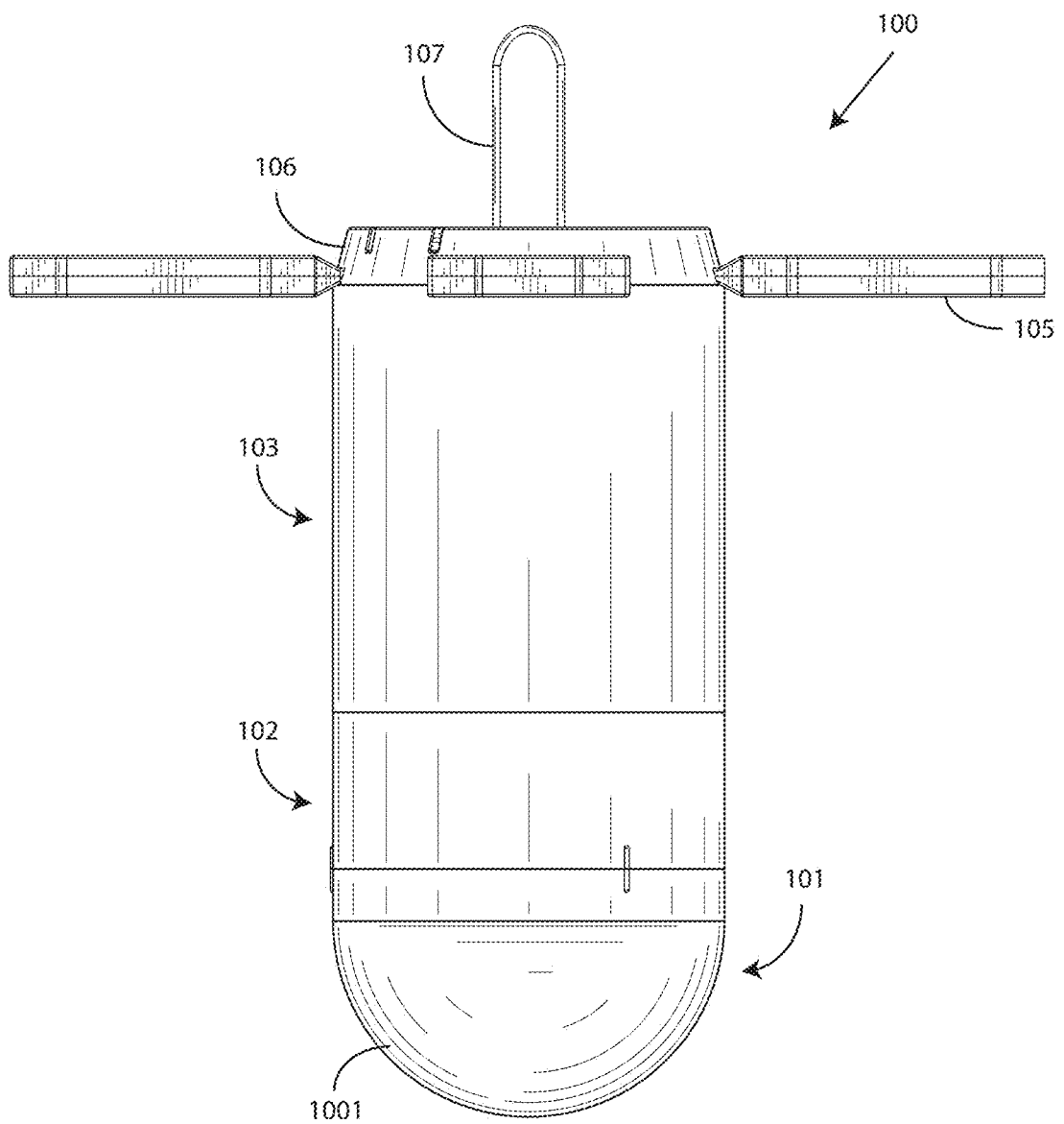
FIG. 6 illustrates a right-side elevation view of one explanatory payload container in accordance with one or more embodiments of the disclosure.
Figure 7:
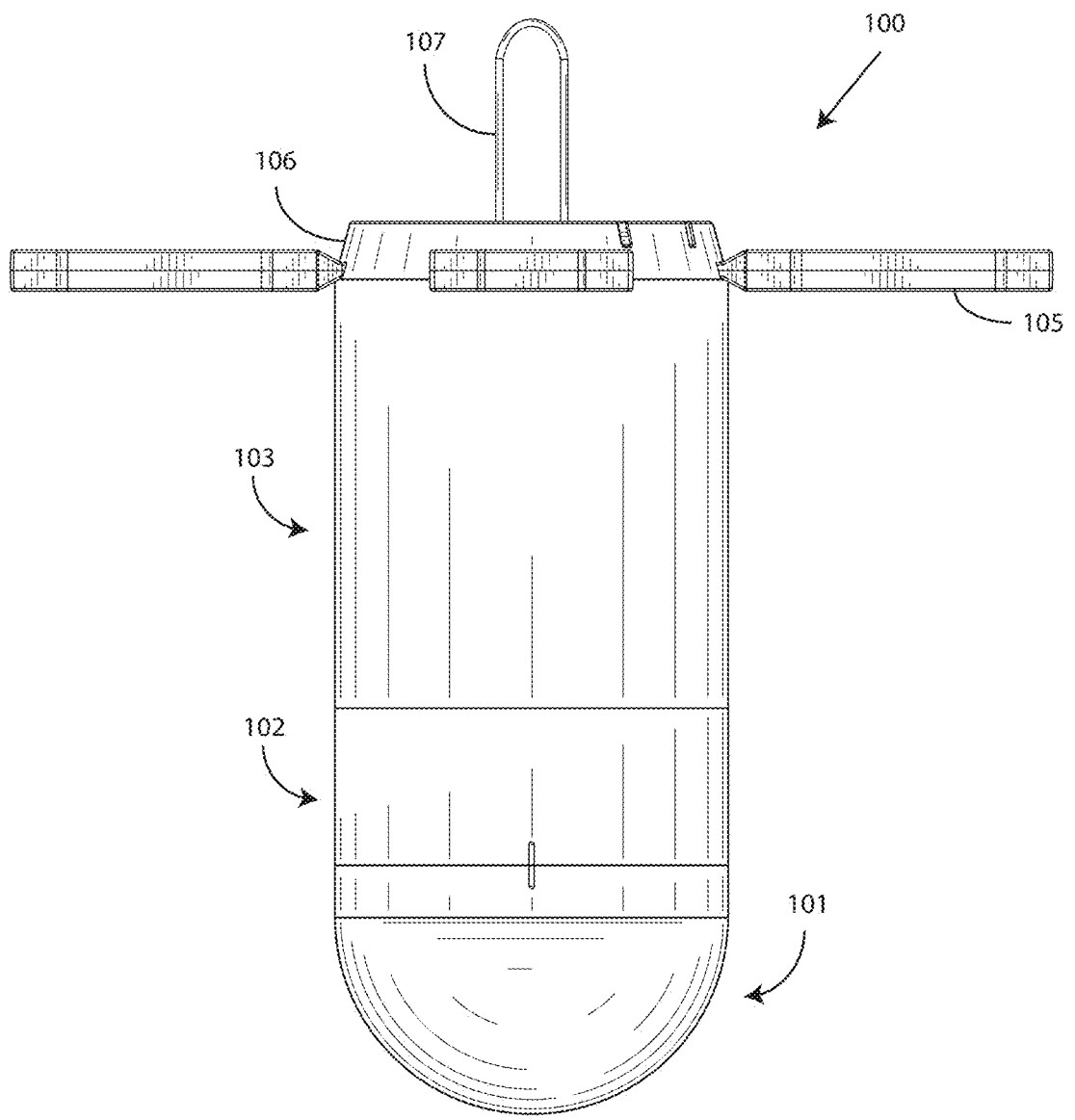
FIG. 7 illustrates a front elevation view of one explanatory payload container in accordance with one or more embodiments of the disclosure.
Figure 8:
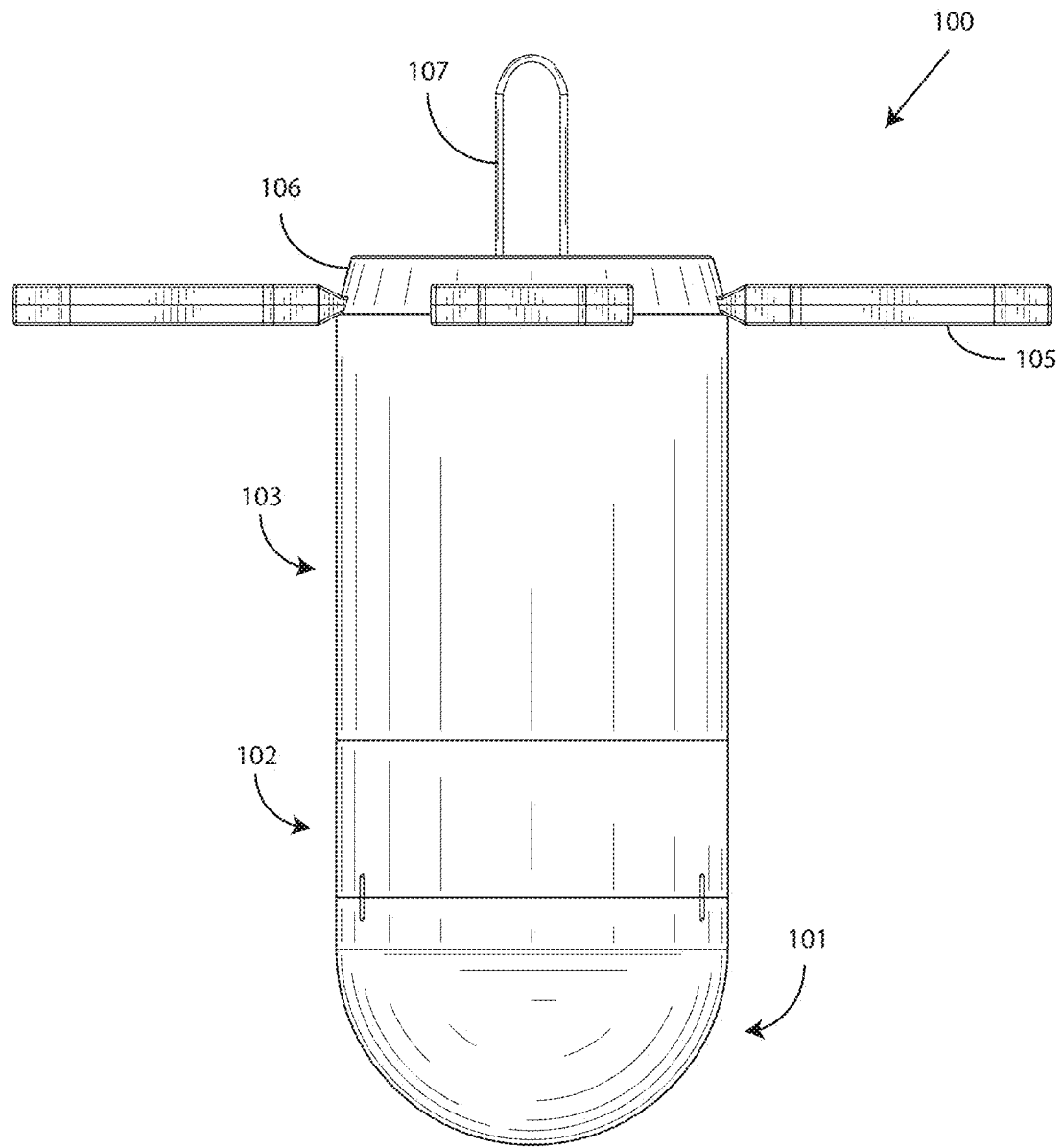
FIG. 8 illustrates a rear elevation view of one explanatory payload container in accordance with one or more embodiments of the disclosure.

Turning now to FIGS. 1-8, illustrated therein is one explanatory payload container 100 configured in accordance with one or more embodiments of the disclosure. FIG. 1 illustrates a top perspective view of the payload container 100, while FIG. 2 illustrates a bottom perspective view of the payload container 100. FIG. 3 illustrates a top plan view of the payload container 100, while FIG. 4 illustrates a bottom plan view of the payload container 100. FIG. 5 illustrates a left side elevation view of the payload container 100, while FIG. 6 illustrates a right-side elevation view of the payload container 100. FIG. 7 illustrates a front elevation view of the payload container 100 and FIG. 8 illustrates a rear elevation view of the payload container 100. The payload container 100 of FIGS. 1-8, when used in a military offensive application, is sometimes referred to as a "modular munition system."

As shown in these figures, the payload container 100 is shaped (in the elevation views of FIGS. 5-8) like a pistol cartridge with an inwardly tapering top. This pistol cartridge shape is defined by a cylindrical canister assembly 103, a cylindrical collar assembly 102, a hemispherical nose extending from a cylindrical base of a nose cone electronics hub assembly 101, and a frustoconical (again as viewed in the elevation views of FIGS. 5-8) fin cap 106 that retains for grid fins 105 in place when the payload container 100 is in the deployment configuration of FIGS. 1-8. A threaded screw 108 mechanically coupled the fin cap 106 to the canister assembly 103 in this illustrative embodiment.

This frustoconical shape causes the girth of the payload container 100 defined by the diameter of the canister assembly 103 and collar assembly 102 to narrow above the connection points of the grid fins 105 between the canister assembly 103 and fin cap 106. The pistol cartridge shape is disrupted by the grid fins 105 attached to the closed end of the canister assembly 103 and a deployment D-ring 107 extending from the fin cap 106 that retains the grid fins 105 against the canister assembly 103.

From top to bottom, the principal components of the payload container 100 include the fin cap 106 and its pivotable deployment D-ring 107, the grid fins 105, a fin retaining plate (not shown in FIGS. 1-8, but shown in detail in FIGS. 40-41) that is situated between the fin cap 106 and the grid fins 105, the canister assembly 103 to which the fin cap 106 is coupled at a closed end, the collar assembly 102, which is coupled to the canister assembly 103 at an open end, and the nose cone electronics hub assembly 101.

More detailed views of the canister of the canister assembly 103 are illustrated in FIGS. 27-28. Detailed views of the nose cone that defines the outer housing of the nose cone electronics hub assembly 101 are illustrated in FIGS. 11-15. Detailed views of the collar housing of the collar assembly 102 are illustrated in FIGS. 17-20.

In one or more embodiments, each of these components is separable from the other so that the payload container 100 can be both transformed back and forth between a shipping configuration (shown below in FIGS. 48-50) and the deployment configuration shown in FIGS. 1-8. In one or more embodiments, this can be done by hand, quickly and simply, and without the use of any tools. Illustrating by example, in one or more embodiments the nose cone electronics hub assembly 101 includes a bayonet-style connector that allows it to be rotated upon a corresponding connector integrated into the collar assembly 102.

Similarly, in one or more embodiments the collar assembly 102 has a threaded connector that couples to a corresponding threaded connector situated at the open end of the canister assembly 103. In addition to this coupling, in one or more embodiments a cable gland assembly (not shown in FIGS. 1-8, but shown in detail in FIGS. 46-47) can pass through an aperture defined by the collar assembly 102 to not only allow electrical conductors to pass through the cable gland assembly between electronics components situated within the nose cone electronics hub assembly 101 and a payload positioned in the canister (one example of which would be explosive materials when the payload container 100 is being used as a tactical weapon), but to also couple an optional collar fragmentation insert (not shown in FIGS. 1-8, but shown in detail below in FIGS. 23-26) to the collar assembly 102.

In the illustrative embodiment of FIGS. 1-8, the deployment D-ring 107 is pivotally coupled to the fin cap 106. In one or more embodiments, the deployment D-ring 107 can be pivoted between a shipping configuration (shown below in FIGS. 48-50), where it situates within deployment D-ring recesses 301,302 and abuts a surface of the fin cap 106, and a deployment configuration of FIGS. 1-8 where it extends distally from the fin cap 106. When in the deployment configuration, a flat side of the deployment D-ring 107 abuts the fin cap 106 while a round side of the deployment D-ring 107 is situated distally away from the fin cap 106 at a terminal side of the deployment D-ring 107. When in the deployment configuration, the deployment D-ring 107 functions as the mechanical connection to a SUAS.

In other embodiments, one example of which is shown below in FIGS. 51-52, the deployment D-ring 107 is replaced by an aircraft cable (5107) that acts as the mechanical connection to the SUAS. Where used, the aircraft cable (5107) functions similarly to the deployment D-ring 107 in that it hooks to the payload container 100 to a SUAS so that the payload container 100 can be released over the designated target. While one deployment D-ring 107 is shown in FIGS. 1-8 and one aircraft cable (5107) is shown in FIGS. 51-52, two rings or cables can be used as well. Other SUAS connectors suitable for mechanically connecting the payload container 100 to a SUAS will be obvious to those of ordinary skill in the art having the benefit of this disclosure.

Figure 9:
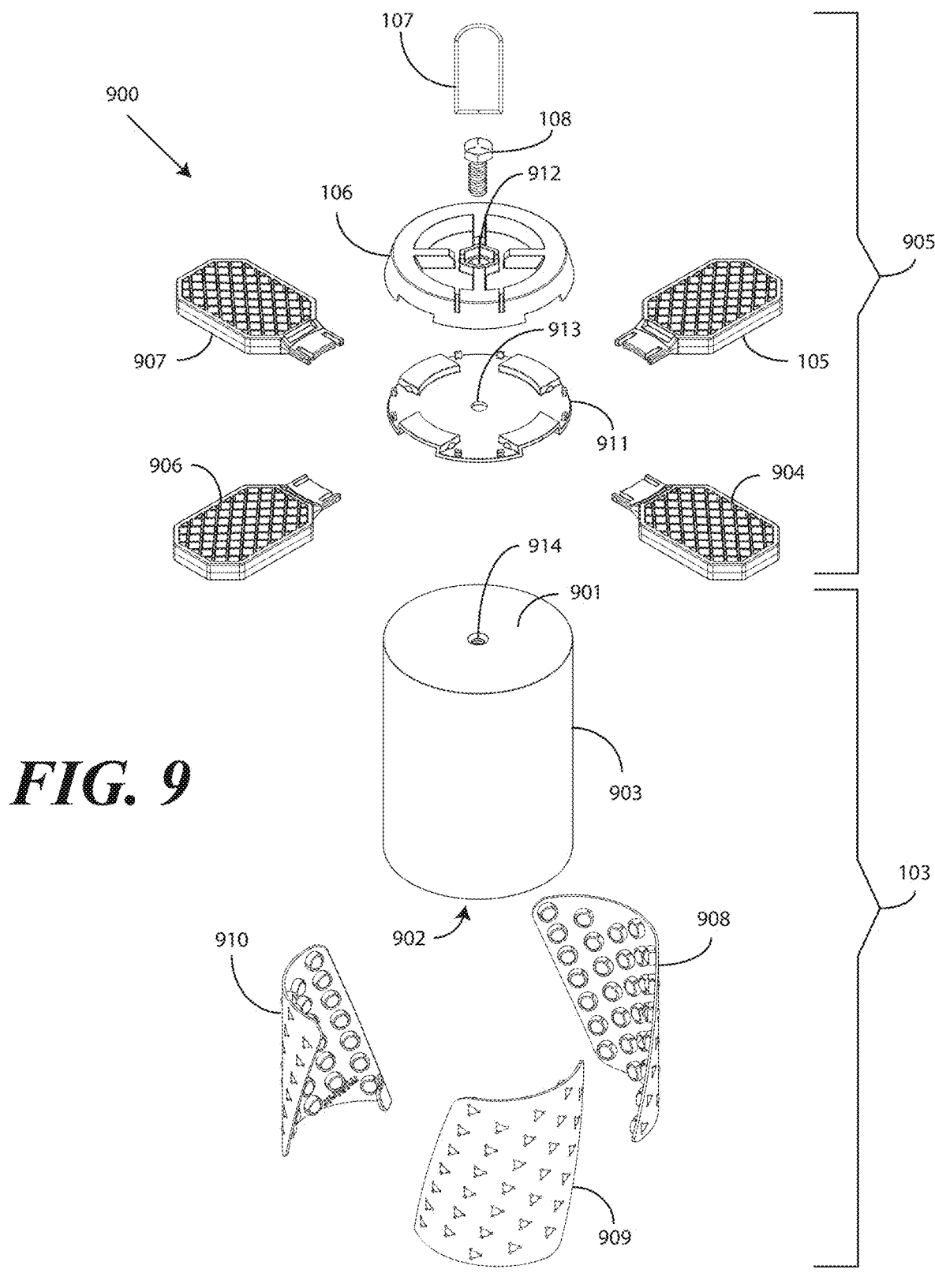
FIG. 9 illustrates an exploded view of a first portion of one explanatory payload container in accordance with one or more embodiments of the disclosure.
Figure 10:
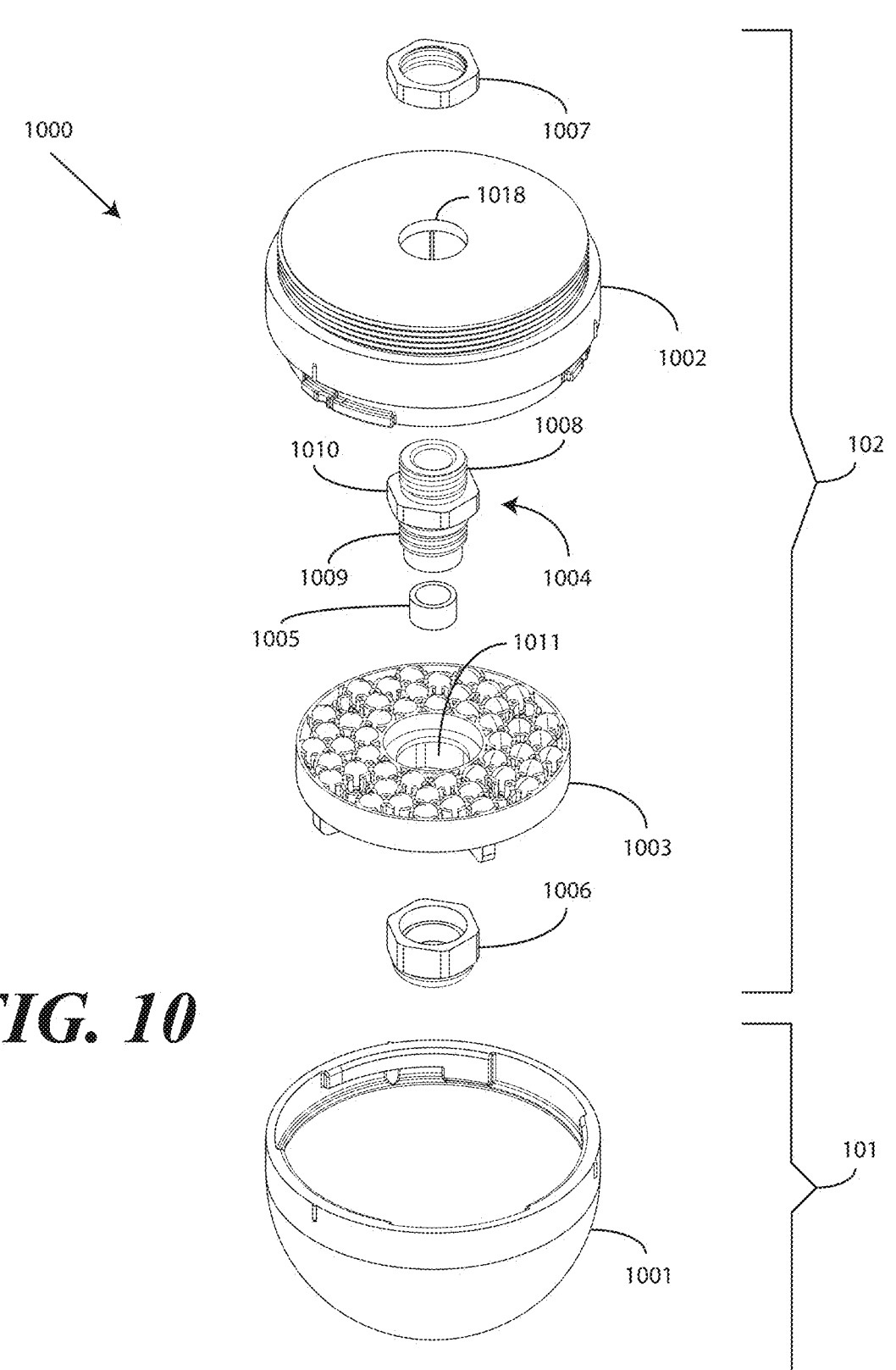
FIG. 10 illustrates an exploded view of a second portion of one explanatory payload container in accordance with one or more embodiments of the disclosure.

Turning now to FIGS. 9 and 10, illustrated therein are exploded views of the payload container (100) showing its constituent components, and more particularly to the combination of the components shown in FIGS. 1-8 and the other components that were not visible but that, when combined with the components of FIGS. 1-8, define a payload container deployment assembly. FIG. 9 illustrates an exploded view of an upper portion 900 of the payload container (100), while FIG. 10 illustrates an exploded view of a lower portion 1000 of the payload container (100).

As noted above, in one or more embodiments the payload container (100) generally comprises a nose cone electronics hub assembly 101, the collar assembly 102 coupled mechanically to the nose cone electronics hub assembly 101, and a canister assembly 103 that defines the main body of the payload container 100. As shown in FIG. 9, in one or more embodiments the payload container 100 also includes an end cap assembly 905 coupled to a closed end 901 of a canister 903 of the canister assembly 103.

Beginning with the end cap assembly 905, in one or more embodiments this section of the payload container (100) includes four grid fins 105,904,906,907, a fin retaining plate 911 that situates between the closed end 901 of the canister 903 and the fin cap 106, the fin cap 106 itself, the threaded screw 108, and the deployment D-ring 107. In one or more embodiments, the threaded screw 108 pass through apertures 912,913 defined by the fin cap 106 and fin retaining plate 911, respectively, to engage a threaded aperture 914 defined by the closed end 901 of the canister 903 of the canister assembly 103.

In one or more embodiments, the end cap assembly 905 consists of eight parts: the four grid fins 105, the fin cap 106, deployment D-ring 107, a fin retaining plate 911 situated beneath the fin cap 106, and the threaded screw 108. An aircraft cable (5107) can be included as well, as is the case with another embodiment described below with reference to FIGS. 51-52 below.

The canister assembly 103 comprises the canister 903 with its open end 902 and closed end 901 defining the threaded aperture 914 that engages the threaded screw 108 to retain the end cap assembly to the canister assembly 103. In one or more embodiments, the canister assembly 103 optionally also includes a plurality of canister fragmentation inserts 908,909,910 that situate together to insert within the canister 903 and abut an interior perimeter wall of the canister 903 when the payload container (100) is in either the deployment configuration or the shipping configuration.

In one or more embodiments, the canister 903 defines a central body portion of the payload container (100) and is configured as a hollow cylinder. Illustrative dimensions for the canister 903 include a length of about one hundred millimeters and a width of about seventy-five millimeters.

In one or more embodiments, the canister 903 is designed to house the grid fins 105, the canister fragmentation inserts 908,909,910, and optionally other components when the payload container 100 is configured in the shipping configuration. In the field, an end user can withdraw these components and assemble the payload container in a deployment configuration.

In one or more embodiments, converting the payload container from the shipping confirmation to the deployment configuration includes positioning explosive materials within the canister 903 for its intended use. In one or more embodiments, the canister 903 can be constructed of various engineering polymers or various metals.

As shown in FIG. 10, in this illustrative embodiment the collar assembly 102 comprises a collar 1002, the cable gland assembly 1004, and optionally a collar fragmentation insert 1003. In this illustrative embodiment the cable gland assembly 1004 includes an interior sleeve 1005, an upper nut 1007, and a lower nut 1006.

In one or more embodiments, the cable gland assembly 1004 and its interior sleeve 1005 pass through an aperture 1018 defined by the collar 1002. The upper nut 1007 then couples to a threaded upper portion 1008 of the cable gland assembly 1004 to retain the cable gland assembly 1004 to the collar 1002, with a hexagonal baffle 1010 biased against an underside of the collar 1002.

The hollow bodies of the cable gland assembly 1004 and the interior sleeve 1005 allow electrical conductors to pass through the cable gland assembly 1004 between electronics components situated within the nose cone electronics hub assembly 101 and a payload positioned in the canister 903 (one example of which would be explosive materials when the payload container (100) is being used as a tactical weapon).

The collar assembly 102 can also optionally include a collar fragmentation insert 1003. Where included the cable gland assembly 1004 can pass through a center aperture 1011 of the collar fragmentation insert 1003. The lower nut 1006 can then couple to a lower threaded portion 1009 of the cable gland assembly 1004 to retain the optional collar fragmentation insert 1003 against the underside of the collar 1002. The inclusion of the cable gland assembly 1004 works to prevent bunching of a cable that passes through a cable gland assembly 1004 to electrically couple the electronic components situated within the nose cone electronics hub assembly 101 and a payload situated within the canister 903.

In one or more embodiments, the nose cone electronics hub assembly 101 is configured to house all electronic components and energy sources that will be included with the payload container (100). In one or more embodiments, these electronic components and energy sources are situated within a nose cone 1001 of the nose cone electronics hub assembly 101.

A system schematic (5600) illustrating one explanatory configuration for these components is shown below in FIG. 56. Others will be obvious to those of ordinary skill in the art having the benefit of this disclosure. In one or more embodiments, the electronic components and energy sources situated within the nose cone electronics hub assembly 101 are secured within the nose cone 1001 in an epoxy potting compound to ensure stability and durability during deployment.

Now that the constituent parts of one explanatory payload container (100) have been identified by the exploded views of FIGS. 9-10, attention will now be turned to additional details that are well suited to one or more particular configurations of each component. While these configurations work well in practice, it should be noted that numerous others will be obvious to those of ordinary skill in the art having the benefit of this disclosure.

Figure 11:
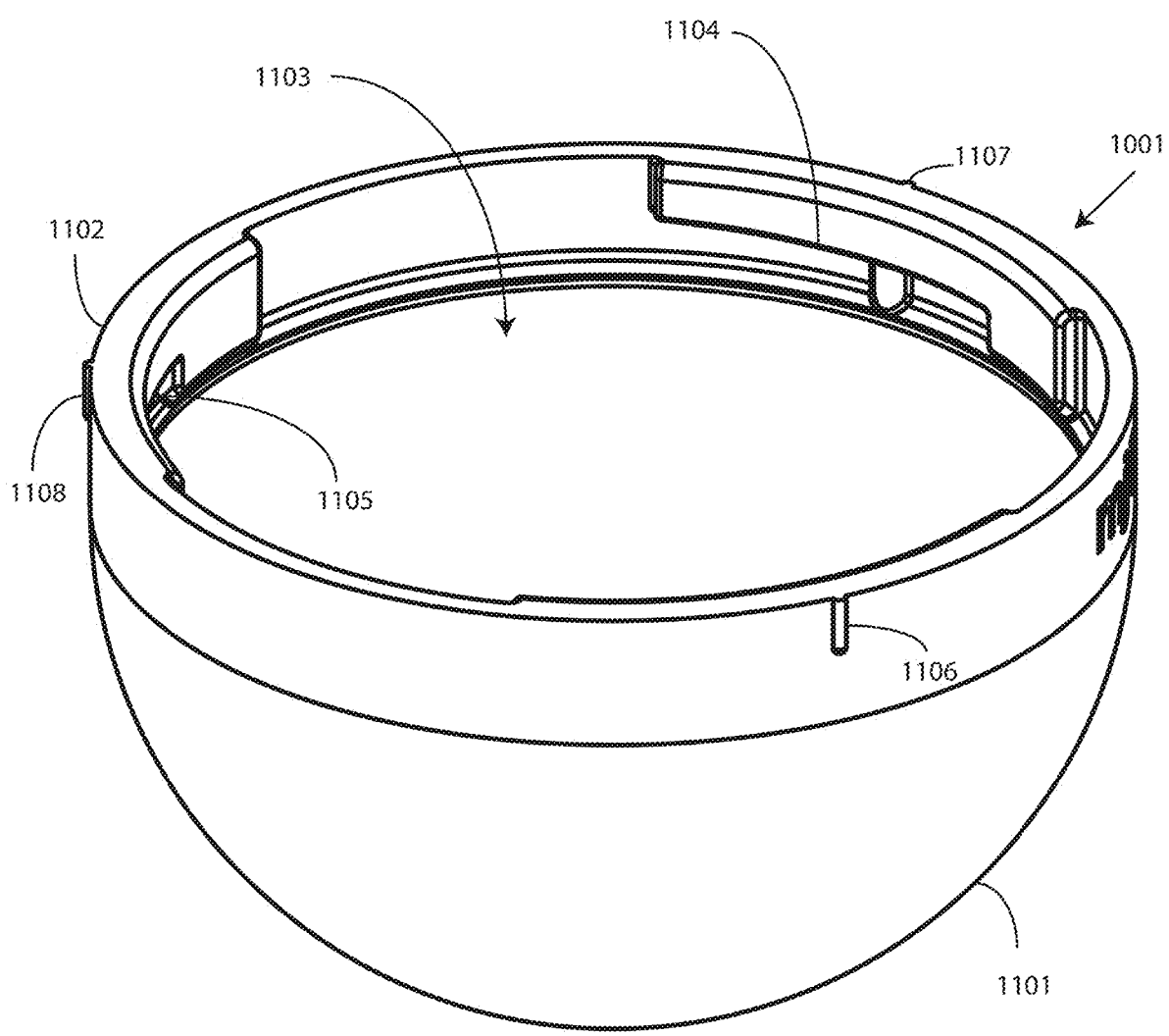
FIG. 11 illustrates a perspective view of one explanatory nose cone suitable for use in a payload container in accordance with one or more embodiments of the disclosure.
Figures 12, 13, 14, 15:
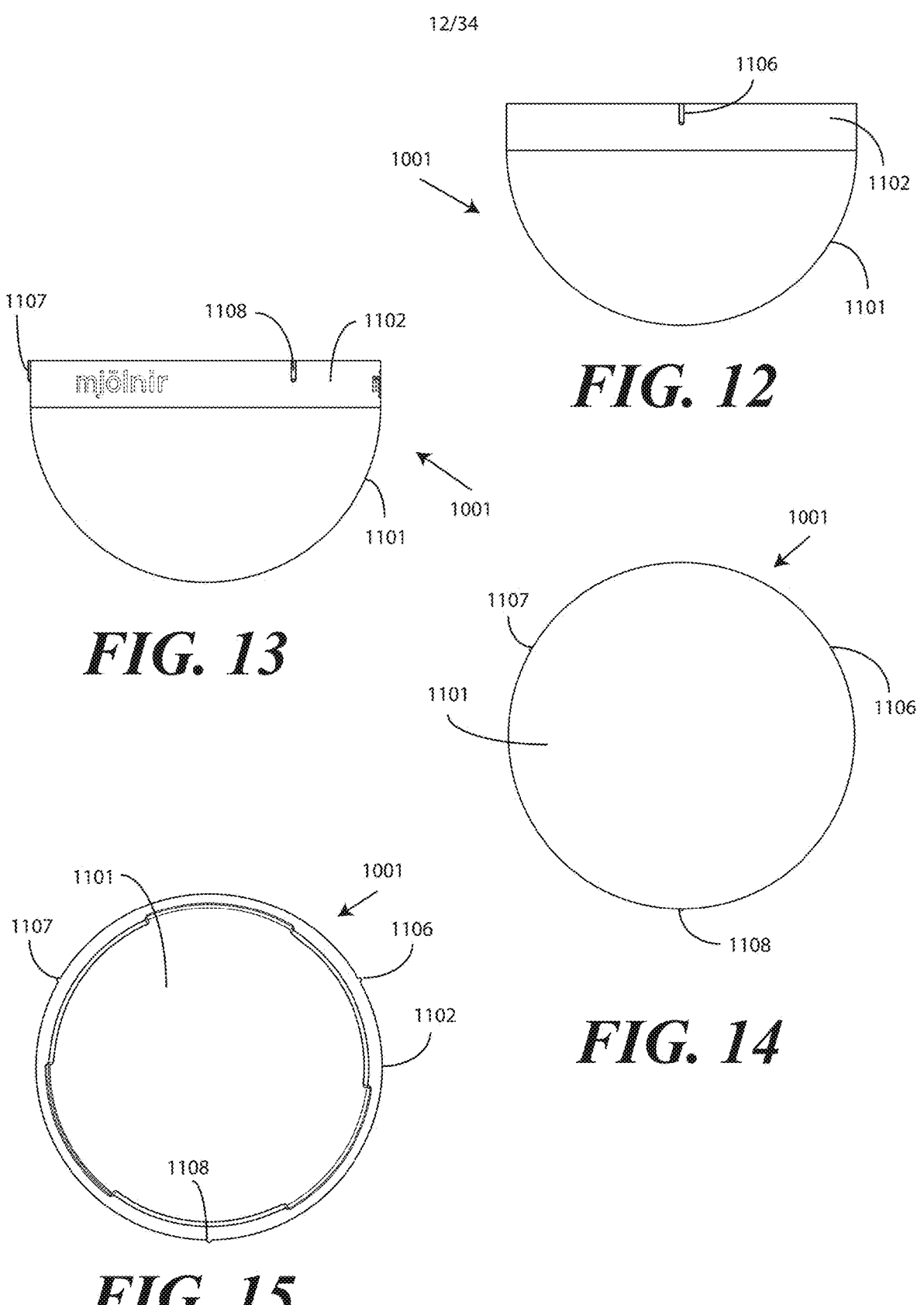
FIG. 12 illustrates a front elevation view of one explanatory nose cone suitable for use in a payload container in accordance with one or more embodiments of the disclosure.
FIG. 13 illustrates a right-side elevation view of one explanatory nose cone suitable for use in a payload container in accordance with one or more embodiments of the disclosure.
FIG. 14 illustrates a bottom plan view of one explanatory nose cone suitable for use in a payload container in accordance with one or more embodiments of the disclosure.
FIG. 15 illustrates a top plan view of one explanatory nose cone suitable for use in a payload container in accordance with one or more embodiments of the disclosure.

Turning now to FIGS. 11-15, illustrated therein is the nose cone 1001 of FIG. 10. FIG. 11 illustrates a perspective view of the nose cone 1001, while FIG. 12 illustrates a front elevation view of the nose cone 1001. FIG. 13 illustrates a right-side elevation view of the nose cone 1001, while FIG. 14 illustrates a bottom plan view and FIG. 15 illustrates a top plan view thereof. In one or more embodiments, the nose cone 1001 has a diameter of about seventy-five millimeters.

As previously described, in one or more embodiments the nose cone 1001 comprises a hemispherical nose 1101 extending from a cylindrical base 1102. In one or more embodiments, the hemispherical nose 1101 has a radius of between thirty and forty millimeters, and an exterior radius of between thirty-seven and thirty-eight millimeters in one explanatory embodiment. In one or more embodiments, the height of the cylindrical base is about ten millimeters beyond the boundary of the hemispherical nose 1101.

In one or more embodiments, the interior 1103 of the nose cone 1001 is hollow so that the nose cone 1001 can house electronic components and energy sources. A system schematic (5600) illustrating one explanatory configuration for these components is shown below in FIG. 56. Others will be obvious to those of ordinary skill in the art having the benefit of this disclosure.

In one or more embodiments, the electronic components and energy sources situated within the nose cone 1001 are secured therein in an epoxy potting compound to ensure stability and durability during deployment. In one or more embodiments, the electronic components comprise a radar sensor to detect impacting objects, e.g., the ground, buildings, vehicles, or equipment, through the nose cone 1001 without apertures or ports. This allows both the hemispherical nose 1101 and the cylindrical base 1102 of the nose cone 1001 of FIGS. 11-15 to be solid and devoid of apertures. Illustrating by example, the hemispherical nose of FIGS. 11-15 is configured as a solid hemisphere.

It should be noted, however, that embodiments of the disclosure are not so limited. As will be shown below in FIG. 16, in alternate embodiments the nose cone (1601) can include one or more apertures that allow a forward exposed optical sensor (1602) to view the environment through these apertures. Either the radar or forward exposed optical sensor (1602) can be used with the other electrical components to execute an aerial burst function, as will be described below.

In one or more embodiments, additional components that can be included in the nose cone 1001 comprise a printed circuit board, multiple flight sensors, an energy storage device such as a battery, and capacitors. In one or more embodiments, the nose cone 1001 is constructed of an engineering polymer material.

In one or more embodiments, the hemispherical nose 1101 of the nose cone 1001 is dome shaped and hemispherical. In one or more embodiments, the nose cone 1001 comprises recessed slots to house electronic components as well as a passthrough in the top center to allow the insertion of one or more of a radar, an optical sensor device, a proximity detector, or other device that measures a distance between the nose cone 1001 and an object there below, such as the ground, a building, a vehicle, or equipment.

In one or more embodiments, the cylindrical base 1102 of the nose cone 1001 can be designed/engraved with one or more bayonet-style connectors 1104,1105 that, when paired with corresponding coupling mechanisms defined by the collar (1002), supports full engagement with only a quarter turn being applied to the nose cone 1001 relative to the collar (1002). One or more alignment nubbins 1106, 1107, 1108 can be defined by the cylindrical base 1102 to make alignment between the collar (1002) and the nose cone 1001 easily detected when the bayonet-style connectors 1104, 1105 positively engage the corresponding coupling mechanisms defined by the collar (1002). In one or more embodiments, each alignment nubbin 1106,1107,1108 is between four and five millimeters long and protrudes about one half millimeter from an exterior surface of the cylindrical base 1102.

While three alignment nubbins 1106,1107,1108 are shown in FIGS. 11-15, other nose cones can have more, or fewer, nubbins as will be obvious to those of ordinary skill in the art having the benefit of this disclosure. In this illustrative embodiment, the three alignment nubbins 1106,1107,1108 correspond to three recessed grooves on a one-to-one basis.

In one or more embodiments, the nose cone 1001 houses a radar sensor configured to detect impacting objects, e.g., the ground, buildings, vehicles, or equipment, through the nose cone 1001 housing without apertures or ports. This allows the hemispherical nose 1101 of the nose cone 1001 to be configured as a solid hemisphere.

Figure 16:
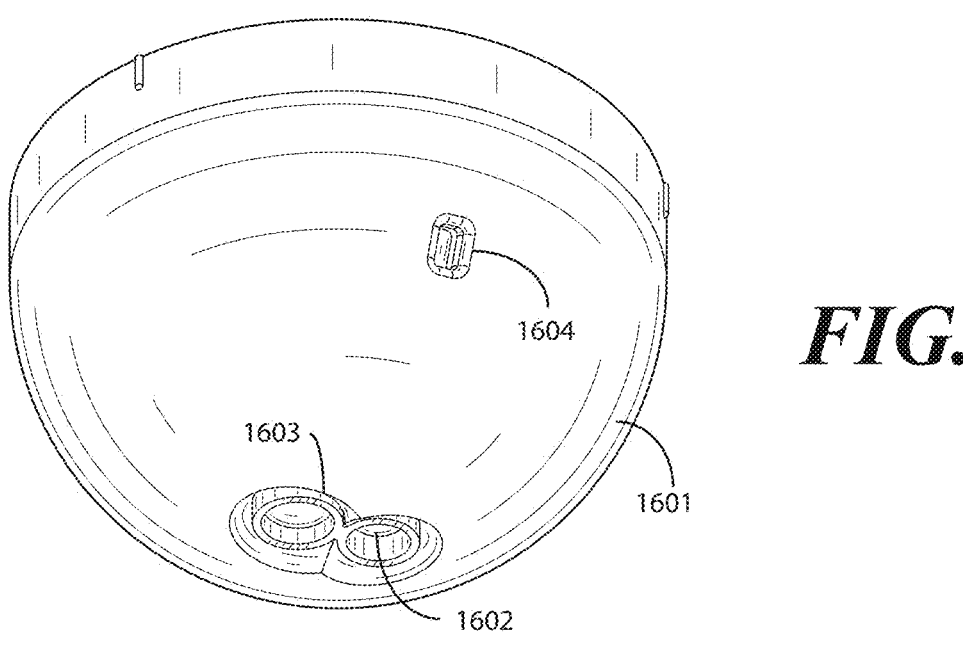
FIG. 16 illustrates a perspective view of another explanatory nose cone suitable for use in a payload container in accordance with one or more embodiments of the disclosure.

However, embodiments of the disclosure are not so limited. Turning now to FIG. 16, illustrated therein is an alternate embodiment of a nose cone 1601 configured in accordance with one or more embodiments of the disclosure. In this alternate embodiment, the nose cone 1601 includes one or more apertures 1603,1604 that allow components, one example of which is a forward exposed optical sensor 1602, to be exposed through the nose cone 1601.

Figure 17:
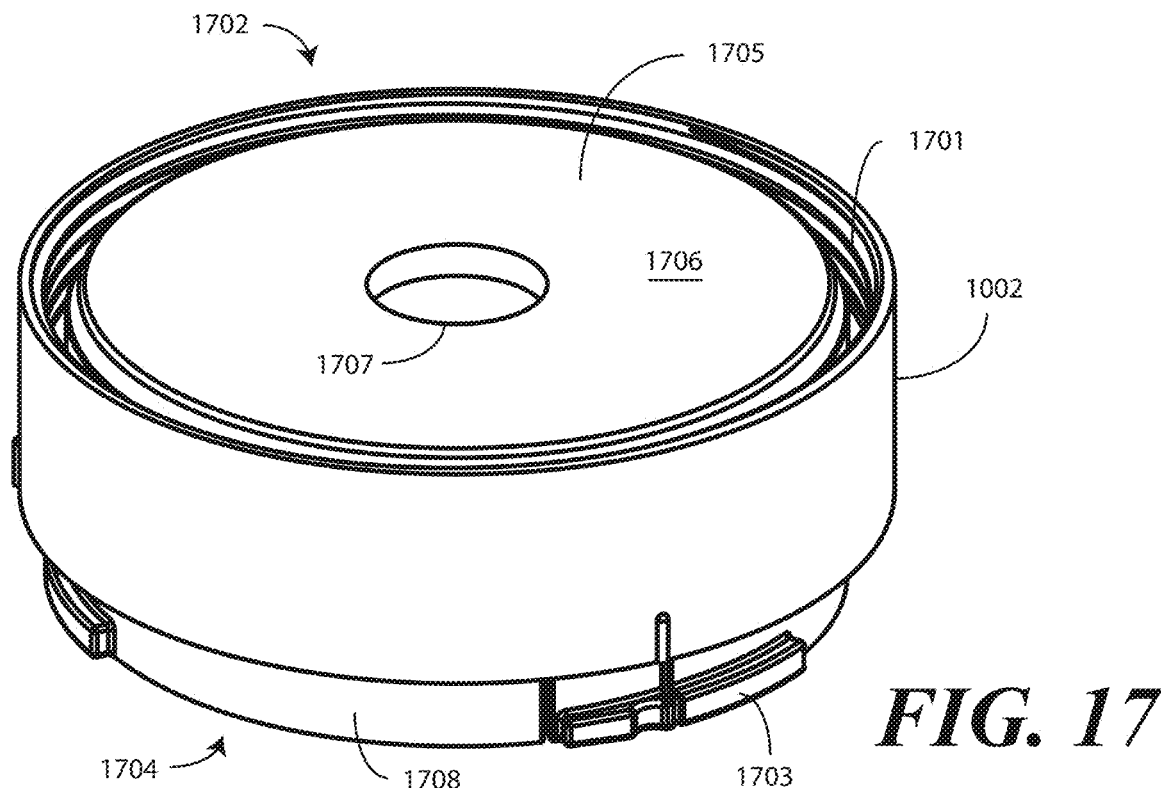
FIG. 17 illustrates a perspective view of one explanatory collar suitable for use in a payload container in accordance with one or more embodiments of the disclosure.
Figure 18:
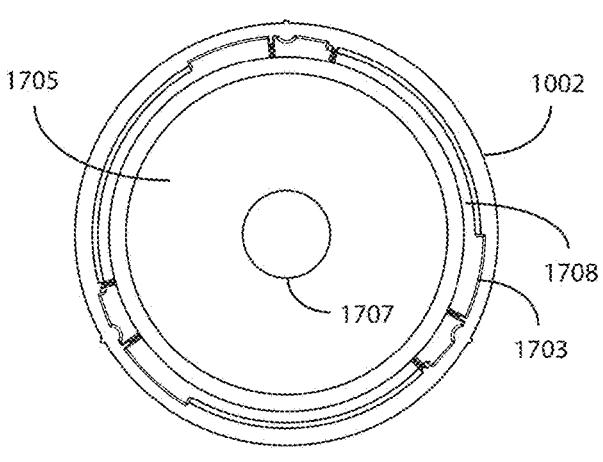
FIG. 18 illustrates a bottom view of one explanatory collar suitable for use in a payload container in accordance with one or more embodiments of the disclosure.
Figure 19:
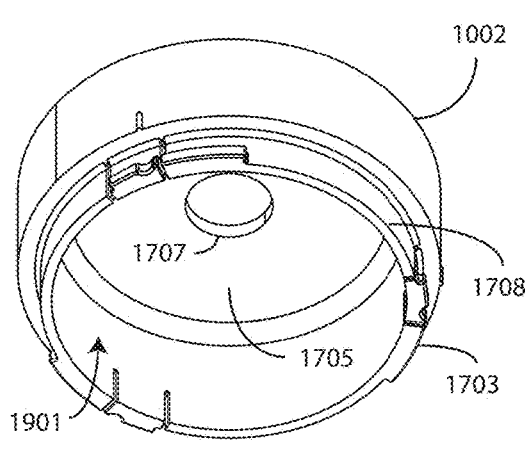
FIG. 19 illustrates another perspective view of one explanatory collar suitable for use in a payload container in accordance with one or more embodiments of the disclosure.
Figure 21:
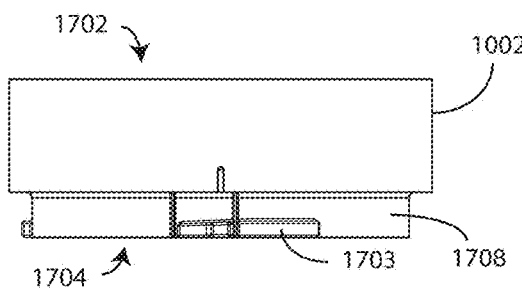
FIG. 21 illustrates a front elevation view of one explanatory collar in accordance with one or more embodiments of the disclosure.
Figure 22:
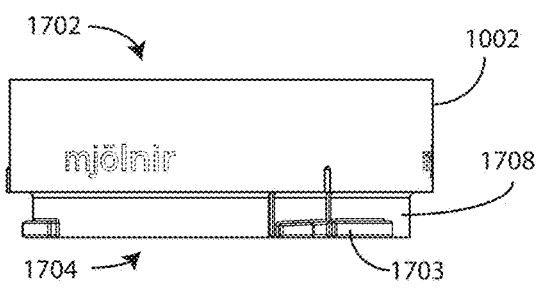
FIG. 22 illustrates a right-side elevation view of one explanatory collar in accordance with one or more embodiments of the disclosure.
Figure 20:
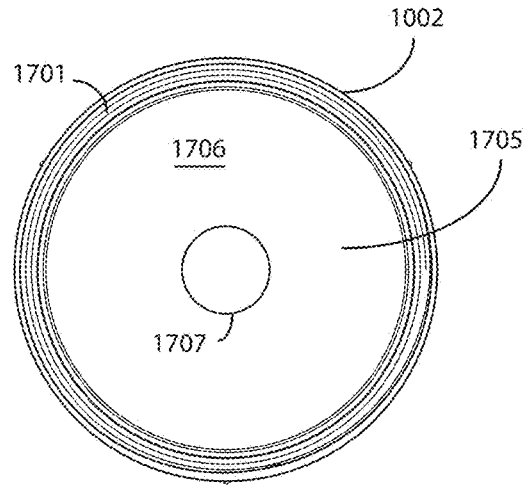
FIG. 20 illustrates a top plan view of one explanatory collar suitable for use in a payload container in accordance with one or more embodiments of the disclosure.

Turning now to FIGS. 17-22, illustrated therein is one explanatory collar 1002 that can be used with a collar assembly (102) in a payload container (100) configured in accordance with one or more embodiments of the disclosure. FIG. 17 illustrates a perspective view the collar 1002, while FIG. 18 illustrates a bottom view of the collar 1002. FIG. 19 illustrates another perspective view of the collar 1002, while FIGS. 20-22 illustrate a top plan view a front elevation view, and a right-side elevation view of the collar 1002, respectively.

In the illustrative embodiment of FIGS. 17-22, the collar 1002 is designed with threads 1701 situated internally within a canister receiver situated on a first side 1702 and a bayonet style connector 1703 that protrudes from a nose cone insertion ring 1708 that extends distally from the collar 1002 on a second side 1704. In one or more embodiments, the collar 1002 has a height of about twelve millimeters, while the nose cone insertion ring 1708 extend distally below the collar 1002 by about eight millimeters.

In one or more embodiments, these threads 1701 and bayonet style connector 1703 are both coupled by a flat ring connector 1705 with a recess 1901 on the second side 1704 and solid bottom 1706 on the first side 1702. In one or more embodiments, the solid bottom 1706 of the collar 1002 defines a center aperture 1707 that is used to secure a cable gland assembly (1004) within the payload container (100).

As noted above, in one or more embodiments the cable gland assembly (1004) can also be used to retain a directional fragmentation insert (1003) to the collar 1002. In one or more embodiments, when the directional fragmentation insert (1003) is included, it situates within the recess 1901 of the collar 1002 and is held therein by the cable gland assembly (1004). The directional fragmentation insert (1003) is then stabilized by hand-tightening the upper nut (1007) and lower nut (1006), as previously described, while also holding the hexagonal baffle (1010) when tightening the upper nut (1007).

In the illustrative embodiment of FIGS. 17-22, the collar 1002 is circular in shape when viewed in the plan view of FIGS. 18 and 20. In this illustrative embodiment, the collar 1002 includes two externally presented connectors, namely the threads 1701 and bayonet style connector 1703.

In one or more embodiments, the threads 1701 of the collar 1002 mechanically couple to matching external threads situated at an open end of the canister (903). In one or more embodiments, the bayonet style connector 1703 of the collar 1002 terminates at a cavity defined by the recess 1901 that is bounded by a perimeter supporting the bayonet style connector 1703. In one or more embodiments, extrusions defining the bayonet style connector 1703 mechanically connect to matching internally extruded recess connectors on the nose cone (1001) as noted above.

In one or more embodiments, the recess 1901 of the collar assembly 102 is designed to receive the directional fragmentation insert (1003). The recess 1901 cradles the directional fragmentation insert (1003), which is stabilized by tightening the cable gland assembly (1004). In one or more embodiments, the center exterior of the collar 1002 is flat. When fully assembled, the collar 1002 sits flush between the nose cone electronics hub assembly (101) and the canister assembly (103). In one or more embodiments, the collar 1002 is about seventy-five millimeters wide.

Figures 23, 24:
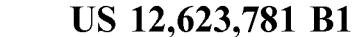
FIG. 23 illustrates a first perspective view of one explanatory collar fragmentation insert suitable for use in a payload container in accordance with one or more embodiments of the disclosure.
FIG. 24 illustrates a second perspective view of one explanatory collar fragmentation insert suitable for use in a payload container in accordance with one or more embodiments of the disclosure.
Figure 25:
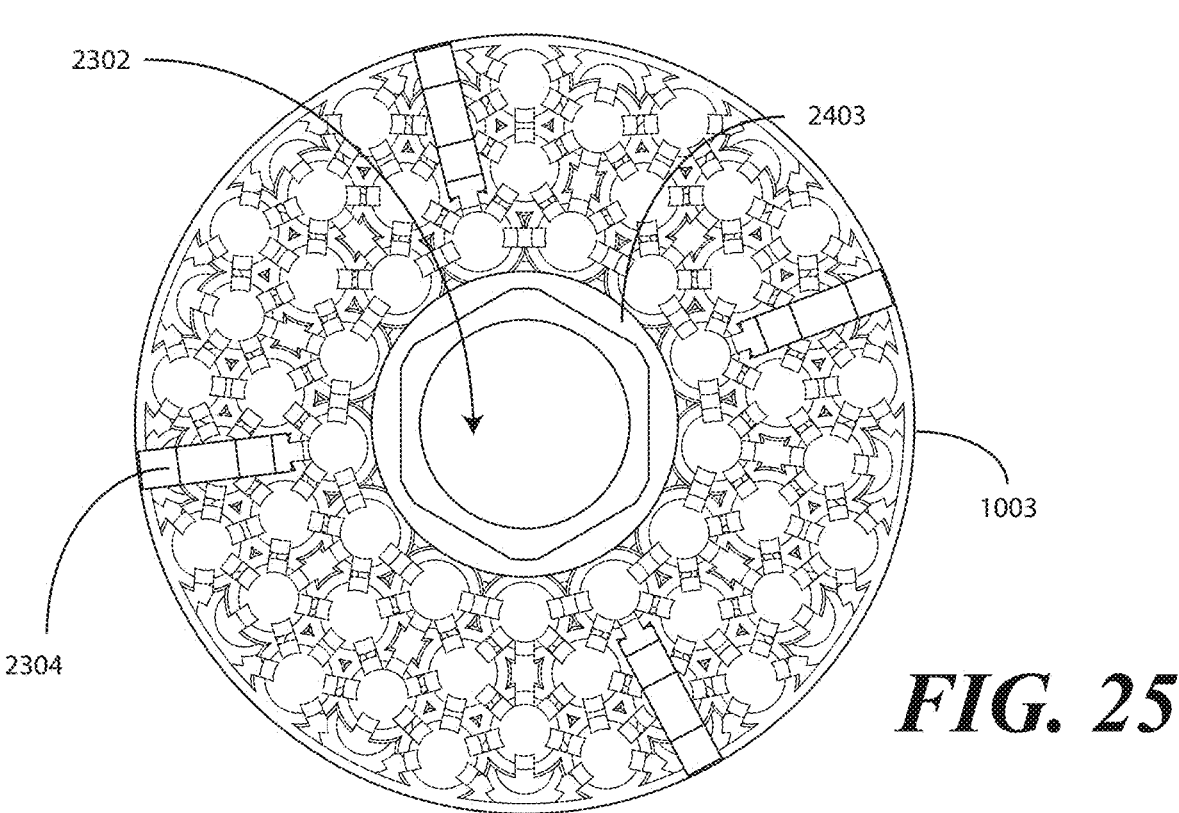
FIG. 25 illustrates a bottom plan view of one explanatory collar fragmentation insert suitable for use in a payload container in accordance with one or more embodiments of the disclosure.

Turning now to FIGS. 23-26, illustrated therein is one explanatory directional fragmentation insert 1003. FIG. 23 illustrates a first perspective view of the collar fragmentation insert 1003, while FIG. 24 illustrates a second perspective view of the collar fragmentation insert 1003. FIG. 25 illustrates a bottom plan view of the collar fragmentation insert 1003, while FIG. 26 illustrates a top plan view of the collar fragmentation insert 1003.

In one or more embodiments, the collar fragmentation insert 1003 defines one or more fingers 2301,2401 on each side that are configured to receive metal projectiles, one example of which include ball bearings or round ammunition shot. When the payload container (100) detonates, these ball bearings or round ammunition shot disperse.

In one or more embodiments, the collar fragmentation insert 1003 also defines a central aperture 2302. In one or more embodiments, the central aperture 2302 is bounded on a first side by a round receiver 2403 that receives the hexagonal baffle (1010) of the cable gland assembly (1004)

and a hexagonal receiver 2303 on the other side that receives the lower nut (1006). Once loaded with ball bearings or round ammunition shot that are positioned between the one or more fingers 2301,2401, the collar fragmentation insert 1003 is ready to be attached to the collar (1002).

One or more standoffs 2304 can extend distally above the one or more fingers 2301,2401 to offset the fingers 2301, 2401 and their contained ball bearings or round ammunition shot to prevent the same from contacting the electronics situated within the electronic nose cone hub assembly (101). In one or more embodiments, the one or more standoffs 2304 extend between five and six millimeters above the perimeter band encircling the one or more fingers 2301,2401. In one or more embodiments, the height of the hexagonal receiver 2303 and the one or more standoffs 2304 are the same. In one or more embodiments, these standoffs 2304 can also be used as finger grips to directionally spin and/or tighten/ loosen the collar fragmentation insert 1003 to and from the cable gland assembly (1004) in the recessed side of the collar.

In one or more embodiments, the collar fragmentation insert 1003 is configured as a double-sided puck that contains approximately fifty ball bearings on each side and a passthrough hole in its center. The top of the collar fragmentation insert 1003 has a hexagonal receiver 2303 that receives the lower nut (1006) that couples to the lower threaded portion (1009) of the cable gland assembly (1004). The bottom of the collar fragmentation insert 1003 has a circular recess around its center hole used to straddle the hexagonal baffle (1010) of the cable gland assembly.

Turning now to FIGS. 27-28, illustrated therein is one explanatory canister 903 suitable for use with a payload container (100) configured in accordance with one or more embodiments of the disclosure. The canister 903 defines a cylindrical housing with a closed end 901 and an open end 902.

In one or more embodiments, the closed end 901 defines a threaded aperture 914 that engages the threaded screw (108) to retain the end cap assembly (905) to the canister 903. The open end 902 then defines external threads 2701 that engage with the internal threads 1701 of the collar (1002) to retain the canister 903 to the collar (1002).

In one or more embodiments, the canister 903 is about one hundred millimeters high and about seventy-five millimeters in width. In one or more embodiments, the internal diameter of the cavity defined by the open end 902 is about sixty-nine millimeters. Optionally an O-ring can be positioned between the exterior sidewalls of the canister 903 and the external threads 2701 for a better seal between the canister 903 and the collar 1002.

In one or more embodiments, the canister 903 is cylindrical in shape, with a volumetric measurement of approximately three hundred milliliters. In one or more embodiments, a flat, bottom surface defines the closed end 901 of the canister 903. As shown in FIGS. 27-28, the closed end 901 of the canister 903 is situated at an opposite end of from the open end 902 and is flat. The closed end 901 of the canister 903 also defines a centered, recessed, threaded aperture 914. Internally, this centered, recessed, threaded aperture 914 can receive the threaded screw (108) when configuring the corresponding payload container (100) in the deployment configuration of FIGS. 1-8.

In one or more embodiments, the open end of the canister 903 defines an externally threaded ring at the open end 902 that engages the internal threads side of the collar (1002). At the top of the external threads defined by the open end 902 of the canister 903 an optional extruding lip can be provided to house a recessed rubber gasket which, where included, prevents liquid energetic material egress from the interior of the canister 903.

In one or more embodiments, the canister 903 can be used as a shipping container for system parts, as illustrated in FIGS. 49-50. In one or more embodiments, the system parts include, but are not limited to, collar fragmentation insert (1003), the grid fins (105), and so forth during shipping. Thereafter, and at the time of need, parts are removed for canister 903.

In one or more embodiments, once the system parts are removed from this "shipping configuration" of the canister 903, an end user can position explosives material within the canister 903 in a "deployment configuration." The canister 903 can then be loaded, either with or without the canister fragmentation inserts (908,909,910) shown in more detail below in FIGS. 29-35 and dropped from a sUAS.

In the deployment configuration, a fin system defined by four of the grid fins 105 is attached to the canister 903 by the fin cap (106), which is shown in more detail below in FIGS. 36-39. The fin system, when situated at the flat end of the payload container (100) facilitates a horizontal descent of the payload container 100 when dropped from an unmanned aircraft.

Advantageously, in one or more embodiments the canister 903 serves multiple functions. To wit, in one or more embodiments when the payload container (100) is in the shipping configuration the canister 903 is designed to house all assembling components, e.g., grid fins (105), directional fragmentation insert assembly (3500), and optionally other components, for shipping to an end user. Once assembled and converted to the deployment configuration, the canister 903 becomes a housing for deployment materials, one example of which includes explosive munitions.

In one or more embodiments, the canister 903 is configured to house a plurality of canister fragmentation inserts. Turning now to FIGS. 29-35, illustrated therein are explanatory canister fragmentation inserts 908,909,910. In this illustrative embodiment, each canister fragmentation insert 908,909,910 is configured as a partially cylindrical trapezoid. As shown in FIG. 35, this shape allows the canister fragmentation inserts 908,909,910 to situate together to define a fully cylindrical configuration as a canister fragmentation insert assembly 3500 that situates within the canister (903) and abuts an interior perimeter wall of the canister (903) when the payload container (100) is in either the deployment configuration or the shipping configuration.

As with the directional fragmentation insert (1003), in one or more embodiments each canister fragmentation insert 908,909,910 defines one or more fingers 2901,3001,3101 on an interior side that are configured to receive metal projectiles 3002, one example of which include ball bearings or round ammunition shot. When the payload container (100) detonates, these ball bearings or round ammunition shot disperse.

In one or more embodiments, the canister fragmentation insert assembly 3500 functions as a fragmentation device. In one or more embodiments, the canister fragmentation insert assembly 3500 carries a plurality of ball bearings as the metal projectiles 3002. When both the canister fragmentation inserts 908,909,910, configured as the fragmentation insert assembly 3500, and an explosive material are situated within the canister (903) and the explosive material detonates, the canister fragmentation insert assembly 3500 projects the ball bearings throughout an environment situated around the payload container (100).

When both the canister fragmentation insert assembly 3500 and the collar fragmentation insert (1003) are included with a payload container (100), explosive material situated within the canister (903) will detonate to project ball bearings from both the canister fragmentation insert assembly 3500 and the collar fragmentation insert (1003) throughout an environment situated around the payload container (100) and directionally below the payload container (100) when aerial burst is selected.

Thus, in one or more embodiments, the fragmentation inserts of the payload container (100) are two, namely, the canister fragmentation insert assembly 3500, which contains six-millimeter ball bearings and the collar fragmentation insert (1003), also containing six-millimeter ball bearings. Each of the canister fragmentation insert assembly 3500 and the collar fragmentation insert (1003) has approximately one hundred metal ball bearings retained in place by the various fingers designed to facilitate a consistent area of distribution upon detonation.

In one or more embodiments, the canister fragmentation insert assembly 3500 and the collar fragmentation insert (1003) are each modular and can be removed altogether or used separately or as individual sections depending on mission set. In one or more embodiments, the canister fragmentation insert assembly 3500 and the collar fragmentation insert (1003) are constructed of an engineering polymer material.

As shown in FIG. 35, in one or more embodiments the canister fragmentation insert assembly 3500 comprises three separate canister fragmentation inserts 908,909,910 that securely hold approximately one hundred equally distanced ball bearings in the fingers 2901,3001,3101. The canister fragmentation insert assembly 3500 then fits securely within the walls of the canister (903). The canister fragmentation insert assembly 3500 is then held in place by outward pressure and downward seating. When even more stabilization is required, an extruding lip that houses a recessed rubber gasket defined by an O-ring can be defined within the interior of the canister (903). The three-piece canister fragmentation insert assembly 3500 design allows for easy insertion, or removal where mission sets do not call for this fragmentation effect.

Turning now to FIGS. 36-39, illustrated therein is one explanatory fin cap 106 suitable for use with embodiments of the disclosure. FIG. 36 illustrates a first perspective view of the fin cap 106, while FIG. 37 illustrates a second perspective view of the fin cap 106. FIG. 38 illustrates a top plan view of the fin cap 106, while FIG. 39 illustrates a bottom plan view of the fin cap 106.

In one or more embodiments, the fin cap 106, optionally in conjunction with a fin retaining plate (911), which is shown below in FIGS. 40-41, is used to hold the grid fins (105) of the fin system in place. In one or more embodiments, a threaded screw (108) secures the fin cap 106 to the canister (903).

In one or more embodiments, the fin cap 106 is circular with four recessed slots 3601,3602,3701,3702 for receiving fin stem receivers of the fin retaining plate (911). In the illustrative embodiment of FIGS. 36-39, the fin cap 106 has a passthrough hole 3603 in the center to hold the threaded screw (108) in place. In one or more embodiments, the recessed slots 3601,3602,3701,3702 in the fin cap 106 are equally spaced, universal and can receive any of the fin stem receivers of the fin retaining plate (911).

In other embodiments, one example of which is shown below in FIGS. 51-52, the fin cap (4906) is circular with eight recessed slots and no fin retaining plate is included.

Where so configured, the eight recessed slots of the fin cap (4906) include four recessed slots for the fin stems of the grid fins (4905) and four recessed slots for receiving cable ends of the aircraft cable (4907). Where an aircraft cable (4907) is included, such as is the case in the embodiment of FIGS. 51-52, the recesses in the fin cap (4906) receiving the aircraft cable (4907) can also be equally spaced, designed to be mechanically identical, and can receive any of the cable anchors. As with the embodiment of FIGS. 1-10, the fin cap (4906) of FIGS. 51-52 defines a passthrough hole in the center through which the threaded screw (108) passes when the payload container (4900) is in the deployment configuration.

Turning now to FIGS. 40-41, illustrated therein is one explanatory fin retaining plate 911 configured in accordance with one or more embodiments of the disclosure. FIG. 40 illustrates a perspective view of the fin retaining plate 911, while FIG. 41 illustrates a bottom plan view of the fin retaining plate 911.

In one or more embodiments, the fin retaining plate 911 defines four equally spaced fin stem receivers 4001,4002, 4003,4004 for receiving the stems of the grid fins (105). In one or more embodiments, each fin stem receiver 4001, 4002,4003,4004 defines a recessed slot providing a runway that ends in a 90-degree recess that, when combined, receives and secures the fin stem of each grid fin (105) in place.

It should be noted that the inclusion of a fin retaining plate 911 is optional. Illustrating by example, the embodiment of FIGS. 49-50 does not include a fin retaining plate. However, including a fin retaining plate 911 is advantageous in that the grid fins (105), via cantilevered arms that will be described below with reference to FIGS. 42-45, can be snapped into place between the equally spaced fin stem receivers 4001, 4002,4003,4004 such that the combined grid fin (105) and fin retaining plate 911 can be positioned between the fin cap (106) and the canister (903) as a single unit.

One or more snaps 4005 can be provided to attach the fin retaining plate 911 to the fin cap (106). Additionally, the fin retaining plate 911 can define a passthrough hole 4006 in the center to hold the threaded screw (108) in place.

Once attachment of the fin retaining plate 911 to the fin cap 106 is complete, with the grid fins 105 situated within the fin stem receivers 4001,4002,4003,4004, this assembly can be secured/attached to the canister (903) using the accompanying threaded screw (108). The tightening of the threaded screw (108) provides pressure between the fin cap (106) and the closed end (901) of the canister (903), thereby sandwiching the fin retaining plate 911 to prevent displacement during operations.

In one or more embodiments, the four recessed slots in both the fin cap (106) and fin retaining plate 911 are equally spaced and are designed to be identical to each other such that any of the four grid fins (105) can be inserted into any of the recessed slots of the fin retaining plate 911. In one or more embodiments each fin stem receiver 4001,4002,4003, 4004 defines a runway that ends in recesses that receive and secure bumps (4303) extending distally from cantilever beams (4403,4404) of the grid fins, as will be described below with reference to FIGS. 42-45. This mechanical connection of the fin stem of each grid fin 105 also helps to ensure the grid fins 105 stay in place in place when the payload container (100) is in the deployment configuration.

Turning now to FIGS. 42-45, illustrated therein is a grid fin 105 configured in accordance with one or more embodiments of the disclosure. FIG. 42 illustrates a first perspective view of the grid fin 105, while FIG. 43 illustrates a side elevation view of the grid fin 105. FIG. 44 illustrates a front elevation view of the grid fin 105, while FIG. 45 illustrates a second perspective view of the grid fin 105.

In one or more embodiments, the fin system defined by the grid fin(s) 105 is designed to facilitate vertical descent of the payload container (100) when dropped from a sUAS. In one or more embodiments when the payload container (100) is used as a weapon, this vertical descent is necessary to ensure proper detonation, which optionally occurs at heights determined by a radar, proximity detector, and/or embedded optical sensor (1602) carried by the nose cone electronics hub assembly (101). In one or more embodiments, this height-determining component defined by the radar, proximity detector, and/or embedded optical sensor (1602) functions to measure an "above ground level" (AGL) and is used to communicate to the electronic components situated in the nose cone electronics hub assembly (101) a proper height for aerial burst.

In one or more embodiments, the fin system consists of four identical grid fins 105 that each have waffle-style air passages 4201 promoting a vertical and stabilized descent. In one or more embodiments, the grid fins 105 of the fin system are constructed of an engineering polymer.

In one or more embodiments, each grid fin 105 is about forty millimeters wide and sixty millimeters long. In one or more embodiments, each fin stem 4202 is about twenty millimeters wide and extends distally between sixteen and seventeen millimeters from the body of the grid fin 105. In one or more embodiments, the waffle-style air passages 4201 have openings defined by adjacent side lengths of between four and five millimeters, with 4.39 millimeters being an explanatory measurement.

The grid fins 105 of FIGS. 42-45 are generally flat. However, embodiments of the disclosure are not so limited. Illustrating by example, in the embodiment shown and described below with reference to FIGS. 51-52, the grid fins (4905) are arched with an interior radius of between twenty-eight and twenty-nine millimeters and an exterior radius of between thirty-four and thirty-five millimeters. In one or more embodiments, the grid fins have a thickness of about six millimeters regardless of whether they are curved or flat.

In one or more embodiments, each grid fin 105 is designed to have identical mechanical features as each other grid fin 105 so that they can be interchanged when transforming the payload container (100) with which they are used from the shipping configuration to the deployment configuration. This "universal" design of the grid fins 105, which results in them being all identically configured helps to promote ease of assembly.

In one or more embodiments, the fin stem 4202 extending from each grid fin 105 is designed with a protruding bump 4303 to hold the grid fin 105 in place within the fin stem receivers (4001,4002,4003,4004) of the fin retaining plate (911) situated beneath the fin cap (106) and fin retaining plate (911) and prevent it from being removed once the threaded screw (108) is tightened in place to retain the fin cap (106) and fin retaining plate (911) against the canister (903). Advantageously, this mechanical interface locks the grid fins 105 in place when the payload container 100 is configured in the deployment configuration.

In one or more embodiments, the fin stem 4202 extending distally from the grid fin 105 comprises two slots 4401,4402. In one or more embodiments, the two slots 4401,4402 allow for cantilever beams 4403,4404 carrying the bumps 4303 to be flexible. To assist in assembly, these slots 4401,4402 allow for compression of these cantilever beams 4403,4404 to facilitate outward pressure against the walls of the fin retaining plate (911) to hold each grid fin 105 in place during the transition of the payload container (100) from the shipping configuration to deployment configuration. Once again, the fact that the grid fins 105, and therefore the fin stems 4202, are designed to be mechanically identical allows for quick and positive engagement in the fin retaining plate (911) and fin cap (106).

In one or more embodiments, the grid fins 105 allow for various flight profiles. Illustrating by example, in one embodiment the grid fins 105 facilitate vertical descent that is non-rotational perpendicular to a major axis (shown in FIG. 5) of the payload container (100). Moreover, the grid fins 105 also facilitate travel and vertical descent that is gyroscopically stable parallel to the axis major axis of the payload container (100). When the payload container (100) is in the shipping configuration, the four grid fins 105 nestle inside the canister (903) between the canister fragmentation inserts (908,909,910).

Turning now to FIGS. 46-47, illustrated therein is one explanatory cable gland assembly 1004 shown in an assembled state. In one or more embodiments, the cable gland assembly 1004 also receives and secures an explosive detonator (blasting cap) positioned into explosive material situated within the canister (903). Wire leads electrically coupled to the blasting cap then extend through the cable gland assembly 1004 and couple to electronic components situated within the nose cone electronics hub assembly (101). In one or more embodiments, the cable gland assembly 1004 can be tightened and stabilized by hand by turning a hexagonal bolt portion. In one or more embodiments, the cable gland assembly 1004 is manufactured from metal.

Turning now to FIGS. 48-50, illustrated therein are two embodiments of a payload container 100,4900 configured in accordance with one or more embodiments of the disclosure. The payload container 100 of FIG. 48 uses the deployment D-ring 107, while the payload container of FIGS. 49-50 uses an aircraft cable 4907. A threaded screw 108 retains the fin cap 106,4906 and fin retaining plate (911) to the canister 903,4903. In the shipping configuration the threaded screw 108 may only be hand tightened so as to allow for quick and easy transition of the payload container 100,4900 from the shipping configuration to the deployment configuration.

Where used, in one or more embodiments the deployment D-ring 107 is spring loaded to pivot between a first position shown in FIGS. 1-8 above and a second position shown in FIG. 48 where the deployment D-ring 107 situates within the receiving recesses 301,302 abutting flat surfaces of the fin cap 106. The spring loading of the deployment D-ring 107 biases the deployment D-ring 107 toward either the first position or the second position to securely retain the deployment D-ring 107 in that position until a user overcomes the loading of the spring to pivot the deployment D-ring 107 to the other position.

When the payload container 100 is in the shipping configuration, the deployment D-ring 107 is generally pivoted to the second position. However, when the payload container 100 is in the deployment configuration, the deployment D-ring 107 can be pivoted to the first position as shown in FIGS. 1-8.

In one or more embodiments, the deployment D-ring 107 or aircraft cable 4907 is used as an attachment point to allow the payload container 100,4900 to dangle from a SUAS when in the deployment configuration. Where the SUAS has a payload container dropping device, an operator of the SUAS can control the payload container dropping device to cause the payload container dropping device to release the deployment D-ring 107 or aircraft cable 4907. Alternatively, the SUAS can be preprogrammed to release the deployment D-ring 107 or aircraft cable 4907 to deploy the payload container 100,4900 when over a target.

In one or more embodiments, the deployment D-ring 107 is fixedly and pivotally attached to the fin cap 106 such that it is not detached and stowed within the canister assembly 103 when the payload container 100 is in the shipping configuration. Instead, the deployment D-ring 107 is simply pivoted to the second position where the deployment D-ring 107 situates within the receiving recesses 301,302 abutting flat surfaces of the fin cap 106 as previously described. In one or more embodiments, the deployment D-ring 107 is manufactured from metal.

In one or more embodiments, the threaded screw 108 is recessed in a matching hexagonal slot in the bottom center of the fin cap 106,4906. In one or more embodiments, it is held in place by pressure and the threaded screw 108 is screwed into the canister 903,4903 by hand once grid fins 105 are set in place. In one or more embodiments, the threaded screw 108 is made of metal. FIGS. 49-50 brilliantly show how all necessary parts used to convert the payload container 100,4900 to the deployment configuration can be neatly stored within the canister 903,4903.

The payload container 4900 of FIGS. 49 and 50 beautifully illustrate how the canister 4903 can be used as a shipping container when the payload container 4900 is configured in the shipping configuration. Indeed, the cutaway views of the payload container 4900 when in its shipping configuration illustrate how all components necessary for assembly, including the grid fins 4905 (which are curved in this embodiment), the canister fragmentation insert assembly 3500, and (at least for this embodiment) aircraft cable(s) 4907 can be nested together inside an inner cavity 4901 defined by the canister 4903 for transport, compactness, added protection, and improved portability.

As shown, the canister 4903 is configured as a hollow cylinder defining an inner cavity 4901. In one or more embodiments, the canister 4903 is designed to house the fins 4905, the aircraft cables 4907, and the canister fragmentation insert assembly 3500 in its shipping configuration. Thereafter, the canister 4903 can be used to contain a selected explosives material for its intended use.

FIGS. 49-50 thus advantageously illustrate how the canister 4903 serves a dual functionality. To wit, in one or more embodiments the canister 4903 is designed to house all assembling components, e.g., fins 4905, aircraft cable 4907, and canister fragmentation insert assembly 3500, for shipping to an end user. Once assembled, the same canister 4903 becomes the housing for a selected explosives material.

Where one or more aircraft cables 4907 are used, in contrast to the deployment D-ring 107 of FIG. 48, in one or more embodiments the aircraft cable 4907 measures about ten inches in length and has cable anchors applied to each end. In one or more embodiments, the payload container 4900 is shipped with two identical cables which can be installed adjacent to each other using the four recessed cable anchor positions on the fin cap 4906, or a singular cable can be installed using opposite recessed cable positions on the fin cap 4906 depending on the unmanned aircraft model and connection method. The aircraft cable 4907 is used as an attachment point for the unmanned aircraft and works in concert with a payload container dropping device, which is controlled by the operator of the unmanned aircraft, or alternatively preprogrammed to open at a designated location. The aircraft cable shipping configuration is nestled inside the canister 903. In one or more embodiments, the aircraft cable 4907 is made of metal.

Turning now to FIGS. 51-52, illustrated therein is the payload container 4900 of FIGS. 49-50 when transitioned from the shipping configuration shown in those figures to the deployment configuration. As before, the payload container 4900 comprises a nose cone electronics hub assembly 5101, an independent collar assembly 5102 to marry the nose cone electronics hub assembly 5101 and the canister 4903 that defines the main body of the payload container 4900.

As noted above, the canister 4903 can advantageously be used as a shipping container for system parts. Thereafter, and at the time of need, parts are removed for system assembly and explosives material can be placed within the canister 4903 with or without the canister fragmentation insert (3500). At final assembly, a fin system 5104 is attached to the solid end of the payload container 4900 to facilitate horizontal descent of the payload container 4900 when dropped from an unmanned aircraft.

Gross weight of the entire payload container 4900 at the time of deployment will vary with explosives material and fragmentation selections, with combined weight target at or below three pounds or 1.36 kilograms.

As before, the nose cone electronics hub assembly 5101 houses all electronics and power supplies. In this particular embodiment, rather than using radar, the nose cone electronics hub assembly 5101 includes a forward exposed optical sensor 5201 used to execute the aerial burst function. Additional components included in the nose cone electronics hub assembly 5101 include a printed circuit board, multiple flight sensors, power source, and capacitors.

As before, the canister 4903 serves a dual functionality. To wit, in one or more embodiments the canister 4903 is designed to house all assembling components, e.g., fins, aircraft cable, fragmentation insert, for shipping to an end user. Once assembled, the same canister 4903 becomes the housing for the selected explosives material.

In one or more embodiments, this is necessary to ensure proper detonation heights assisted by the embedded optical sensor 5201 in the nose cone electronics hub assembly 5101. The embedded optical sensor 5201 measures AGL and is used to communicate to the electronics situated in the nose cone electronics hub assembly 5101 proper height for aerial burst. In one or more embodiments, the fin system 5104 consists of four identical grid fins 4905 with waffle-style air passages promoting a vertical and stabilized descent.

In this particular embodiment, the aircraft cable 4907 acts as the connection to the unmanned aircraft. In one or more embodiments, the aircraft cable 4907 hooks to the payload container dropping device of the unmanned aircraft so that the payload container 4900 can be released over the designated target. While one aircraft cable 4907 is shown in FIGS. 51-52, two cables can be used as well. In one or more embodiments, the fin system 5104 is constructed of an engineering polymer and the aircraft cable 4907 is metal.

In one or more embodiments, the threaded screw 108 is recessed in a matching hexagonal slot in the bottom center of the fin cap 4906. In one or more embodiments, it is held in place by pressure and the threaded stem is screwed into the canister 4903 by hand once grid fins 4905 and the aircraft cable 4907 are set in place. In one or more embodiments, the threaded screw 108 is made of metal.

When in the deployment configuration, the gross weight of the loaded payload container 4900 can vary. Illustrating by example, when configured with explosives material and fragmentation selections, namely, the canister fragmentation insert assembly (3500) and the collar fragmentation insert (1003), the payload container 4900 will be heavier than when deployed without munitions and these components. In one or more embodiments, when the payload container 4900 is fully loaded its combined weight will be below about three pounds.

Turning now to FIG. 53, illustrated therein is one explanatory unmanned aircraft 5300 in accordance with one or more embodiments of the disclosure. While shown as a quadcopter in FIG. 53, it should be noted that the unmanned aircraft 5300 could take other forms as well. Illustrating by example, in other embodiments the unmanned aircraft 5300 can be a hexacopter or an octocopter, and so forth. Including more propulsion components offers a redundancy that ensures the unmanned aircraft 5300 can continue to fly if one propulsion component fails Thus, it should be understood that FIG. 53 is provided for illustrative purposes only and for illustrating components of one explanatory unmanned aircraft 5300 in accordance with one or more embodiments of the disclosure.

In one or more embodiments, the unmanned aircraft 5300 includes one or more antennas 5301 that are operable with a communication device, which is described in more detail below with reference to FIG. 2. In one or more embodiments, the one or more antennas 5301 are configured for transmitting and receiving radio signals.

In one or more embodiments, the unmanned aircraft 5300 can be controlled by a remote control (not shown). The remote control can receive radio signals from the unmanned aircraft 5300 using its own antenna. Additionally, the remote control can transmit radio signals to the one or more antennas 5301 of the unmanned aircraft to control the flight operations of the unmanned aircraft 5300.

In one or more embodiments, the remote control has user interface controls that allow a controller to control the unmanned aircraft 5300. These user interface controls can include operating levers, keys, touch panels, switches, and other control devices. In one or more embodiments, the remote control includes a display that can present images or other signals received from the unmanned aircraft 5300.

In one or more embodiments, the user interface controls found on the remote control allow a controller to send a signal to the unmanned aircraft 5300 to open a mechanical actuator or drop mechanism to release a payload container configured in accordance with embodiments of the disclosure that is held by the mechanical actuator or drop mechanism by wire or cable. In other embodiments, the mechanical actuator or drop mechanism can be pre-programmed prior to flight of the unmanned aircraft 5300 so that the mechanical actuator or drop mechanism opens at a predetermined location and/or predetermined elevation.

In one or more embodiments, camera sensors can be included on the unmanned aircraft 5300. These camera sensors can send visual signals and real time video to the controller to allow the controller to survey, assess, and help make actionable decisions in response.

Turning now to FIG. 54, illustrated therein is a block diagram schematic 5400 of the unmanned aircraft (5300) of FIG. 53. In one or more embodiments one or more processors 5401 can include a microprocessor, a group of processing components, one or more application specific integrated circuits (ASICs), programmable logic, or other type of processing device. The one or more processors 5401 can be configured to process and execute executable software code to perform the various functions of the unmanned aircraft (5300). A storage device, such as memory, can optionally store the executable software code used by the one or more processors 5401 during drone operation. The memory may include either or both static and dynamic memory components and may be used for storing both embedded code and user data. The software code can embody program instructions and methods to operate the various functions of the unmanned aircraft (5300), and also to execute software or firmware applications and modules. The one or more processors 5401 can execute this software or firmware, and/or interact with modules, to provide drone functionality.

The one or more sensors 5405 can include a location detector. In one or more embodiments, the location detector is a satellite sensor, one example of which is a GPS sensor. The location detector can use an antenna of the one or more antennas 5301 to receive satellite signals to determine the location of the unmanned aircraft (5300). In addition to GPS sensors, other location detectors can be used as well. Illustrating by example, the one or more sensors 5405 can include a geolocator that performs location detection by triangulating signals from a terrestrial base station network, and so forth.

The one or more sensors 5405 can include other sensors as well. Illustrating by example, the one or more sensors 5405 can include an image capture device for visible light image capture, an infrared image capture device for infrared image capture, and one or more altimeters. The one or more altimeters can comprise laser scanners capable of determining the distance between the unmanned aircraft (5300) and the nearest object. The location sensor can also be used as an altimeter device. A radio location sensor can be used reliably even in bad weather conditions.

In one or more embodiments, the one or more sensors 5405 are oriented downward from the unmanned aircraft (5300). The one or more sensors 5405 can be pivotally mounted to expand their respective fields of view.

In one or more embodiments, the unmanned aircraft (5300) includes a payload container dropping device 5407. In one or more embodiments, the payload container dropping device 5407 comprises a hook or grapple that can open automatically so as to drop the payload containers (100, 4900) illustrated and described above. In one or more embodiments, the payload container dropping device 5407 comprises a hook that can be pivoted away laterally, so that the deployment D-ring (107) or aircraft cable (4907) of the payload container (100,4900) can slide off the hook.

In one or more embodiments, the payload container dropping device 5407 comprises a quadrilateral frame with cross bracing from which a plurality of hooks can be secured between frame 5408 of the unmanned aircraft (5300) and the deployment D-ring (107) or aircraft cable (4907) of the payload container (100,4900). The hooks included with the payload container dropping device 5407 may be electrically released hooks configured to be electrically opened via wiring harness by the remote control, thereby dropping the payload container (100,4900). Although shown in a vertical position in FIG. 54, the payload container dropping device 5407 can be modified to hold the payload container (100, 4900) in a horizontal position or an angular position.

In one or more embodiments, the one or more processors 5401 are operable with the one or more sensors 5405. Illustrating by example, in one or more embodiments the one or more processors 5401 can communicate with the location detector, the image capture device, and/or the altimeter to control the unmanned aircraft (5300).

The unmanned aircraft (5300) can include an autopilot flight module 5409. In one or more embodiments, the autopilot flight module 5409 can automatically approach a destination whose location coordinates have been stored in advance. By continuously comparing the location coordinates detected by the location detector to the target coordinates, the destination can be approached automatically.

The one or more processors 5401 can be operable with the communication device 5403, which can communicate with a remote-control device. The communication device 5403 may use any of a number of wireless technologies for communication, such as, but are not limited to, peer-to-peer or ad hoc communications, frequency modulated communication, amplitude modulated communication, or IEEE 802.11 communication. Other forms of wireless communication will be obvious to those having the benefit of this disclosure. The communication device 5403 can include wireless communication circuitry, one of a receiver, a transmitter, or transceiver, and one or more antennas 5301.

Turning now to FIG. 55, illustrated therein is a block diagram schematic 5500 suitable for inclusion in the nose cone electronics hub assembly (101,5101) of a payload container (100,4900) configured in accordance with one or more embodiments of the disclosure. The block diagram schematic 5500 includes one or more electronic components that can be coupled to a printed circuit board assembly disposed within the nose cone electronics hub assembly (101,5101). The components of the block diagram schematic 5500 can be electrically coupled together by conductors or a bus disposed along one or more printed circuit boards.

The illustrative block diagram schematic 5500 of FIG. 55 includes many different components. Embodiments of the disclosure contemplate that the number and arrangement of such components can change depending on the particular application. Accordingly, payload containers (100,4900) configured in accordance with embodiments of the disclosure can include some components that are not shown in FIG. 55, and other components that are shown may not be needed and can therefore be omitted.

In one or more embodiments, the block diagram schematic 5500 includes one or more processors 5501. The one or more processors 5501 can be a microprocessor, a group of processing components, one or more ASICs, programmable logic, or other type of processing device. The one or more processors 5501 can be operable with the various components of the block diagram schematic 5500.

In one or more embodiments, the one or more processors 5501 can be configured to process and execute executable software code to perform the various functions of a payload container (100,4900). A storage device, such as an onboard memory, can optionally store the executable software code used by the one or more processors 5501 during operation.

In one or more embodiments, in addition to the one or more processors 5501, the block diagram schematic 5500 can include a first altimeter sensor 5502 and a second altimeter sensor 5503, time-of-flight sensor 5504, a first accelerometer 5513 and a second accelerometer 5514, blasting cap 5505, one or more detonation relays 5506, a power source 5507, a power switch 5508, an aerial switch 5509, an arming switch 5510, one or more light emitting diodes 5511, and a gravitational force (G-force) switch 5512. Additional components can be included as well, examples of which include a voltage testing circuit, on-chip electrostatic discharge protection circuit, voltage testing circuit, and capacitors and resistors.

Turning now to FIG. 56, illustrated therein is a system flow diagram showing how some of these components can operate in a payload container (100,4900) configured in accordance with one or more embodiments of the disclosure. In one or more embodiments, altimeter sensors 5502, 5503 take readings when armed to set a baseline mean sea level reading. In one or more embodiments, the altimeter sensors 5502,5503 provide relative altitude readings from baseline for "Safety gate 1" (sensor reads sixty meters above baseline) before closing safety relay 5608 and "safety gate 2" (repetitive sensor readings indicate freefall descent by changes in mean sea level per second) before closing safety relay 5609. In one or more embodiments, the accelerometers 5513,5514 provide repetitive acceleration readings indicating freefall descent by changes in velocity for "safety gate 2" before closing safety relay 5609.

A time-of-flight sensor 5504 provides "above ground level" information for "Safety Gate 1" (sensor reading indicates ground level and ascent to maximum sensor reading distance of fifteen meters within timeframe indicative of drone ascent) before closing safety relay 5608. Time-of-flight sensor 5504 also provides "above ground level" information for "detonation gate" (if aerial burst switch is active, sensor reads the programmed above ground level height) before closing detonation relay 5506 and initiating detonation. In one or more embodiments, the one or more processors 5501 can read sensor data and control the safety and detonation relays.

In one or more embodiments, a capacitor 5602 can build and store charge from the power source 5507, which in one or more embodiments is an embedded lithium-ion battery. In one or more embodiments, the capacitor 5602 stores charge after safety relay 5608 is closed. This charge is then to be released into and detonate blasting cap 5505 after safety relay 5609 and detonation relay 5506 have closed.

In one or more embodiments, the relays, which can include a first safety relay 5608, a second safety relay 5609, and a detonation relay 5506, are configured as normally open metal oxide field effect transistors (MOSFETs) or solid-state relays (SSR). In one or more embodiments, these relays 5608,5609,5506 are closed by the one or more processors 5501 in order after relevant safety parameters are satisfied.

The G-force switch 5512 provides a bypass of detonation relay 5506 to ensure detonation on impact of device. In one or more embodiments, the G-force switch 5512 connects the capacitor 5602 to blasting cap 5505 if the device impacts ground with necessary G-forces and safety relay 5608,5609 are already closed.

In one or more embodiments, the aerial switch 5509 communicates to the system to engage sequencing for aerial burst detonation. In one or more embodiments, the power switch 5508 connects the power source 5507 to the remaining components of the circuit. In one or more embodiments, the arming switch 5510 indicates an intent to arm. In one or more embodiments, when this arming switch 5510 is set, the one or more processors 5501 store baseline mean sea level reading from altimeter sensors 5502,5503 for use in further calculations. Additionally, the arming switch turns on one of the light emitting diodes 5511 and also deactivates onboard shunt across blasting cap leads.

Speaking of the light emitting diodes 5511, in one or more embodiments, yellow light emitting diode 5511(*a*), which when lit solid indicates the power switch 5508 is active and the power source 5507 is connected.

Green light emitting diode 5511(*b*), which indicates system check status including but not limited to battery voltage, time-of-flight, altimeter, and accelerometer sensor readings, relay status, and short-circuit check for G-force switch. Green light emitting diode 5511(*b*) is lit solid once all checks are completed and passed. In one or more embodiments, if the green light emitting diode 5511(*b*) is lit solid, the system is good to go. When the green light emitting diode 5511(*b*) is flashing, the system should be re-powered, and a system check attempted again. If green light emitting diode 5511(*b*) is still flashing, the system is not mission ready.

Blue light emitting diode 5511(*c*), in one or more embodiments, indicates aerial burst is engaged. Additionally, this requires in logic that yellow light emitting diode 5511(*a*) and green light emitting diode 5511(*b*) are lit and solid. If blue light emitting diode 5511(*c*) does not come on when aerial switch 5509 is pressed, this indicates the device may be used for impact mode only.

Red light emitting diode 5511(*d*), in one or more embodiments, indicates when lit solid the detonation system is mission ready and all system checks have completed successfully.

A blasting cap continuity testing circuit 5605 can be provided. In one or more embodiments, this comprises a small transistor or 555-circuit connected to the blasting cap lever nut to test continuity between the two blasting cap wires. When the arming switch is engaged, continuity testing is activated and if continuity fails, the red light emitting diode 5511(*d*) will flash, indicating that either the blasting cap is faulty, or the wires are not fully seated in the lever nut. If red light emitting diode 5511(*d*) remains lit solid, the operator can complete assembly and launch.

An on-chip electrostatic discharge protection circuit 5606 can be provided to reduce the risk of errant voltage reaching the blasting cap 5505 outside of the intended safety path. A voltage testing circuit 5607 can be provided as a part of functions checks to confirm the power source 5507 has charge and is supplying sufficient voltage for the detonation system to function properly.

Turning now to FIG. 57, illustrated therein is one explanatory method of using a payload container (100,4900) in accordance with one or more embodiments of the disclosure.

Beginning at step 5701, the payload container (100,4900) is removed from packaging. At step 5702, the nose cone electronics hub assembly (101,5101) of the payload container (100,4900) is disconnected from the independent collar assembly (102,5102) with a counter-clockwise twist to release the bayonet-style connector.

In one or more embodiments, the nose cone electronics hub assembly (101,5101) contains the electronics package and a two-conductor lever-nut for attaching the raw leads of a No. 8 (or equivalent) blasting cap (5505). In one or more embodiments, the upper section of the independent collar assembly (102,5102) contains the sleeve and upper nut of a cable gland assembly (1004) and a fragmentation insert (1003) secured by the upper nut of the cable gland assembly (1004). The fragmentation insert (1003) contains six-millimeter ball bearings organized to provide fragmentation in the direction of travel and also includes finger grips to supply extra leverage in fully securing the cable gland assembly (1004) around the blasting cap (5505). Fragmentation insert (1003) is easily removable and can be inserted or removed depending on mission parameters.

At step 5703, the independent collar assembly (102,5102) is disconnected from the canister (903,4903) with a counter-clockwise spin to release the threaded-style connector. The underside of the independent collar assembly (102,5102) contains the lower nut of the cable gland assembly (1004), allowing the grip to remain secure to the independent collar assembly (102,5102) even when the upper nut and fragmentation insert (1003) are removed.

The inside of the canister (903,4903) contains three interlocking canister fragmentation inserts (908,909,910) of the canister fragmentation insert (3500), four snap-fit grid fins (105,4905), and optionally aircraft cables (4907) (where deployment D-rings are not used) each with two collars. The fragmentation panels defining the canister fragmentation insert (3500) contain six-millimeter ball bearings organized to provide fragmentation coverage equally throughout the entire canister wall and the panels are easily removed if mission parameters require no or only directional fragmentation.

At step 5704, the fin cap (106,4906) of the payload container (100,4900) is held in place by a captive low-profile M6 hex bolt, shown as threaded screw (108) above, and is removed from the canister (903,4903) by rotating the entire fin cap (106,4906) counterclockwise until released.

At step 5705, the grid fins (105,4905) are attached to the fin cap (4906) or to the fin retaining plate (911) that situates beneath the fin cap (106). At step 5706, either the aircraft cable(s) (4907) are attached, or the deployment D-ring (107) is pivoted upward.

At step 5707, the fin cap (106,4906) assembly with threaded screw (108) aligned with the threads on the underside of the canister (903,4903) and spun clockwise by hand-tightening down until the fin cap (106,4906) assembly is secured firmly onto the canister (903,4903) and is then set aside on a stable surface. The nose cone electronics hub assembly (101,5101) of the device contains user-accessible switches (3), indicator lights (4), and a two-conductor lever-nut. Oriented with the light emitting diode array towards the user, the left side switch next to the yellow light emitting diode (5511(*a*)) is the primary power switch (5508).

When the primary power switch (5508) is activated, the yellow light emitting diode (5511(*a*)) will light up, indicating the embedded battery is providing power to the device. When deactivated, all forward circuits of the device are mechanically disconnected from the battery and the yellow light emitting diode (5511(*a*)) goes out.

At step 5708, the user activates the primary power switch (5508). At step 5709, the embedded one or more processors (5501) performs a battery health check using a voltage testing circuit (5607) which provides a reading of the current voltage status of the battery. This check is passed if the indicated voltage exceeds the calculated requirements for proper functioning of the device. If the voltage is under the requirement, this check fails.

At step 5710, a blasting cap continuity test circuit (5605) tests continuity between different parts of the circuit that should be fully disconnected from one another during device deployment. These continuity tests include positive voltage rail to safety relay No. 1 (5608) normally open gate, to safety relay No. 2 (5609) normally open gate, and to detonation relay (5506) normally open gate. If any of the three continuity tests return continuity, this check fails.

At step 5711, several flight sensors are initialized. A time-of-flight sensor (5504), which could be a radar, time of flight sensor, or other device and calculates distances up to fifteen meters, is initialized and queried to confirm distance readings are being returned. This check is passed if consecutive queries return a valid measurement. If no measurement is returned or some other error is indicated by the initialization process of the sensor, this check fails.

Altimeter sensors (5502,5503), which calculate the mean sea level altitude using barometer pressure, and accelerometers (5513,5514), which calculate acceleration, are initialized and queried to confirm mean sea level readings and acceleration readings are being returned. This check is passed if consecutive queries return a valid mean sea level reading and valid acceleration reading. If no measurement is returned or some other error is indicated by the initialization process of the sensor, this check fails.

At step 5712, if any of the aforementioned functions checks fails, the green light emitting diode (5511(*b*)) on the device, as controlled by the one or more processors (5501), will light up and repeatedly flash with an error code in the form of discrete blinking patterns to indicate which check failed and that the device should not be used. If the green light emitting diode (5511(*b*)) comes on and stays on, this indicates that all functions checks have passed.

At step 5713, after the green light emitting diode (5511 (*b*)) is lit, if the user activates the aerial switch (5509), the blue light emitting diode (5511(*c*)) will light up, indicating that "aerial burst" has been selected as the detonation method. Deactivating the aerial switch (5509) will toggle this setting back off and the blue light emitting diode (5511(*c*)) will go out.

If the primary power switch (5508) is turned off and back on at any point, this functions-check process will be repeated, and the aerial burst selection will also need to be toggled again if desired. The blue light emitting diode (5511(*c*)) defaults to off thus indicating "ground impact" as the default detonation method. The device is now confirmed to be functioning properly and it is safe to connect the blasting cap (5505).

At step 5714, user fully inserts the blasting cap (5505) into the cable gland assembly from the bayonet side of the independent collar assembly (102,5102) and tightens down the upper nut to secure the blasting cap (5505) to the independent collar assembly (102,5102).

At step 5715, the two-positions of the lever nut in the nose cone electronics hub assembly (101,5101) should be snapped open, perpendicular to the lever nut body. The two wire leads of the blasting cap (5505) are then inserted into the two positions of the lever nut, taking care that the two wires are inserted fully and completely isolated from one another. The lever nut can then be snapped down onto the wires and gently tugged to confirm they are seated properly.

At step 5716, with intent to arm, the user now activates the arming switch (5510) adjacent to the red light emitting diode (5511(*d*)) on the right. The red light emitting diode (5511(*d*)) will light up, indicating the device is prepped for arming. When the arming switch (5510) is deactivated, the arming process is reset, and the red light emitting diode (5511(*d*)) goes out. If activated again, the arming process starts over.

At step 5717, once armed, the blasting cap continuity test circuit (5605) tests the two blasting cap leads inserted into the lever nuts for continuity. This ensures that a blasting cap (5505) is present, that the blasting cap (5505) leads were properly inserted into the lever nuts, and that the blasting cap (5505) has continuity between its leads-indicating it is not malfunctioning or was not assembled incorrectly. If this continuity check fails, the one or more processors (5501) will repeatedly flash the red light emitting diode (5511(*d*)) indicating there is a continuity error. The user should deactivate the arming switch (5510) and diagnose any issue with the blasting cap (5505) before arming the device again.

At step 5718, the one or more processors (5501) query and stores an initial average reading from the altimeter sensors (5502,5503) for mean sea level to use as a baseline to calculate altitude when airborne. The device is now ready and polling the altimeter sensors (5502,5503) constantly for current altitude. The initial safety check requires both a 180-second timeout and an altitude ascent delta of sixty meters before the check is passed.

At step 5719, the independent collar assembly (102,5102) is re-attached to the nose cone electronics hub assembly (101,5101) using a clockwise quarter twist until the indicator lines on the outside of the nose cone electronics hub assembly (101,5101) align with the indicator lines on the outside of the independent collar assembly (102,5102).

At step 5720, while situated on stable ground, the selected energetic material is deposited in the canister (903,4903) assembly up to just below the internal threads of the canister (903,4903). The canister (903,4903) assembly is designed to hold approximately one pound or 450 grams of energetic material by weight. Plastic explosive material must be formed in the canister to include a centered cavity to receive the shape of the blasting cap in the next step.

At step 5721, the nose cone electronics hub assembly (101,5101) with secured blasting cap (5505) is inserted into the canister assembly and makes initial contact with the energetic material previously inserted into the canister (903, 4903) until the threads are engaged and then the nose-collar assembly is tightened down clockwise until resistance is met at the bottom of the threads.

At step 5722, the fully assembled and armed device is now picked up and flipped over, nose toward the ground, and carried by the aircraft cable (4907) or deployment D-ring (107) to be attached to an unmanned aircraft (5300) by hook or actuator mechanism with the aircraft either grounded or in overhead stable hover.

At step 5723, the unmanned aircraft (5300) operator begins ascending. At step 5724, the one or more processors (5501) continue to poll the altimeter sensor (5502,5503) and accelerometers (5513,5514), maintaining a rolling average reading at the fastest polling rate of each component. Once the device has reached a minimum delta of plus sixty meters from the baseline mean sea level and has been armed for at least 180 seconds, the first safety gate has been passed.

At step 5725, the one or more processors (5501) close safety relay No. 1 (5608), allowing positive voltage into the capacitor (5602) circuit. The capacitor (5602) now charges and stores the necessary energy that will later be discharged into the blasting cap. safety relay No. 2 (5609) and detonation relay (5506) remain closed.

At step 5526, the unmanned aircraft (5300) operator has target acquisition and releases the device using the hook or actuator into stable freefall. At step 5727, the one or more processors (5501) continue to poll the altimeter sensors (5502,5503) and accelerometers (5513,5514), maintaining a rolling average reading at the fastest polling rate of each component. Once in freefall, the readings will follow known data trajectories. Once the device is confirmed to be in freefall over five seconds, the second safety check has been passed and the microcontroller closes safety relay No. 2 (5609), allowing positive voltage through. The detonation relay (5506) remains closed.

At step 5728(*a*), if aerial burst was selected by the user, the one or more processors (5501) begin polling the time-of-flight sensor (5504), maintaining a rolling average reading at the fastest polling rate of the component. When the detonation gate conditions are satisfied and the time-of-flight sensor readings match the proper calculated above ground level distance for aerial burst, the detonation relay (5506) is closed, and the capacitor (5602) is discharged into the blasting cap (5505).

At step 5728(*b*), if aerial burst was not selected by the user, the G-force switch (5512) closes a mechanical circuit when exposed to sufficient negative g-forces—in this case, the rapid deceleration caused by impact of the device with the ground. The G-force switch (5512) bypasses the detonation relay (5506) used for aerial burst and allows the capacitor (5602) to discharge into the blasting cap (5505). Step 5727(*b*) also ensures that if an aerial burst was selected but the device fails to activate in the air by closing detonation relay (5506), it will still detonate on impact given all other safety gate conditions are satisfied and safety relay No.

1 (5608) and safety relay No. 2 (5609) successfully closed. At step 5729, the blasting cap (5505) detonates, thus initiating detonation of the energetic material.

Turning now to FIG. 58, illustrated therein are various embodiments of the disclosure. The embodiments of FIG. 58 are shown as labeled boxes in FIG. 58 due to the fact that the individual components of these embodiments have been illustrated in detail in FIGS. 51-57, which precede FIG. 58. Accordingly, since these items have previously been illustrated and described, their repeated illustration is no longer essential for a proper understanding of these embodiments. Thus, the embodiments are shown as labeled boxes.

At 5801, a device comprises a container. At 5801, the container is configured to nest final assembly parts during device shipment and storage, be devoid of any energetic materials in support of materially unrestricted shipping and be loaded with customer-supplied energetic material for use as a modular munition system while attached to a VTOL aerial drone deployed by an end-user.

At 5802, a payload container comprises a nose cone electronics hub assembly, a canister assembly, one or more fragmentation inserts, and a collar assembly coupling the nose cone electronics hub assembly to the canister assembly. At 5802, the canister assembly and the collar assembly house the one or more fragmentation inserts.

At 5803, the payload container of 5802 comprises a fin system. At 5803, the fin system comprises one or more grid fins facilitating vertical descent for the payload container when dropped from an unmanned aircraft. At 5804, the one or more grid fins of 5803 comprise four grid fins. At 5805, the canister of 5804 comprises a canister defining a shipping container for at least the four grid fins.

At 5806, the payload container of 5805 comprises electronic components and a power source situated within the nose cone electronics hub assembly. At 5807, the payload container of 5806 further comprises a cable gland assembly. At 5807, the collar assembly comprises a collar defining a center hole. At 5807, the one or more fragmentation inserts comprise a collar fragmentation insert. At 5807, the cable gland assembly suspends the collar fragmentation insert in a recess of a bayonet side of the collar.

At 5808, the payload container of 5807 further comprises a fin cap retaining the fin system to the canister. At 5809, the payload container of 5808 further comprises a fin retaining plate situated between the fin cap and the fin system.

At 5810, the payload container of 5809 further comprises a deployment D-ring pivotally coupled to the fin cap. At 5810, the deployment D-ring is pivotable between a position abutting a surface of the fin cap and another position extending distally from the fin cap.

At 5811, the collar fragmentation insert of 5810 is selectively removable from the payload container. At 5811, the collar fragmentation insert comprises a plurality of ball bearings.

At 5812, a payload container comprises a canister and a deployment D-ring pivotally coupled to the payload container. At 5812, the deployment D-ring, when pivoted to a position where the deployment D-ring extends distally from an end of the payload container, allows the payload container to be dropped from an unmanned aircraft.

At 5813, the payload container of 5812 further comprises a nose cone electronics hub assembly comprising a nose cone, electronic components situated within the nose cone, and explosive material situated within the canister. At 5813, the electronic components are configured to cause detonation of the explosive material at a predetermined altitude.

At 5814, the payload container of 5812 further comprises explosive material situated in the canister and configured to detonate when the payload container impacts a solid object or the earth. At 5815, the payload container of 5814 further comprises a canister fragmentation insert and a collar fragmentation insert configured to fully fragment the payload container when the energetic explosive materials detonate.

At 5816, the payload container of 5812 further comprises a fragmentation insert that is selectively removable from the canister. At 5817, the payload container of 5816 further comprises a collar fragmentation insert that is selectively detachable from the payload container.

At 5818, the payload container of 5817 further comprises explosive material situated in the canister. At 5818, the collar fragmentation insert is configured to directionally fragment the payload container when the explosive material detonates.

At 5819, the payload container of 5812 further comprises a fin cap that is attachable to the canister. At 5819, the payload container comprises one or more grid fins, with each grid fin of the one or more grid fins comprises a fin stem. At 5820, the payload container of 5819 further comprises a fin retaining plate and a threaded screw coupled to a closed end of the canister, thereby sandwiching fin stems of each fin and the fin retaining plate between the fin cap and the closed end of the canister.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A modular munition system, comprising:
 a nose cone electronics hub assembly housing electronic components;
 a canister assembly comprising a canister configured to selectively receive energetic material when the modular munition system is in a deployment configuration;
 one or more fragmentation inserts configured to fragment if, when the modular munition system is in the deployment configuration, the energetic material detonates;
 a fin system;
 a collar assembly coupling the nose cone electronics hub assembly to the canister assembly;
 wherein the canister assembly and the collar assembly house the one or more fragmentation inserts and the fin system when the modular munition system is in a shipping configuration.

2. The modular munition system of claim 1, the fin system comprising one or more grid fins facilitating vertical descent for the modular munition system when dropped from an unmanned aircraft.

3. The modular munition system of claim 2, the one or more grid fins comprising four grid fins.

4. The modular munition system of claim 3, the canister defining a shipping container for at least the four grid fins.

5. The modular munition system of claim 4, the electronic components comprising a power source situated within the nose cone electronics hub assembly.

6. The modular munition system of claim 5, further comprising a cable gland assembly, wherein:
 the collar assembly comprises a collar defining a center hole;
 the one or more fragmentation inserts comprise a collar fragmentation insert; and
 the cable gland assembly suspends the collar fragmentation insert in a recess of a bayonet side of the collar.

7. The modular munition system of claim 6, further comprising a fin cap retaining the fin system to the canister.

8. The modular munition system of claim 7, further comprising a fin retaining plate situated between the fin cap and the fin system.

9. The modular munition system of claim 8, further comprising a deployment D-ring pivotally coupled to the fin cap and pivotable between a position abutting a surface of the fin cap and another position extending distally from the fin cap.

10. The modular munition system of claim 9, wherein:
 the collar fragmentation insert is selectively removable from the modular munition system; and
 the collar fragmentation insert comprises a plurality of ball bearings.

11. The modular munition system of claim 1, further comprising:
 explosive material situated within the canister assembly;
 wherein the electronic components are configured to cause detonation of the explosive material at a predetermined altitude.

12. The modular munition system of claim 1, further comprising explosive material situated in the canister assembly that is configured to detonate when the modular munition system impacts a solid object or the earth.

13. The modular munition system of claim 12, the one or more fragmentation inserts comprising a canister fragmentation insert and a collar fragmentation insert configured to fully fragment the modular munition system when the explosive material detonates.

14. The modular munition system of claim 1, wherein the one or more fragmentation inserts comprise a fragmentation insert that is selectively removable from the canister assembly.

15. The modular munition system of claim 1, wherein the one or more fragmentation inserts comprise a collar fragmentation insert that is selectively detachable from the modular munition system.

16. The modular munition system of claim 15, further comprising explosive material situated in the canister assembly, wherein the collar fragmentation insert is configured to directionally fragment the modular munition system when the explosive material detonates.

17. The modular munition system of claim 1, further comprising a fin cap that is attachable to the canister assembly and one or more grid fins, wherein each grid fin of the one or more grid fins comprises a fin stem.

18. The modular munition system of claim 17, further comprising a fin retaining plate and a threaded screw coupled to a closed end of the canister assembly, thereby sandwiching fin stems of the each grid fin and the fin retaining plate between the fin cap and the closed end of the canister assembly.

\* \* \* \* \*